(12) United States Patent
Kim et al.

(10) Patent No.: US 12,511,013 B2
(45) Date of Patent: Dec. 30, 2025

(54) ELECTRONIC DEVICE FOR FOLDER OPERATION, AND OPERATING METHOD THEREFOR

(71) Applicant: Samsung Electronics Co., Ltd., Suwon-si (KR)

(72) Inventors: Seongho Kim, Suwon-si (KR); Taeyong Moon, Suwon-si (KR); Sangheon Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/899,051

(22) Filed: Aug. 30, 2022

(65) Prior Publication Data

US 2022/0413685 A1 Dec. 29, 2022

Related U.S. Application Data

(63) Continuation of application No. PCT/KR2021/002971, filed on Mar. 10, 2021.

(30) Foreign Application Priority Data

Mar. 10, 2020 (KR) .................. 10-2020-0029848

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0486* (2013.01); *G06F 16/168* (2019.01); *G06F 3/0482* (2013.01)

(58) Field of Classification Search
CPC .... G06F 3/048; G06F 3/04817; G06F 3/0486; G06F 3/0482; G06F 16/10–196; G06F 16/168
See application file for complete search history.

(56) References Cited

U.S. PATENT DOCUMENTS

2003/0065728 A1* 4/2003 Milovanovic ........ G06Q 10/107
709/206
2011/0249073 A1 10/2011 Cranfill et al.
(Continued)

FOREIGN PATENT DOCUMENTS

CN 105573604 A * 5/2016
JP 2000-231505 A 8/2000
(Continued)

OTHER PUBLICATIONS

Linares-Vásquez, Mario, et al. "On using machine learning to automatically classify software applications into domain categories." Empirical Software Engineering 19 (2014): 582-618. (Year: 2014).*

(Continued)

*Primary Examiner* — Liang Y Li
(74) *Attorney, Agent, or Firm* — Jefferson IP Law, LLP

(57) ABSTRACT

An electronic device is provided. The electronic device includes a display, a memory storing executable instructions, and at least one processor, wherein, when the instructions stored in the memory are executed, the at least one processor is configured to, the occurrence of an event for generating a folder including at least one icon corresponding to at least one application; control the display to display a folder screen including the at least one icon; control the display to display at least two folder names corresponding to the at least one application, receive a user input for selecting a first folder name from among the displayed at least two folder names, (Continued)

and control the display to display the selected first folder name as the folder name of the folder on the folder screen.

20 Claims, 39 Drawing Sheets

(51) Int. Cl.
    *G06F 3/0486*     (2013.01)
    *G06F 16/16*     (2019.01)

(56) References Cited

U.S. PATENT DOCUMENTS

| | | | |
|---|---|---|---|
| 2011/0252374 | A1 | 10/2011 | Chaudhri |
| 2013/0010000 | A1* | 1/2013 | Chiu ............... G06F 3/0488 345/676 |
| 2013/0024794 | A1 | 1/2013 | Ha et al. |
| 2013/0132896 | A1* | 5/2013 | Lee ............... G06F 16/907 715/846 |
| 2013/0174069 | A1* | 7/2013 | Lee ............... G06F 3/0486 715/769 |
| 2013/0219319 | A1* | 8/2013 | Park ............... G06F 3/0488 715/775 |
| 2014/0122479 | A1 | 5/2014 | Panferov et al. |
| 2014/0304311 | A1* | 10/2014 | Choi ............... G06F 3/04817 707/822 |
| 2016/0117079 | A1 | 4/2016 | Huang |
| 2016/0224586 | A1* | 8/2016 | Kasterstein ........... G06F 16/148 |
| 2017/0038946 | A1* | 2/2017 | Deng ............... G06F 3/0488 |
| 2017/0083208 | A1 | 3/2017 | Hyun et al. |
| 2017/0250994 | A1 | 8/2017 | Padidar et al. |
| 2018/0011868 | A1* | 1/2018 | Allen ............... G06F 40/295 |
| 2018/0329607 | A1* | 11/2018 | Han ............... G06F 16/168 |
| 2019/0294587 | A1* | 9/2019 | Prakash ............... G06F 3/165 |
| 2020/0151141 | A1* | 5/2020 | Liu ............... G06F 16/164 |
| 2020/0310771 | A1* | 10/2020 | Lu ............... G06F 3/0482 |
| 2020/0387483 | A1* | 12/2020 | Kumar ............... G06F 16/243 |

FOREIGN PATENT DOCUMENTS

| | | |
|---|---|---|
| KR | 10-2012-0035772 A | 4/2012 |
| KR | 10-2013-0010364 A | 1/2013 |
| KR | 10-2013-0016329 A | 2/2013 |
| KR | 10-2013-0080179 A | 7/2013 |
| KR | 10-2014-0065153 A | 5/2014 |
| KR | 10-2015-0021964 A | 3/2015 |
| KR | 10-2015-0035071 A | 4/2015 |
| KR | 10-2017-0108473 A | 9/2017 |
| KR | 10-2019-0033821 A | 4/2019 |
| WO | 2019/085533 A1 | 5/2019 |

OTHER PUBLICATIONS

Jina: App Drawer, App Organizer, Sidebar & Folders. jinadrawer.com. https://web.archive.org/web/20190518142243/https://www.jinadrawer.com Retrieved May 18, 2019. (Year: 2019).*

Mobeedom. "Jina Quick Tour ½: tags and folders." Youtube. Nov. 8, 2018. <https://www.youtube.com/watch?v=lbc4xZ8s45w> (Year: 2018).*

International Search Report dated Jun. 16, 2021, issued in International Patent Application No. PCT/KR2021/002971.

Korean Office Action dated Jul. 11, 2025, issued in Korean Application No. 10-2020-0029848.

* cited by examiner

ELECTRONIC DEVICE FOR FOLDER OPERATION, AND OPERATING METHOD THEREFOR

CROSS-REFERENCE TO RELATED APPLICATION(S)

This application is a continuation application, claiming priority under § 365(c), of an International application No. PCT/KR2021/002971, filed on Mar. 10, 2021, which is based on and claims the benefit of a Korean patent application number 10-2020-0029848, filed on Mar. 10, 2020, in the Korean Intellectual Property Office, the disclosure of which is incorporated by reference herein in its entirety.

BACKGROUND

Field

Various embodiments of the disclosure relate to an electronic device for a folder operation, and a method for operating the same.

Description of Related Art

Portable digital communication devices have become indispensable to many modern people. Consumers want to be provided with various high-quality services to their liking, at any place and time, by using portable digital communication devices.

Portable digital communication devices may have various kinds of applications stored and/or installed, and executed, in order to provide various high-quality services. Portable communication devices display icons for executing various kinds of applications, and users of portable communication devices may identify and execute applications by using the displayed icons.

Recently, a rapidly increasing number of applications have been stored and/or installed in portable digital communication devices, and icons corresponding to applications displayed on portable communication devices have increased in number accordingly. Therefore, there is a need for a technology for efficiently managing icons such that consumers can conveniently use a rapidly increasing number of icons.

The above information is presented as background information only to assist with an understanding of the disclosure. No determination has been made, and no assertion is made, as to whether any of the above might be applicable as prior art with regard to the disclosure.

SUMMARY

An electronic device may provide multiple icons for executing multiple applications, and may generate a folder including some of the multiple icons in order to classify the icons. However, it may be inconvenient to configure folder names for respective folders including some of the multiple icons. Moreover, multiple icons have different positions, and the execution screen is switched unnecessarily many times in the course of identifying the position of icons corresponding to an application to be included in a generated folder, thereby increasing the load on the electronic device operation, and inconveniencing the user. Furthermore, a large number of icons are displayed by the electronic device, thereby increasing the load on the electronic device operation for managing the large number of displayed icons, and degrading the user's convenience in connection with icon usage.

Aspects of the disclosure are to address at least the above-mentioned problems and/or disadvantages and to provide at least the advantages described below. Accordingly, an aspect of the disclosure is to provide, an electronic device and a method for operating the same may provide, during folder generation, at least two folder names associated with an application included in a folder to a user, thereby resolving the user's inconvenience in connection with folder name composition. In addition, according to various embodiments, an electronic device and a method for operating the same may recommend at least one application associated with a folder generated during folder generation such that unnecessary execution screen switching is reduced, thereby decreasing the load on the electronic device operation, and resolving the user's inconvenience. In addition, according to various embodiments, an electronic device and a method for operating the same may perform an operation such that each of a large number of icons is included in an associated folder, thereby decreasing the load on the electronic device operation in connection with managing a large number of icons, and improving the user's convenience in connection with using icons.

Additional aspects will be set forth in part in the description which follows and, in part, will be apparent from the description, or may be learned by practice of the presented embodiments.

Technical Solution

Various embodiments may provide an electronic device including a display, a memory storing executable instructions, and at least one processor, wherein, when the instructions stored in the memory are executed, the at least one processor is configured to identify occurrence of an event for generating a folder including at least one icon corresponding to at least one application, control the display to display a screen of the folder including the at least one icon, control the display to display at least two folder names corresponding to the at least one application, receive a user input for selecting a first folder name from among the displayed at least two folder names, and control the display to display the selected first folder name as a folder name of the folder on the folder screen.

Various embodiments may provide a method for operating an electronic device, the method including identifying occurrence of an event for generating a folder including at least one icon corresponding to at least one application, controlling the display to display a folder screen including the at least one icon, displaying at least two folder names corresponding to the at least one application, receiving a user input for selecting a first folder name from among the displayed at least two folder names, and displaying the selected first folder name as a folder name of the folder on the folder screen.

Various embodiments may provide an electronic device including a memory storing executable instructions, and at least one processor, in which, when the instructions stored in the memory are executed, the at least one processor is configured to generate a folder including at least one icon corresponding to at least one application of a plurality of applications, identify at least one second application, which is related to a folder name of the folder, among the remaining applications of the plurality of applications, and display at least one icon corresponding to the identified at least one second application on a screen of the generated folder.

Technical solutions according to various embodiments are not limited to the above-mentioned solutions, and solutions not mentioned herein will be clearly understood from this specification and the accompanying drawings by those skilled in the art to which the disclosure pertains.

Various embodiments may provide an electronic device and a method for operating the same, wherein, during folder generation, at least two folder names associated with an application included in a folder are provided to a user, thereby resolving the user's inconvenience in connection with folder name composition. In addition, various embodiments may provide an electronic device and a method for operating the same, wherein at least one application associated with a folder generated during folder generation is recommended such that unnecessary execution screen switching is reduced, thereby decreasing the load on the electronic device operation, and resolving the user's inconvenience. In addition, Various embodiments may provide an electronic device and a method for operating the same, wherein an operation is performed such that each of a large number of icons is included in an associated folder, thereby decreasing the load on the electronic device operation in connection with managing a large number of icons, and improving the user's convenience in connection with using icons.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
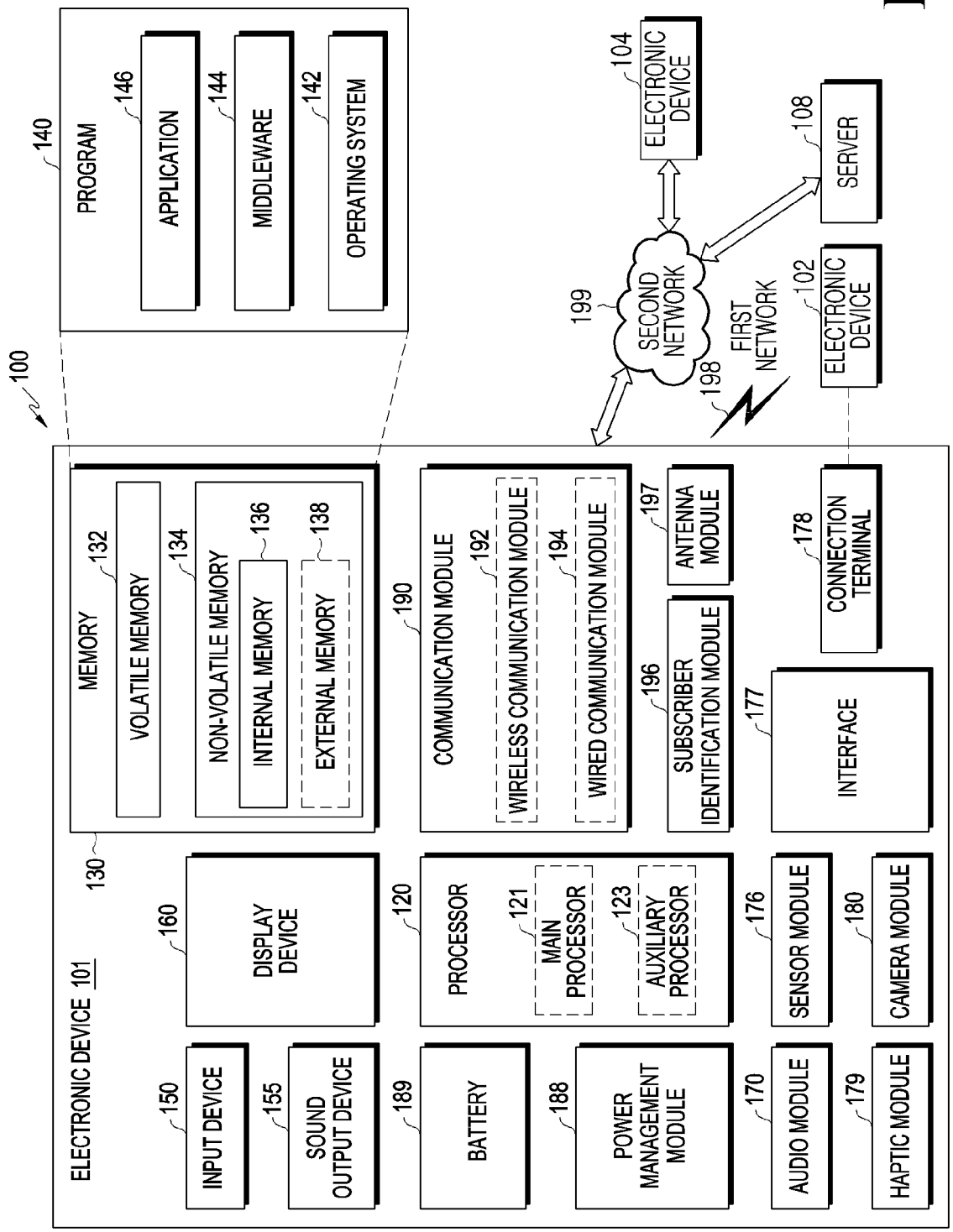
FIG. 1 is a block diagram illustrating an electronic device in a network environment according to various embodiments.

FIG. 1 is a block diagram illustrating an electronic device in a network environment according to various embodiments. Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, configurations implemented in an electronic device according to various embodiments will be described.

Figure 2:
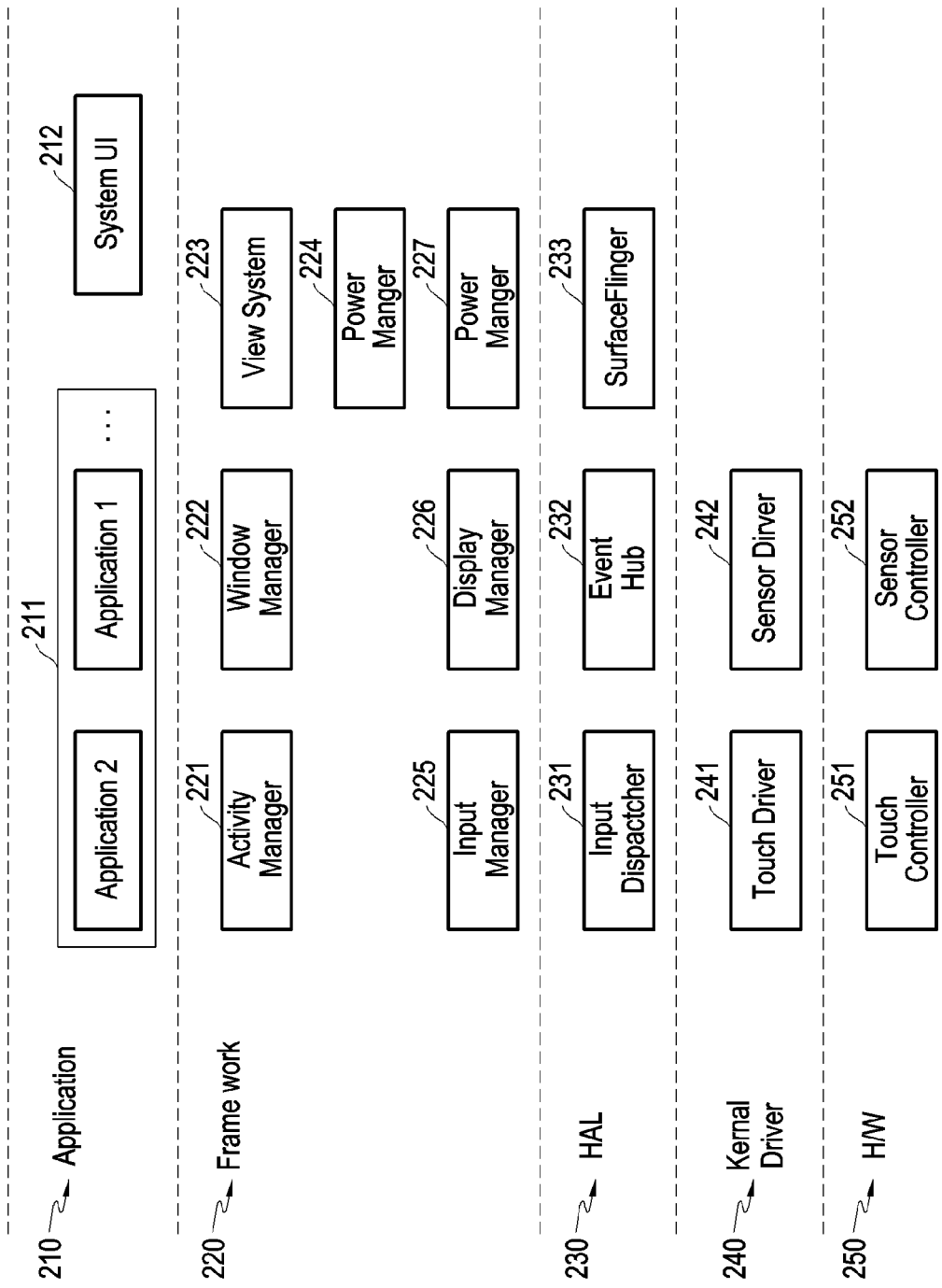
FIG. 2 illustrates an example of configurations implemented in an electronic device according to various embodiments.

FIG. 2 illustrates an example of configurations implemented in the electronic device 101 according to various embodiments. The electronic device is not limited to the example illustrated in FIG. 2, and the electronic device 101 may be implemented with at least one configuration that is fewer than those shown in FIG. 2, or may be implemented with multiple configurations that are more than those thereof.

Referring to FIG. 2, the electronic device 101 may include an application layer 210, a framework 220, a hardware abstraction layer (HAL) 230, a kernel driver layer 240, and a hardware layer 250.

Hereinafter, the application layer 210 will be described.

According to various embodiments, the application layer 210 may include at least one application 211 and a system user interface (UI) 212, which are stored in a memory and executable by a processor. The application 211 may include an Internet browser, a video application, games, and the like, and the type thereof may not be limited. The system UI 212 may refer to an application configuring various graphic user interface (GUI) screens implemented on the system of the electronic device 101, such as a notification bar and a quick view.

Hereinafter, a framework 220 will be described.

According to various embodiments, the framework 220 may include an activity manager 221, a window manager 222, a view system 223, and a power manager 224, an input manager 225, a display manager 226, and a sensor manager 227.

According to various embodiments, the framework 220 may provide various functions to the application 211 such that functions or information provided from one or more resources of the electronic device 101 are usable by the application 211.

According to various embodiments, the activity manager 221 may control an application lifecycle and an activity stack.

According to various embodiments, the window manager 222 may manage one or more GUI resources used in a screen.

According to various embodiments, the view system 223 may be a set of extensible views used to generate an application user interface.

According to various embodiments, the power manager 224 may manage the capacity, temperature, or power of the battery, and may determine or provide related information required for the operation of the electronic device 101 by using the corresponding information.

According to various embodiments, the input manager 225 may provide information (e.g., key layout, etc.) of an input device provided by the electronic device.

According to various embodiments, the display manager 226 may manage the lifecycle (connection/attribute change/uninstall) of the display device, and may manage H/W display mapping for outputting a screen GUI element (window). When the electronic device 101 is provided with multiple housings and a display disposed on the multiple housings (e.g., a flexible display or multiple displays), the display manager may change a UI to be output according to a system event such as a change in folding state between multiple housings of the electronic device 101.

According to various embodiments, the sensor manager 227 may control the application of the sensor and the like based on the usability.

Hereinafter, a hardware abstraction layer (HAL) 230 will be described.

According to various embodiments, the hardware abstraction layer 230 may include an input dispatcher 231, an event hub 232, and a surface flinger 233.

According to various embodiments, the hardware abstraction layer 230 may refer to an abstraction layer between multiple hardware modules included in the hardware layer 250 and software of the electronic device 101.

According to various embodiments, the input dispatcher 231 may perform a function of determining an application 211 to which the generated event is to be provided.

According to various embodiments, the event hub 232 may provide an interface for standardizing an event occurring in a sensor (e.g., a touch module and a sensor module).

According to various embodiments, the surface flinger 233 may perform a function of providing an execution screen to be displayed on a display among execution screens generated by various applications 211, and when the display configuration is changed, may request the application 211 to perform processing of the change of the resolution and density according to the changed display configuration.

Hereinafter, the kernel driver layer 240 will be described.

According to various embodiments, the kernel driver layer 240 may include various drivers (e.g., a touch driver 241 and a sensor driver 242) for controlling various hardware modules included in the electronic device 101.

According to various embodiments, the touch driver 241 may include an interface module for controlling the touch controller 251.

According to various embodiments, the sensor driver 242 may include an interface module for controlling the sensor controller 252 connected to the sensor.

Hereinafter, the hardware layer 250 will be described.

According to various embodiments, the hardware layer may include a touch controller 251 and a sensor controller 252.

According to various embodiments, the touch controller 251 may control a touch sensor which is configured on the display and configured to receive a touch input.

According to various embodiments, the sensor controller 252 may include a Hall sensor for detecting a folding state of a foldable device.

Hereinafter, an example 301 of the electronic device 101 and an example 320 of an external device will be described.

Figure 3:
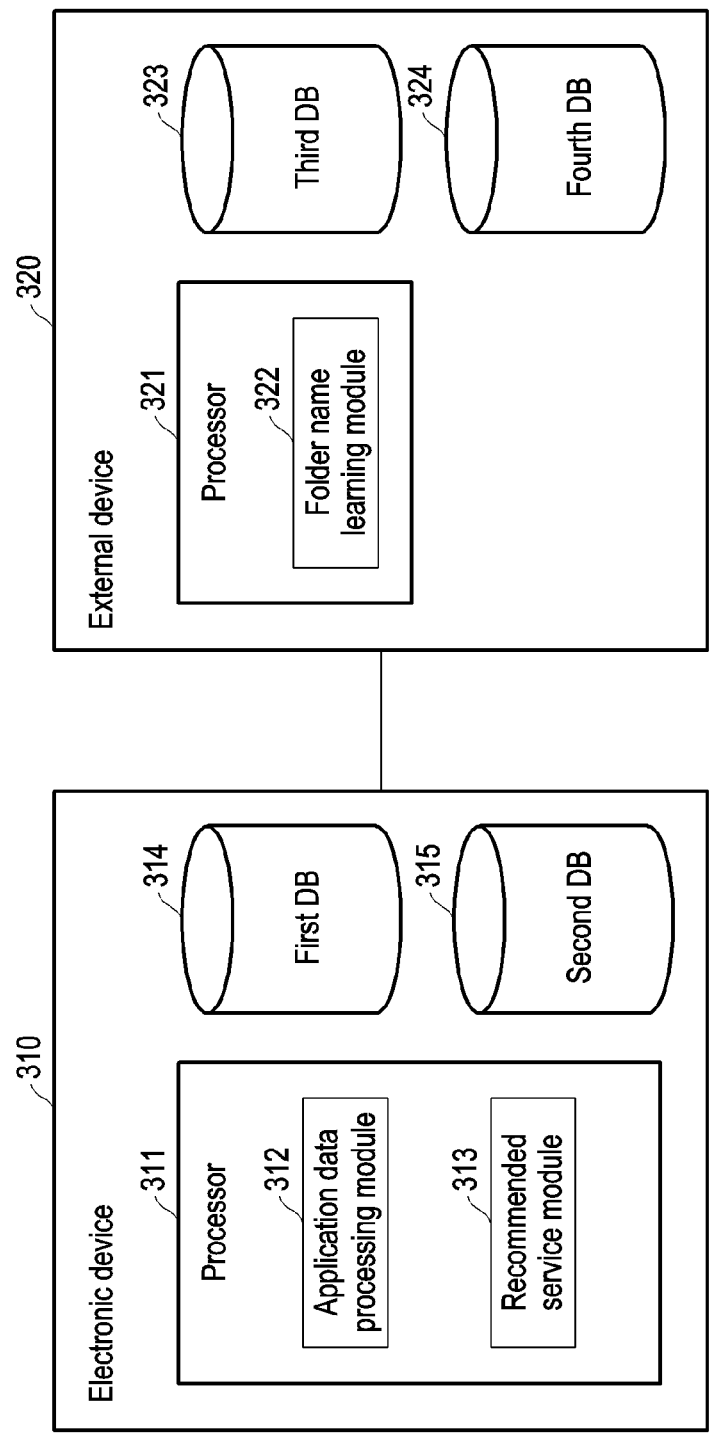
FIG. 3 illustrates an example of a configuration of an electronic device and an example of a configuration of an external device according to various embodiments.

FIG. 3 illustrates an example of a configuration of an electronic device 310 and an example of a configuration of an external device according to various embodiments. The electronic device is not limited to the example illustrated in FIG. 3, and an electronic device 310 may be implemented with at least one configuration that is fewer than those shown in FIG. 3, or may be implemented with multiple configurations that are more than those shown in FIG. 3.

Referring to FIG. 3, the electronic device 310 may include a processor 311 (e.g., at least one processor 120) including an application data processing module 312 and a recommendation service module 313, a first database 314 configured to store information related to an application, and a second database 315 for storing weight value information about a folder name; and the server may include a processor 321 including a folder name learning module 322, a third database 323 configured to store information related to an application, and a fourth database 324 that stores weight value information about a folder name. The modules are functional units, and are stored in the form of instructions or program code for executing a corresponding function in a memory, a program, or an application, and when executed, may control the processor to perform an operation related to the corresponding module.

Hereinafter, an example of the configuration of the electronic device 310 will be described.

According to various embodiments, the application data processing module 312 may acquire information related to an application stored in the first database 314, may process the acquired application-related information into the form of analyzable information, and may extract at least one keyword. The operation by the application data processing module 312 will be described in detail later with reference to FIGS. 7 to 8.

According to various embodiments, the recommendation service module 313 may provide a service such as an operation of recommending a folder name for a folder, an operation of recommending an icon to be included in a folder, or an operation of arranging multiple icons in a folder unit. The recommendation service module 313 may be configured to identify information about a folder name related to an application based on the processed application-related information and folder name-related weight value information stored in the second database 315, and may provide the above-described services based on the identified folder name-related information. An operation by the recommendation service module 313 will be described in detail below.

According to various embodiments, the first database 314 may include information related to an application. The information related to the application may include various pieces of information such as metadata about an application, various pieces of information for describing an application (e.g., descriptions, app name, company, etc.), and user data related to an application (e.g., stand-alone (SA) logging). The acquisition and use of information related to the application of the electronic device 310 will be described later.

According to various embodiments, the second database 315 may include weight value information about the folder name. The weight value information about a folder name may include multiple predetermined folder names and weight value information relating to specific information (e.g., a keyword) corresponding to each of the multiple folder names. The weight value information about a folder name will be described in detail later.

Hereinafter, an example of the configuration of the external device 320 will be described.

According to various embodiments, the folder name learning module 322 may acquire weight value information about a folder name. The folder name learning module 322 is configured to learn weight value information relating to specific information (e.g., keyword) corresponding to each of multiple folder names, based on multiple predetermined folder names and pieces of information (e.g., keywords) to which a weight value is to be assigned. The operation by the folder name learning module 322 will be described in detail later.

According to various embodiments, the third database 323 may include information related to an application. The third database 323 may store application packages executable by the electronic device 310.

According to various embodiments, the fourth database 324 may include weight value information regarding the acquired folder name.

Meanwhile, the aforementioned configurations of the electronic device 310 and configurations of the external device 320 (e.g., a server) are not limited to those described and/or illustrated, and may be implemented in different devices. For example, the folder name learning module 322 of the external device 320 (e.g., a server) may be implemented in the electronic device 310. In addition, for example, the application data processing module 312 of the electronic device 310 may be implemented in a server.

Accordingly, an operation by each module may be performed in the electronic device 310 and/or the external device 320 (e.g., a server).

Hereinafter, folders according to various embodiments will be described.

According to various embodiments, the electronic device 101 may generate a folder including multiple applications and store the generated folder.

Figure 4:
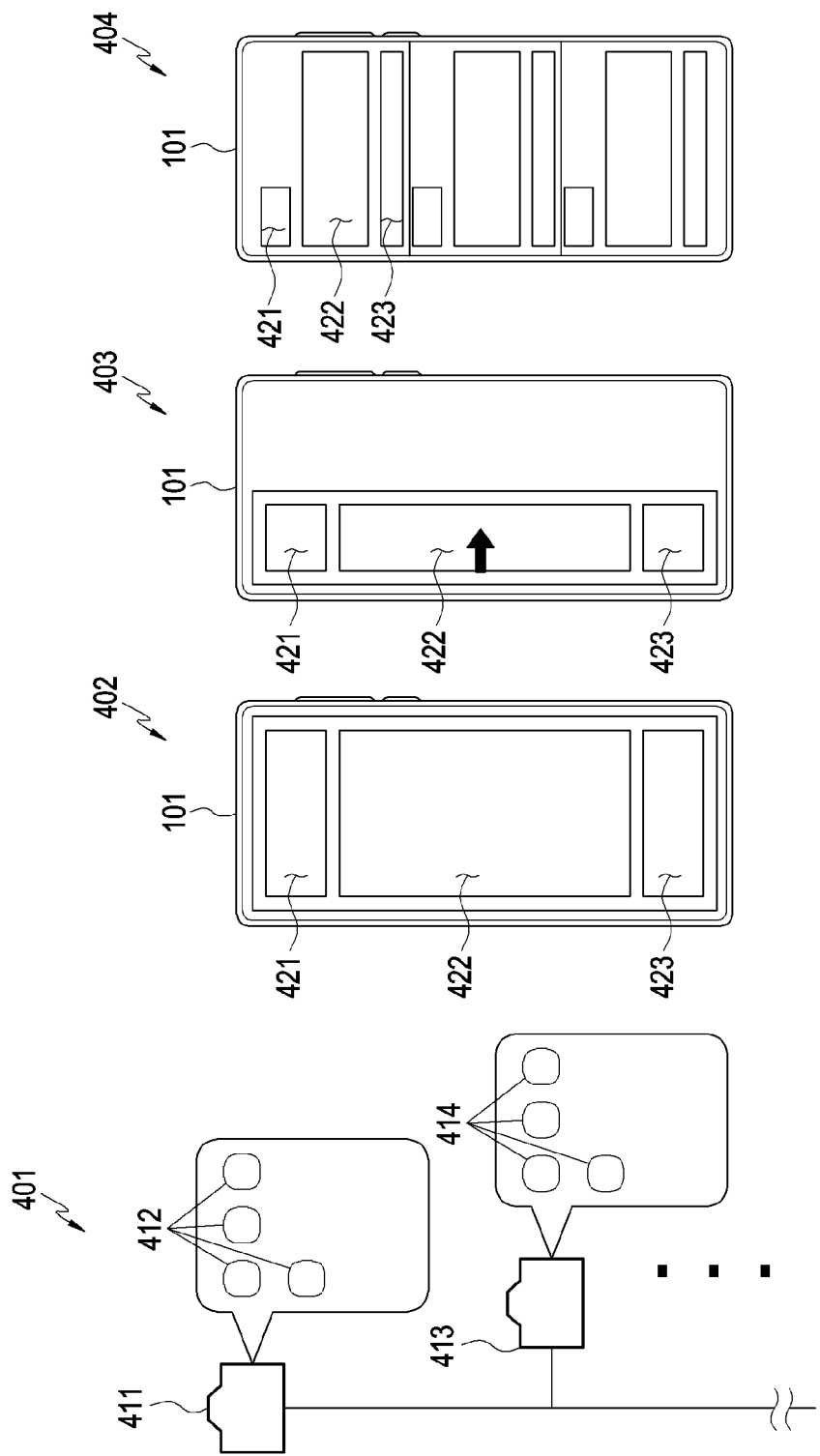
FIG. 4 illustrates an example of a folder stored in an electronic device according to various embodiments.

FIG. 4 illustrates an example of a folder stored in an electronic device 101 according to various embodiments.

Referring to FIG. 4, the electronic device 101 may store and/or manage a folder for classifying data or information stored in the electronic device 101. The data or information may include an executable package file (e.g., an application file), information regarding a GUI (e.g., information regarding an icon, etc.).

For example, as shown in 401 of FIG. 4, the electronic device 101 may include folders 411 and 413 for classifying multiple icons 412 and 414 corresponding to multiple applications having stored (or installed) in the electronic device 101. The multiple icons 412 and 414 may be configured to execute the at least one application (e.g., execute an application package). In other words, the electronic device may include, in the first folder 411, at least one icon 412 among the multiple icons 412 and 414, so as to be classified from other icons. For example, the first folder 411 may include at least one icon (e.g., identification information of at least one icon) 412 corresponding to at least one application.

In addition, for example, the folder may refer to an electronic data/information management system such as a directory, a catalog, or a category for classifying data or information (e.g., an application package) stored in the electronic device 101. In other words, the electronic device 101 may classify at least part of data or information stored in the electronic device 101 into a specific folder. That is, the electronic device 101 may allow at least part of the data or information stored in the electronic device 101 to be included in a specific folder so that at least part of the data or information stored in the electronic device 101 is separated from the remaining data or information. For example, the electronic device 101 may allow at least some of the multiple applications stored (or installed) in the electronic device 101 to be included in a folder.

According to various embodiments, a folder may include a subfolder. For example, as shown in 401 of FIG. 4, the electronic device 101 may include a second folder 413 included in the first folder 411, and the second folder 413 may include at least one icon 414 and/or an application package corresponding to at least one application in the electronic device 101.

According to various embodiments, a folder may have information for indicating the folder. For example, a folder may have a folder name. In other words, the electronic device 101 may configure a specific folder name for a specific folder. For example, the electronic device 101 may configure a first folder name for a first folder.

According to various embodiments, the electronic device 101 may provide information included in a specific folder. For example, the electronic device 101 may be configured to identify specific data or specific information (e.g., at least one icon corresponding to at least one application) included in a specific folder by referring to the specific folder, and may provide the identified specific data or specific information in the form (visual form, auditory form, etc.) of capable of being identified by a user.

According to various embodiments, screens 402, 403, and 404 of the folder may be displayed. The screen of the folder may include an area 421 (and/or a graphic user element (GUI)) in which a folder name (or folder label) for a specific folder is displayed, and an area 422 (and/or GUI) in which icons included in the specific folder are displayed, and an area 423 (and/or GUI) in which an application for a specific folder is recommended.

For example, as shown in reference numeral 402 of FIG. 4, the electronic device 101 may display an icon for a specific folder and, and when the icon is selected, may be configured to identify the specific folder (e.g., an identification number for the icon of the specific folder), and display the screen of the identified specific folder.

In addition, for example, as shown in reference numeral 403 of FIG. 4, the electronic device 101 may display a bar-shaped folder screen. The bar-shaped folder screen may be displayed based on a call event. The call event may include an input of dragging a designated area (e.g., an edge area of the display) of the display of the electronic device 101.

In addition, for example, as shown in 404 of FIG. 4, the electronic device 101 may divide the entire screen and display data and/or information (e.g., icons corresponding to applications), which is included in a folder, on the divided screen.

According to various embodiments, the electronic device 101 may display folder-related information in the form of being associated with an icon corresponding to the folder. For example, the electronic device 101 may display a folder name regarding a folder in an area (neighboring area) within a preconfigured distance from the icon together with the icon corresponding to the folder.

Hereinafter, operations of the electronic device 101 according to various embodiments will be described. The operations described below may be stored in the form of instructions or program code for executing a corresponding function in a memory, a program, or an application. When instructions or program codes are executed, the processor 120, 311, or 321 may be configured to control to perform a related operation.

Hereinafter, an example of an operation of the electronic device 101 according to various embodiments will be described.

According to various embodiments, the electronic device 101 may be configured to identify a folder name related to applications, and may provide a service related to an application based on the identified folder name.

Figure 5:
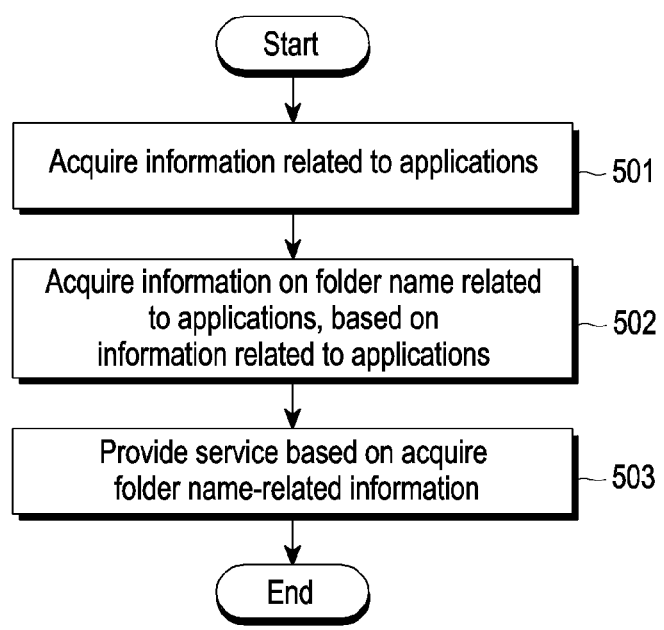
FIG. 5 is a flowchart illustrating an example of an operation of an electronic device according to various embodiments.

FIG. 5 is a flowchart for explaining an example of an operation of an electronic device 101 according to various embodiments. According to various embodiments, the operations illustrated in FIG. 5 are not limited to the illustrated order and may be performed in various orders. In addition, according to various embodiments, more operations than the operations illustrated in FIG. 5 or at least one operation fewer than those thereof may be performed. Hereinafter, FIG. 5 will be described with reference to FIG. 6.

Figure 6:
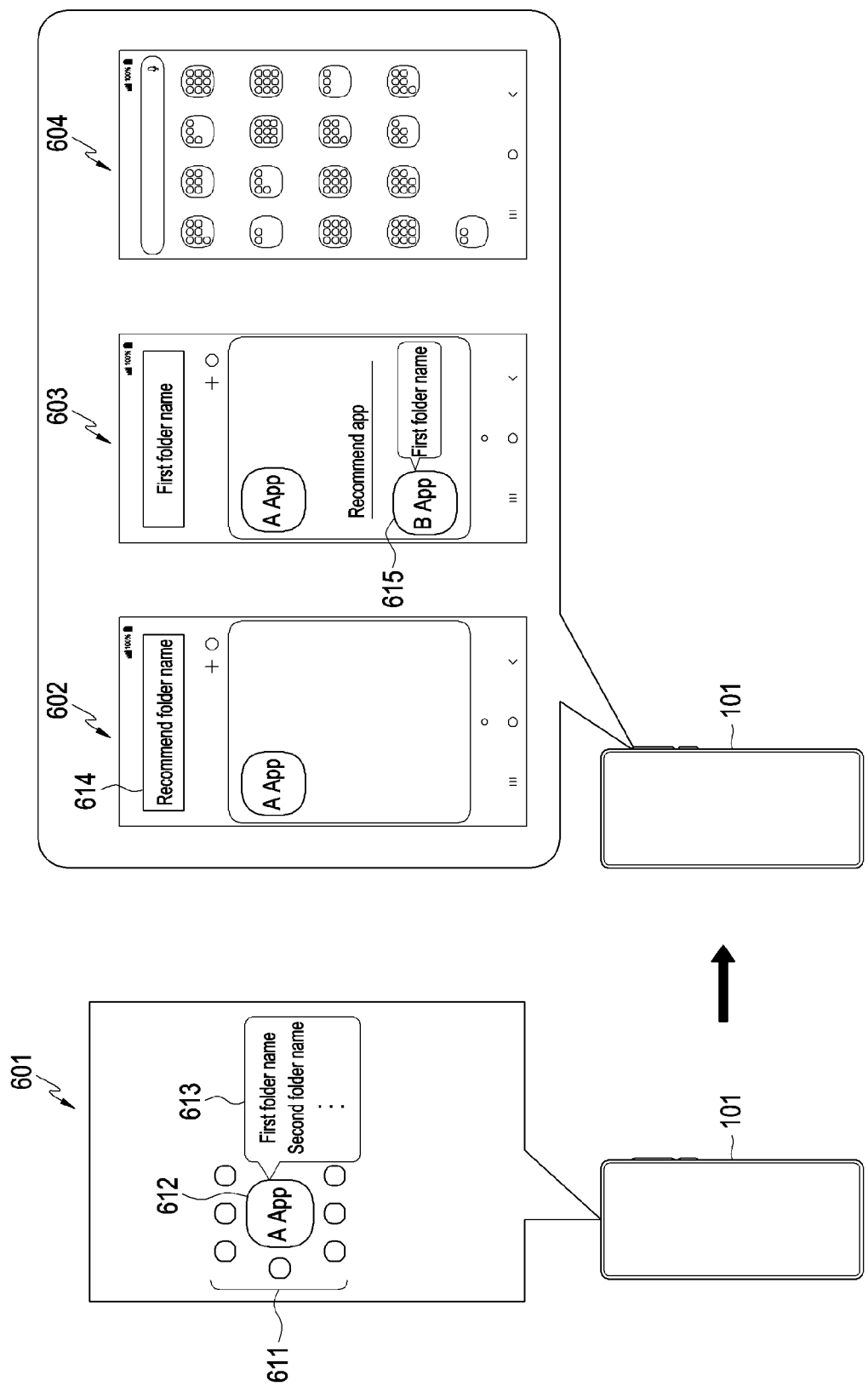
FIG. 6 illustrates an example of an operation of an electronic device according to various embodiments.

FIG. 6 illustrates an example of an operation of the electronic device 101 according to various embodiments.

According to various embodiments, the electronic device 101 (e.g., the at least one processor 120) may acquire information related to applications in operation 501.

According to various embodiments, the electronic device 101 (e.g., at least one processor 120) may be configured to store (or install) multiple applications. The multiple applications may be various types of applications including a native application, a web application, and a hybrid application. For example, the application may include home, dialer, slice management service (SMS)/Multimedia Messaging Service (MMS), instant message (IM), browser, camera, alarm, contacts, voice recognition, email, calendar, media player, album, watch, health (e.g., measurement of an exercise amount or blood sugar, and the like.), or environmental information (e.g., barometric pressure, humidity, or temperature information) applications. According to an embodiment, the application may further include an information exchange application (not shown) capable of supporting information exchange between the electronic device 101 and the external electronic device 101. The information exchange application may include, for example, a notification relay application for transmitting designated information (e.g., call, message, or alarm) to the external electronic device 101, or a device management application for managing the external electronic device 101. The notification relay application may transfer, for example, notification information corresponding to an event (e.g., mail reception) generated in another application (e.g., email application) of the electronic device 101 to the external electronic device 101, or may receive the notification information from the external electronic device 101 and provide the received notification information to a user of the electronic device 101. The device management application may control, for example, the power (e.g., turn-on or turn-off) of the external electronic device 101 communicating with the electronic device 101 or some elements thereof (e.g., a display or a camera module), or functions (e.g., brightness, resolution, or focus of the display or camera module). The device management application may additionally or alternatively support installation, deletion, or update of an application operating in the external electronic device 101.

According to various embodiments, the electronic device 101 (e.g., at least one processor 120) may acquire information for describing applications, as information related to the applications. For example, the electronic device 101 may be configured to identify applications stored in the electronic device 101 (e.g., identify an application package list), and acquire various pieces of information for describing the identified applications from an external device (e.g., an application distribution server) 320 for providing the application. The various pieces of information may include package information including information such as description, company, and AppsName. The various pieces of information may be based on web page information included in the external device (e.g., the application distribution server). In addition, for example, the electronic device 101 may be configured to search for information describing an application from a web server and acquire the retrieved information. In addition, for example, the electronic device 101 may extract information related to an application from multiple application pages (or application states) included in the application.

According to various embodiments, the electronic device 101 (e.g., the at least one processor 120) may acquire information about a folder name related to applications based on information related to applications in operation 502. The information about the folder name may include information indicating a folder name related to applications. For example, as shown in reference numeral 601 of FIG. 6, the electronic device 101 may be configured to identify folder names (first folder name and second folder name) 613 for a specific application (e.g., the A-th app) 612 among multiple applications 611.

According to various embodiments, the electronic device 101 (e.g., the at least one processor 120) may be configured to generate a folder name based on information related to specific applications. For example, the electronic device 101 may be configured to identify a keyword, which is extracted from information related to a specific application, as a folder name for a folder including the specific application. The operation of extracting the keyword by the electronic device 101 will be described later with reference to FIGS. 7 to 10.

According to various embodiments, the electronic device 101 (e.g., the at least one processor 120) may be configured to identify at least one folder name corresponding to the acquired information related to applications from among multiple predetermined folder names. For example, the electronic device 101 may be configured to identify a folder name related to the application related information among multiple folder names by comparing the acquired information related to applications and the weight value information about the folder name. An operation of identifying the folder name by the electronic device 101 will be described in detail later with reference to FIGS. 7 to 10.

According to various embodiments, the electronic device 101 (e.g., the at least one processor 120) may provide a service based on information about folder names of applications in operation 503.

For example, the electronic device 101 (e.g., at least one processor 120) may be configured to provide a recommended folder name (e.g., display the recommended folder name on the display) based on information on folder names of applications as shown in reference numeral 602 of FIG. 6. When generating a folder for a specific application, the electronic device 101 may be configured to recommend the acquired folder name for the specific application as a folder name of the generated folder (indicated by reference numeral 614). An operation of providing the recommended folder name by the electronic device 101 will be described later with reference to FIGS. 13 to 17.

In addition, for example, the electronic device 101 (e.g., at least one processor 120) may be configured to provide a recommended application for a specific folder based on information on folder names of applications as shown in reference numeral 603 of FIG. 6. The electronic device 101 may be configured to identify a folder name of a specific folder, and recommend an application corresponding to the identified folder name based on information on folder names of applications (indicated by reference numeral 615). The operation of providing the recommended application by the electronic device 101 will be described later with reference to FIGS. 23 to 27.

In addition, for example, the electronic device 101 (e.g., at least one processor 120) may be configured to arrange multiple applications in units of folders as shown in reference numeral 604 of FIG. 6. When arranging multiple applications installed in the electronic device 101, the electronic device 101 may be configured to generate a folder having a specific folder name, and include applications having a specific folder name in the generated folder based on information about the folder names of the applications. An operation of arranging the applications of the electronic device 101 in units of folders will be described later with reference to FIGS. 28 to 30.

As described above, during generation of a folder, the electronic device 101 may provide a user with at least two folder names related to applications included in the folder, thereby eliminating the inconvenience of a user generating a folder name. In addition, since the electronic device 101 may recommend at least one application related to a folder at the time of folder generation, unnecessary switching of the execution screen is reduced, thereby reducing the operational burden of the electronic device and eliminating the user's inconvenience.

Hereinafter, another example of an operation of the electronic device 101 according to various embodiments will be described.

According to various embodiments, the electronic device 101 may be configured to acquire information on folder names related to applications based on previously learned information on folder names.

Figure 7:
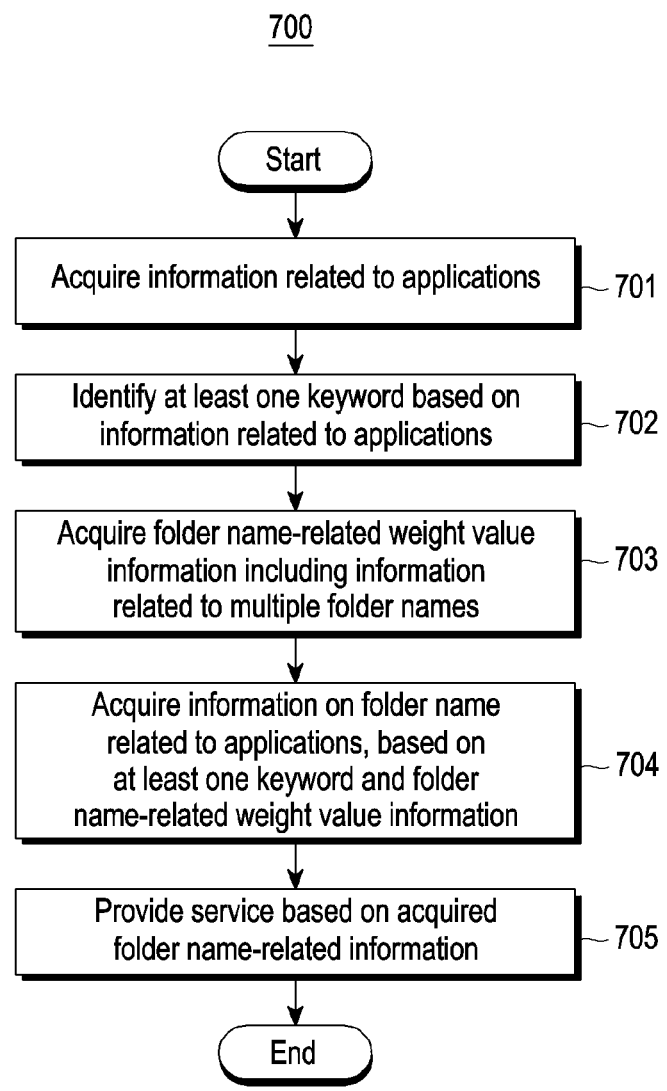
FIG. 7 is a flowchart illustrating another example of an operation of an electronic device according to various embodiments.

FIG. 7 is a flowchart illustrating another example of an operation of the electronic device according to various embodiments. According to various embodiments, the operations illustrated in FIG. 7 are not limited to the illustrated order and may be performed in various orders. In addition, according to various embodiments, more operations than those illustrated in FIG. 7 or at least one operation fewer than those thereof may be performed. Hereinafter, FIG. 7 will be described with reference to FIGS. 8 to 10.

Figure 8:
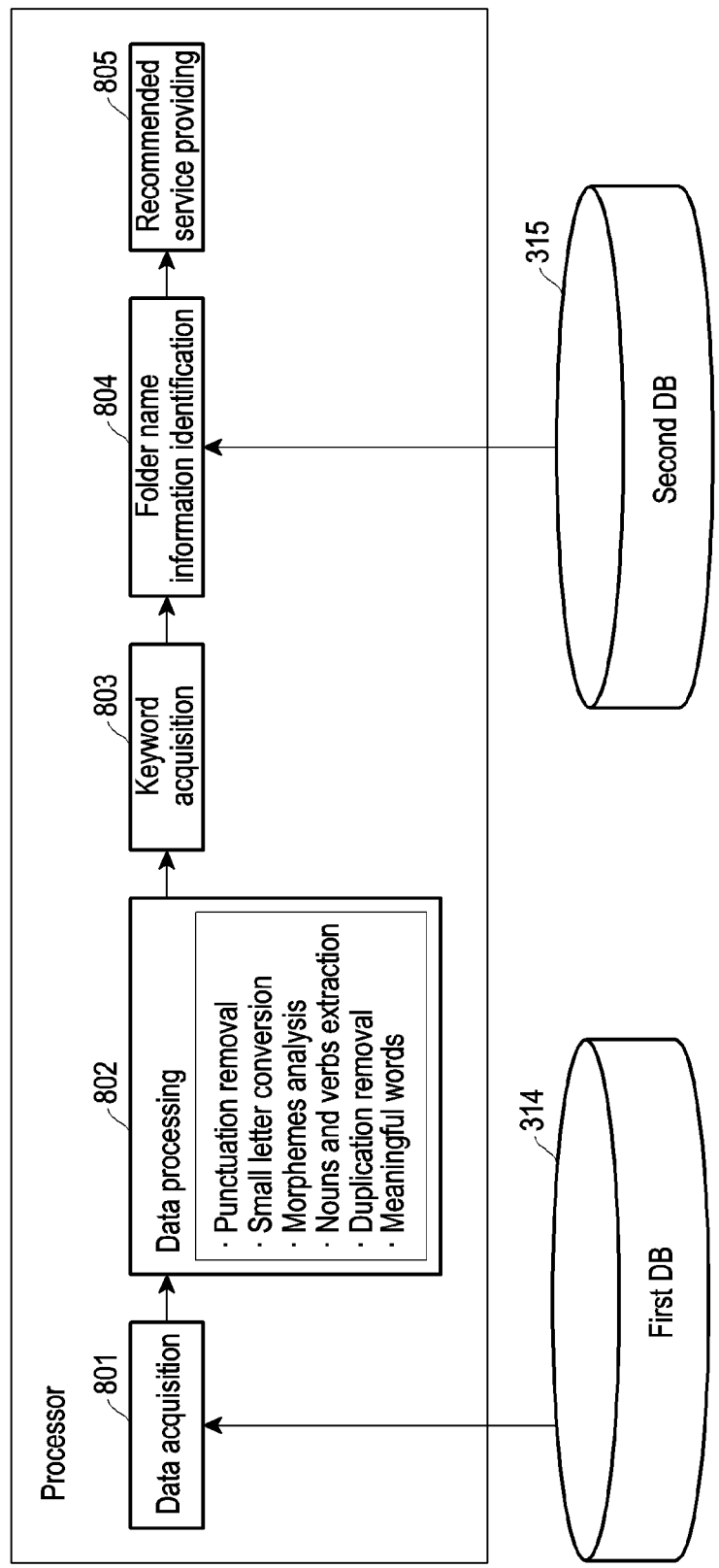
FIG. 8 illustrates another example of an operation of an electronic device according to various embodiments.
Figure 9:
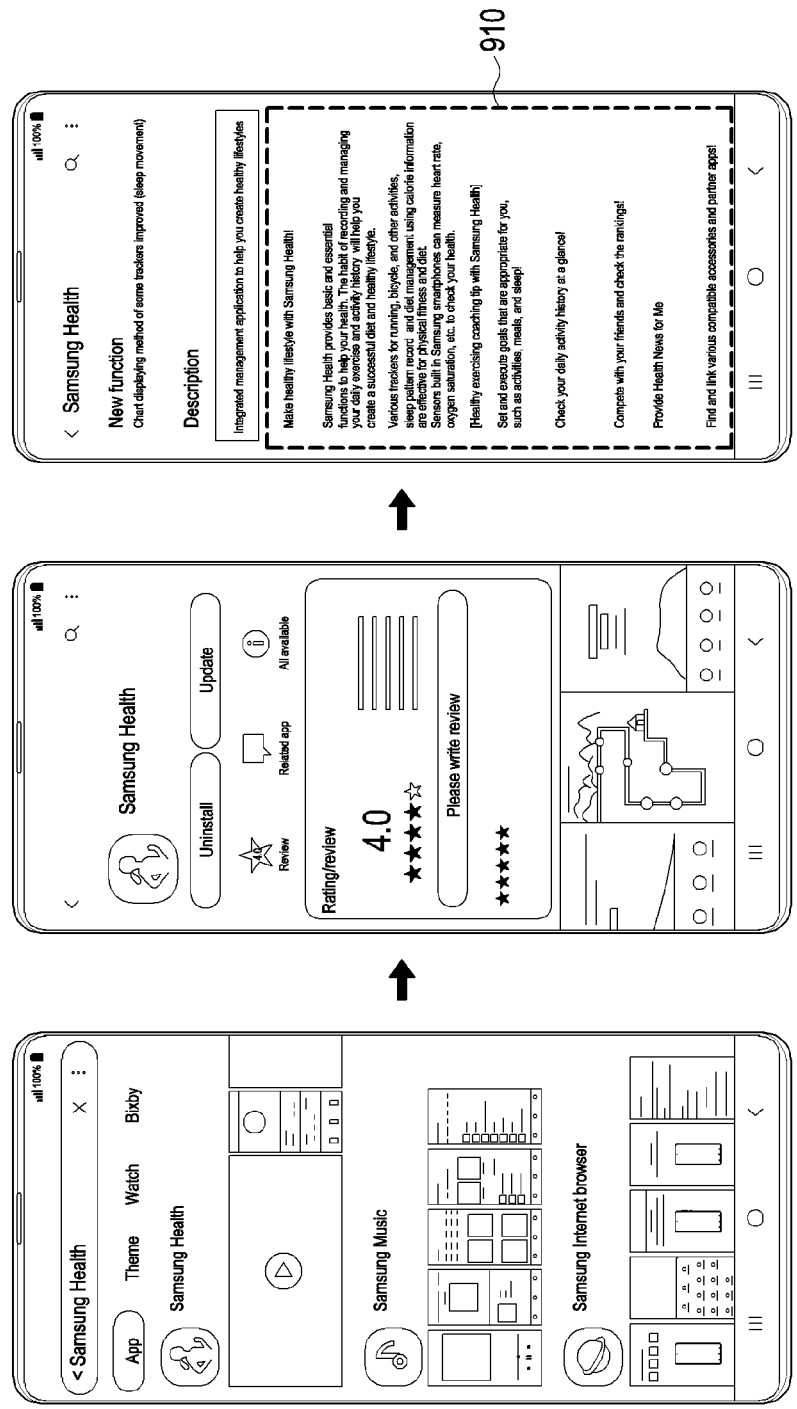
FIG. 9 illustrates an example of information on an application according to various embodiments.
Figure 10:
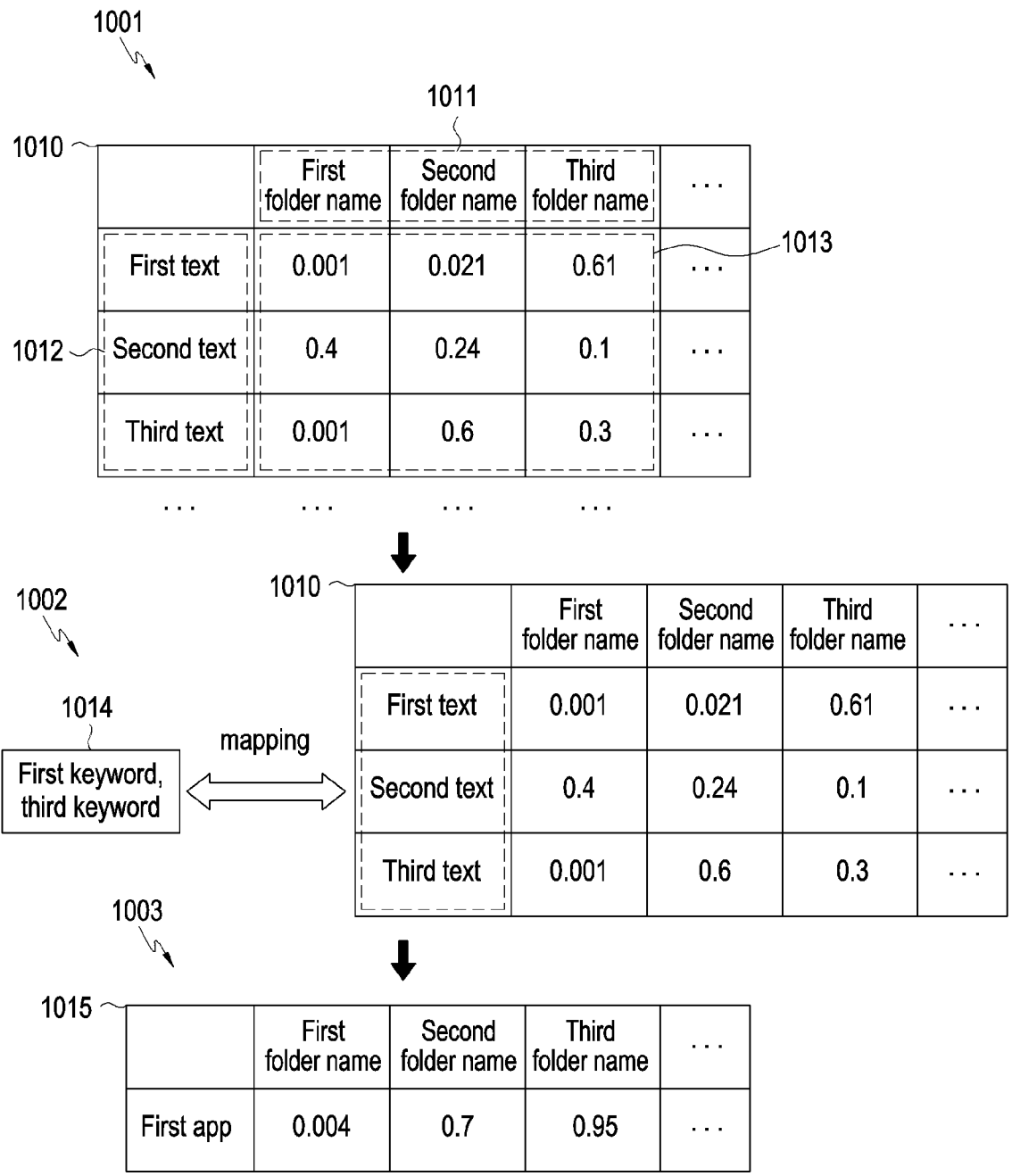
FIG. 10 illustrates an example of an operation of an electronic device for acquiring information on folder names related to applications based on information on applications and weight value information about a folder name according to various embodiments.

FIG. 8 illustrates another example of an operation of the electronic device 101 according to various embodiments. FIG. 9 illustrates an example of information on an application according to various embodiments. FIG. 10 illustrates an example of an operation of acquiring information about a folder name related to applications based on weight value information about a folder name and information about an application of the electronic device 101 according to various embodiments. The value for the weight described in FIG. 10 is only an example and is not limited thereto, and may be configured to be various values.

Referring to FIGS. 7 to 10, in a method 700, the electronic device 101 (e.g., the at least one processor 120) may be configured to acquire information related to applications in operation 701. For example, as shown in reference numeral 801 of FIG. 8, the electronic device 101 may be configured to acquire, from the first database 314 which is an application database, information related to an application (e.g., text information regarding "Create a healthy lifestyle with Samsung Health! Samsung Health provides basic, but mandatory features that help you improve your health. The habit of recording and managing daily exercise and activity history will help you achieve weight loss and lead a healthy lifestyle.")

According to various embodiments, the electronic device 101 (e.g., at least one processor 120) may be configured to receive information related to applications from an external device (e.g., external device 320). For example, the electronic device 101 may be configured to identify applications stored in the electronic device 101 (e.g., identify an application package list), and acquire various pieces of information for describing the identified application from an application distribution server (e.g., an external device 320) for providing applications as shown in FIG. 9. The various pieces of information may include package information including information such as description, company, and Apps Name. The various pieces of information may be based on web page information included in the application distribution server. In addition, for example, the electronic device 101 may be configured to search for information describing an application from a web server and acquire the retrieved information.

According to various embodiments, the electronic device 101 (e.g., at least one processor 120) may be configured to extract information related to applications stored in the electronic device 101. For example, the electronic device 101 may be configured to identify multiple application pages (or application states) configuring each of the applications stored in the electronic device 101, and extract information related to applications included in the multiple application pages.

According to various embodiments, the information related to the applications may include text information related to the applications. For example, as shown in FIG. 9, the electronic device 101 may be configured to acquire, from the external server 320 for providing applications, detailed information for describing applications and additional information related to applications (e.g., an application manufacturing company information (company) and application name (Apps name)). For example, the electronic device may search for and request information related to a specific application (e.g., Samsung Health) using the external server 320, and acquire text 910 for describing the specific application. Not limited to the description above, information related to applications may include various pieces of information including user data related to applications (e.g., data indicating the number of downloads or uses, age group or gender preference data, and SA logging), and the like.

According to various embodiments, the electronic device 101 (e.g., the at least one processor 120) may be configured to identify at least one keyword based on information related to applications in operation 702. For example, as shown in reference numerals 802 and 803 of FIG. 8, the electronic device 101 may be configured to process the acquired application-related information so as to acquire keywords according to applications.

According to various embodiments, the electronic device 101 (e.g., the at least one processor 120) may be configured to process the acquired application related text information into analyzable text information.

For example, the electronic device 101 (e.g., the at least one processor 120) may be configured to remove punctuation marks from the acquired text information. As an example, when the electronic device 101 obtains text information of "Create a healthy lifestyle with Samsung Health!", it is possible to obtain text information of "Create a healthy lifestyle with Samsung Health" in which punctuation marks such as "(", ")", "!", "." are removed.

In addition, for example, the electronic device 101 (e.g., the at least one processor 120) may convert an English character string included in the acquired text information into a lowercase letter. As an example, when the electronic device 101 obtains text information of "Create a healthy lifestyle with Samsung Health!", it is possible to obtain text information of "Create a healthy lifestyle with Samsung Health" in which punctuation marks such as "(", ")", "!", "." are removed.

In addition, for example, the electronic device 101 (e.g., the at least one processor 120) may extract a word of a linguistic unit (e.g., a morpheme) having a meaning included in the acquired text information. As an example, the electronic device 101 may extract "Samsung", "with Health", "healthy", "lifestyle", and the like from the text information "Create a healthy lifestyle with Samsung Health".

In addition, for example, the electronic device 101 (e.g., the at least one processor 120) may extract nouns and verbs from morphemes extracted from the acquired text information. As an example, the electronic device 101 may extract the nouns "Samsung", "Health", "health", "lifestyle", etc., and the verb "create", and the like, from the text information "Create a healthy lifestyle with Samsung Health".

In addition, for example, the electronic device 101 (e.g., the at least one processor 120) may remove meaningless words and/or duplicate words from the extracted noun and verbs.

The above-described processing operation of the electronic device 101 is not limited to the description, and at least one operation may be omitted. In addition, the processing operation of the electronic device 101 may be performed in a different order than that shown and/or described, or at the same time.

According to various embodiments, the electronic device 101 (e.g., at least one processor 120) may be configured to identify at least one keyword. For example, the electronic device 101 may be configured to identify at least one keyword based on the finally processed pieces of text information. For example, the electronic device 101 may be configured to identify at least one keyword by excluding information not related to a service (e.g., a service related to a folder name) from the processed text information.

According to various embodiments, the electronic device 101 (e.g., the at least one processor 120) may acquire weight value information about a folder name including information related to multiple folder names in operation 703. For example, the electronic device may acquire weight value information about a folder name from the second database 315.

According to various embodiments, folder name-related weight value information 1010 may include information indicating a relationship between multiple folder names and information related to an application (e.g., application-related keyword). For example, the folder name-related weight value information 1010 may include multiple folder names and weight values for pieces of information related to an application (e.g., application-related keyword) according to the respective multiple folder names. For example, as shown in reference numeral 1001 of FIG. 10, the folder name-related weight value information 1010 may store a weight value 1013 of multiple keywords (e.g., first text, second text, third text, . . . ) 1012 configured according to the respective multiple folder names (e.g., first folder name, second folder name, third folder name, . . . ) 1011. For example, the first text has a first weight value (e.g., 0.001) for a first folder name, a second weight value (e.g., 0.021) for a second folder name, and a third weight value (e.g., 0.61) for a third folder name. The weight values described above are examples, and are not limited thereto, and may be configured to be various values. In addition, for example, the folder name-related weight value information 1010 may include a weight value for each additional information related to an application (e.g., image information other than text information) in addition to keywords (e.g., text information) configured according to the respective multiple folder names. The folder name-related weight value information 1010 is learned from another external device (e.g., 320) and may be provided to the electronic device 101, which will be described later with reference to FIGS. 11 to 12.

According to various embodiments, the multiple folder names 1011 may be predesignated. In other words, multiple folder names 1011 are predesignated for a folder generated in the electronic device 101, and when a folder is generated, a specific folder name among the multiple folder names may be selected as the folder name of the generated folder. The multiple predetermined folder names 1011 will be described later with reference to FIG. 11.

According to various embodiments, the weight value 1013 of information related to the application for the folder name may indicate a similarity between the folder name and the information. In other words, the weight value 1013 may indicate a similarity between the application including the corresponding information and the corresponding folder name (e.g., the higher a weight value, the higher a similarity between the folder name and the application).

According to various embodiments, the electronic device 101 (e.g., the at least one processor 120) may be configured to acquire folder name information 804 related to applications, based on at least one keyword and the folder name-related weight value information 1010, in operation 704. For example, as shown in reference numeral 1002 of FIG. 10, the electronic device 101 may be configured to, by referring to the folder name-related weight value information 1010 and at least one keyword 1014 extracted from information on a specific application, acquire information on a folder name for a specific application (e.g., a weight value for at least one folder name of a specific application) 1015 as shown in reference numeral 1003 of FIG. 10.

According to various embodiments, the electronic device 101 (e.g., the at least one processor 120) may be configured to compare (or map) the extracted at least one keyword 1014 with the acquired folder name-related weight value information 1010, so as to identify a weight value 1015 according to the respective multiple folder names. For example, as shown in reference numeral 1002 of FIG. 10, the electronic device 101 may be configured to compare the acquired specific application-related keywords 1014 (e.g., first text and third text) and pieces of information related to the application included in the folder name-related weight value information 1010, so as to identify the weight value 1015 according to the respective multiple folder names. The electronic device 101 may be configured to identify pieces of information corresponding to at least one keyword 1014 included in the folder name-related weight value information 1010 (e.g., having a similarity which is identical or which has a preconfigured value or higher), and identify the weight value 1013 assigned to each of multiple folder names corresponding to the identified pieces of information. For example, the electronic device 101 may be configured to identify a weight value (e.g., a first weight value shown in the drawing) corresponding to a first keyword (e.g., a first text), and identify a weight value (e.g., a second weight value) corresponding to a second keyword. The electronic device 101 may be configured to add up (or take an average of) the identified weight values (e.g., the first weight value and the second weight value), and as shown in reference numeral 1003 of FIG. 10, to identify the weight value 1015 for each of multiple folder names related to a specific application.

According to various embodiments, the electronic device 101 (e.g., the at least one processor 120) may be configured to provide a service 805 based on the information about the folder name (e.g., a weight value according to each of multiple folder names related to applications), which is acquired in operation 705. For example, the electronic device 101 may be configured to provide a service (e.g., folder name recommendation, application recommendation, and folder arrangement) having been described above with reference to FIG. 6, based on the acquired weight value according to each of the multiple folder names related to a specific application as shown in reference numeral 1003 of FIG. 10. Each service will be described later.

Hereinafter, an example of operations of the electronic device 101 and the external device 320 according to various embodiments will be described.

According to various embodiments, the electronic device 101 may receive weight value information about a folder name, the weight value information having been learned from the external device 320 (e.g., an application distribution server).

Figure 11:
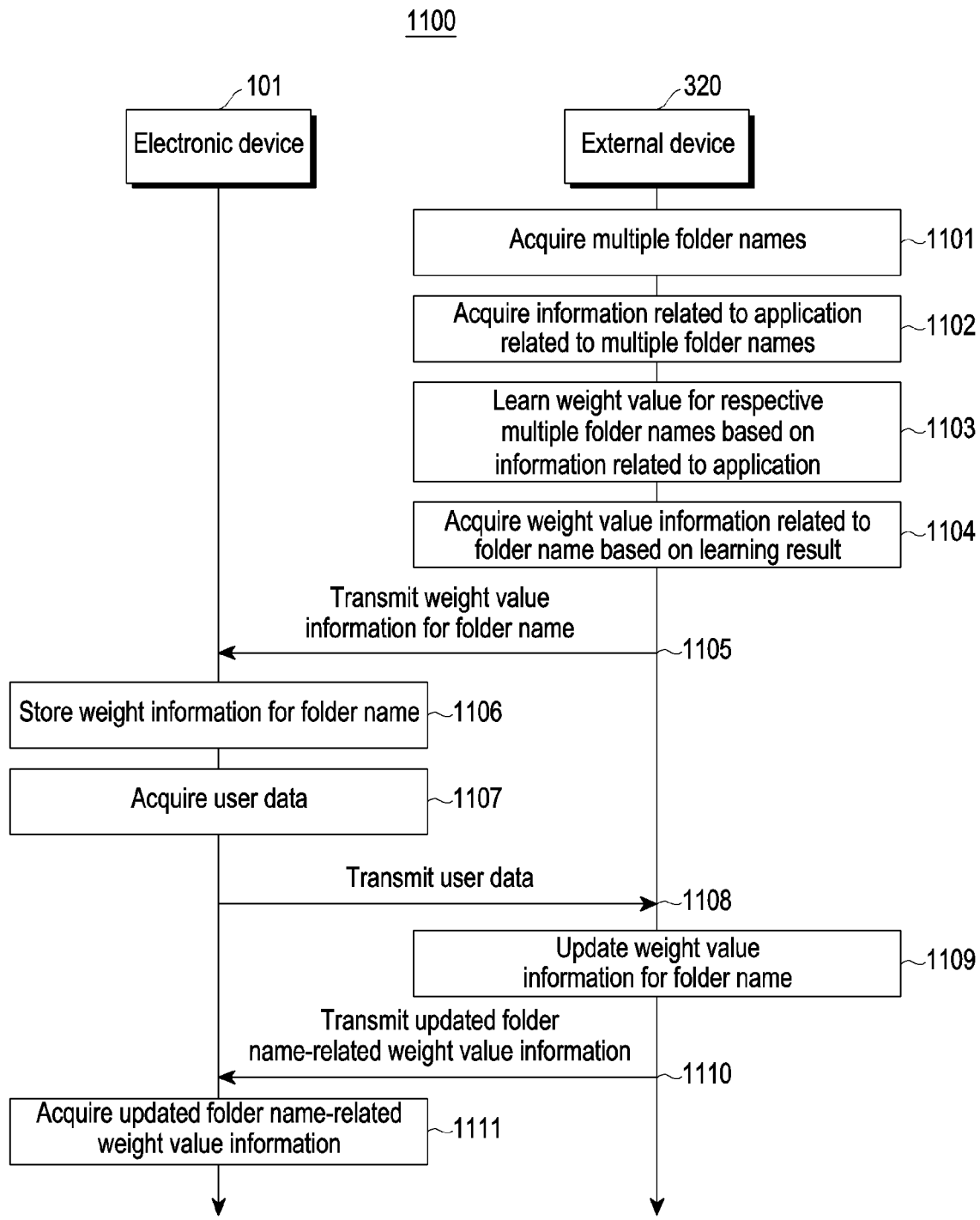
FIG. 11 is a flowchart illustrating an example of operations of an electronic device and an external device according to various embodiments.

FIG. 11 is a flowchart illustrating an example of operations of the electronic device and an external device according to various embodiments. According to various embodiments, the operations illustrated in FIG. 11 are not limited to the illustrated order and may be performed in various orders. In addition, according to various embodiments, more operations than the operations illustrated in FIG. 11 may be performed, or at least one operation fewer than those thereof may be performed. Hereinafter, FIG. 11 will be described with reference to FIG. 12.

Figure 12:
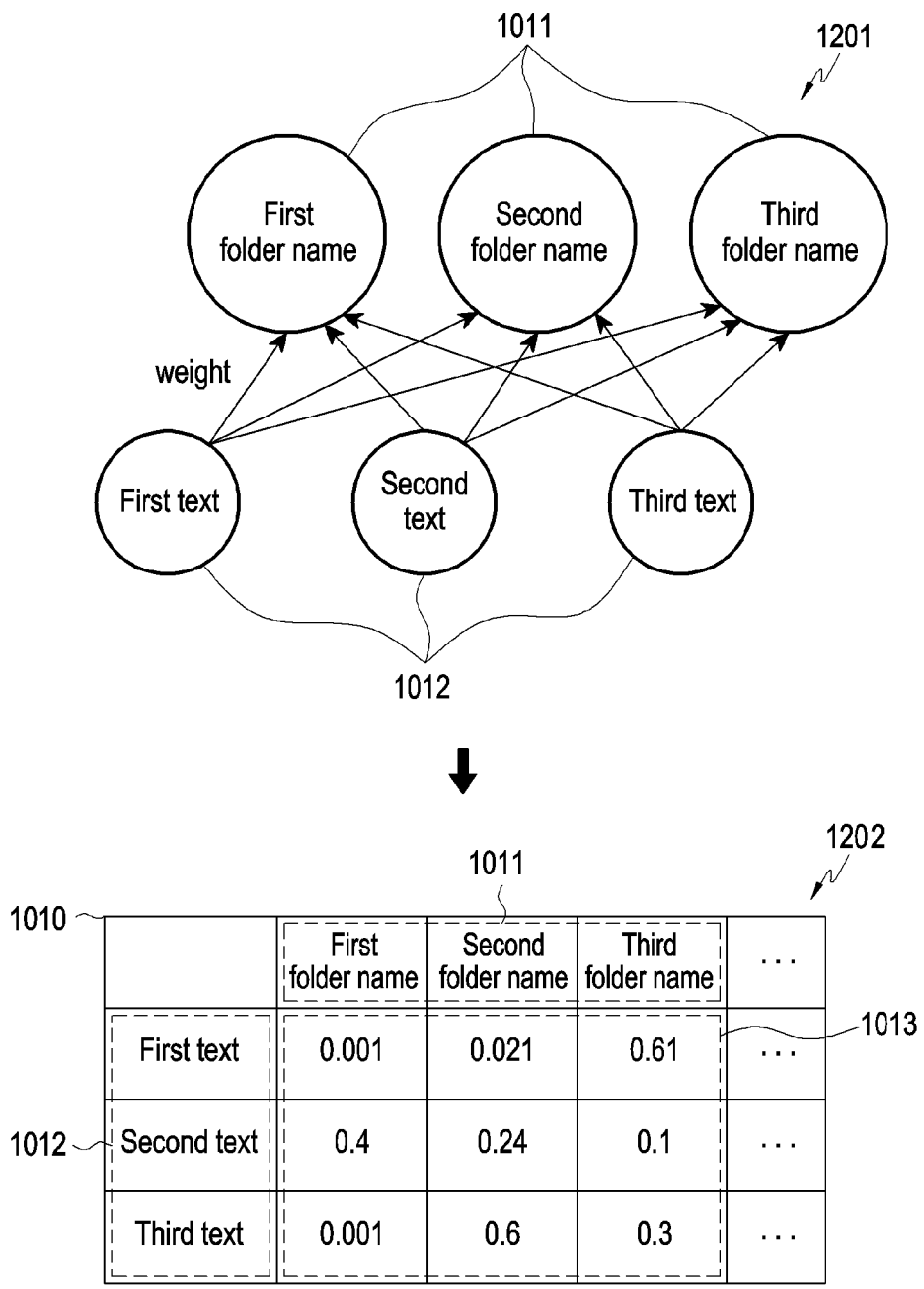
FIG. 12 illustrates an example of an operation of an external device for learning weight value information about a folder name according to various embodiments.

FIG. 12 illustrates an example of an operation of learning weight value information about a folder name of the external device 320 according to various embodiments. The value for a weight value described in FIG. 12 is only an example and is not limited thereto, and may be configured to be various values.

Referring to FIGS. 11 and 12, in a method 1100, the external device 320 may acquire multiple folder names in operation 1101.

According to various embodiments, the multiple folder names 1011 may be predesignated. For example, when a folder is generated, the external device 320 may acquire and store multiple predetermined folder names for the generated folder. The multiple folder names are generated to easily identify application types, and may include, for example, social, community message, chat, game, and the like.

For example, the external device 320 may acquire and store multiple predetermined folder names from a user of the external device 320 (e.g., an administrator of the application distribution server).

In addition, for example, the external device 320 may generate multiple folder names and store the multiple generated folder names.

For example, the external device 320 may generate multiple folder names based on information related to multiple applications. The external device 320 may acquire detailed information related to applications and extract keywords from the acquired detailed information. The external device 320 may generate the extracted keywords as folder names. In addition, the external device 320 may cluster the extracted keywords based on a specified criterion, select a representative keyword from the clustered keyword group, and generate the selected representative keyword as a folder name. Since clustering is a well-known technique, a description thereof will be omitted. In addition, the external device 320 may generate, as a folder name, at least one keyword with high frequency (e.g., having a greater number than a preconfigured threshold value) among the extracted keywords.

As another example, the external device 320 is not limited to the above description, and may generate multiple folder names based on various pieces of information other than the application (e.g., information written on a web page, such as news information, SNS information, etc.).

According to various embodiments, the external device 320 may acquire pieces of information related to applications in operation 1102. Since operation 1102 of the external device 320 may be performed like operation 501 of the electronic device 101 and operation 701 of the electronic device 101 described above, the duplicate description will be omitted.

According to various embodiments, the external device 320 may learn a weight value for each of multiple folder names based on pieces of information related to an application in operation 1103. According to various embodiments, as shown in reference numeral 1201 of FIG. 12, the external device 320 may learn a weight value for each of multiple folder names 1011 based on application-related information (e.g., multiple keywords 1012), so as to learn a weight value for each of the multiple folder names 1011 (a first folder name to a third folder name) according to each of the multiple keywords (a first keyword to a third keyword). For example, based on a learning algorithm for learning a weight value such as term frequency-inverse document frequency (TF-IDF), the electronic device 101 may learn weight values for the multiple folder names 1011 according to the multiple keywords 1012. For example, the external device 320 may acquire information about a specific folder having a specific folder name and applications corresponding to icons included in the specific folder. The external device 320 may acquire keywords related to applications included in a specific folder, and may identify the weight value of a keyword for a specific folder name according to the frequency of occurrence of the acquired keyword (e.g., when the frequency is high, the external device may assign a higher weight value to a specific folder name). As a result, the external device 320 may assign a weight value for each of the multiple keywords for each of the multiple folder names, so as to acquire the folder name-related weight value information 1010 including the weight values for the multiple folder names 1011 according to the respective multiple keywords 1012.

According to various embodiments, the external device 320 may acquire folder name-related weight value information 1010 including a weight value for each of multiple folder names according to keywords related to an application, based on a result of the learning, in operation 1104. For example, as shown in reference numeral 1202 of FIG. 12, the external device 320 may include folder names-related weight value information 1010 including information on weight values 1013 of multiple keywords 1012 (e.g., first text, second text, third text . . . ) configured according to the respective multiple folder names 1011 (e.g., first folder name, second folder name, third folder name, . . . , nth folder name). A duplicate description related to the folder name-related weight value information 1010 will be omitted.

According to various embodiments, the external device 320 may transmit the folder name-related weight value information obtained in operation 1105 to the electronic device 101.

According to various embodiments, when various types of events are satisfied, the external device 320 may transmit the folder name-related weight value information to the electronic device 101. For example, when the electronic device 101 accesses the external device 320, the external device 320 may transmit the folder name-related weight value information to the electronic device 101. In addition, for example, the external device 320 may transmit the folder name-related weight value information to the electronic device 101 at a preconfigured period so that the folder name-related weight value information is updated in the electronic device 101.

According to various embodiments, the electronic device 101 may store weight value information about a folder name received from the external device 320 in operation 1106. The electronic device 101 may be configured to identify information on a folder name for each of the applications stored in the electronic device 101 based on the stored folder name-related weight value information.

According to various embodiments, the electronic device 101 may acquire user data in operation 1107. For example, the user data may include SA Logging information. In addition, for example, the user data may include user-related data in operations described below. For example, the user data may include information on a folder name selected by the user from among at least two recommended folder names. As another example, the user data may include information on an application selected by the user from among applications recommended for a folder having a specific folder name.

According to various embodiments, the electronic device 101 may acquire data related to a user who uses the electronic device 101. For example, the electronic device 101 may acquire information related to the user's use of an application stored in the electronic device 101 (e.g., the number of uses, etc.). In addition, for example, the electronic device 101 may acquire a folder name to be selected by the user for a folder including at least one icon corresponding to at least one application. In addition, for example, the electronic device 101 may acquire information on a specific application corresponding to a specific icon to be included in a specific folder.

According to various embodiments, the electronic device 110 may transmit user data to the external device 320 in operation 1108, and the external device 320 may update weight value information included in the folder name-related weight value information based on the received user data in operation 1109, and may transmit the folder name-related weight value information including the updated weight value information to the electronic device 101 in operation 1110.

For example, the external device 320 may adjust a folder name-related weight value 1013 for each text included in the folder name-related weight value information 1010 based on user data received from the electronic device 101. As an example, when user data indicating that a folder name of a folder including an icon corresponding to a specific application related to a specific keyword is configured as a specific folder name is received, the external device 320 may adjust the specific folder name of the specific keyword to have a higher weight value. As another example, when user data indicating that a folder name of a folder including an icon corresponding to a specific application related to a specific keyword is configured to be another folder name from one folder name is received, the external device 320 may adjust the one folder name of the specific keyword to have a lower weight value.

According to various embodiments, the electronic device 101 may acquire the updated folder name-related weight value information in operation 1111. For example, the electronic device 101 may update the currently stored folder name-related weight value information 1010 with the updated folder name-related weight value information 1010 received from the external device 320. In addition, for example, the electronic device 101 may update the currently stored folder name-related weight value information 1010 based on the acquired user data. A description duplicating with operations 1108 to 1110 of the external device 320 relating to an operation of updating the weight value information about a folder name based on the user data will be omitted.

As described above, as the information (e.g., a weight value) included in the folder name-related weight value information 1010 is updated based on the user data, the accuracy of the acquired information (e.g., information on the folder name according to applications) may be improved. In addition, since a folder name suitable for a user is provided by considering user data, the user's inconvenience in generating the folder name can be eliminated.

Hereinafter, another example of an operation of the electronic device 101 according to various embodiments will be described.

According to various embodiments, the electronic device 101 may generate a folder including at least one icon corresponding to at least one application, and may recommend at least two folder names for the generated folder.

Figure 13:
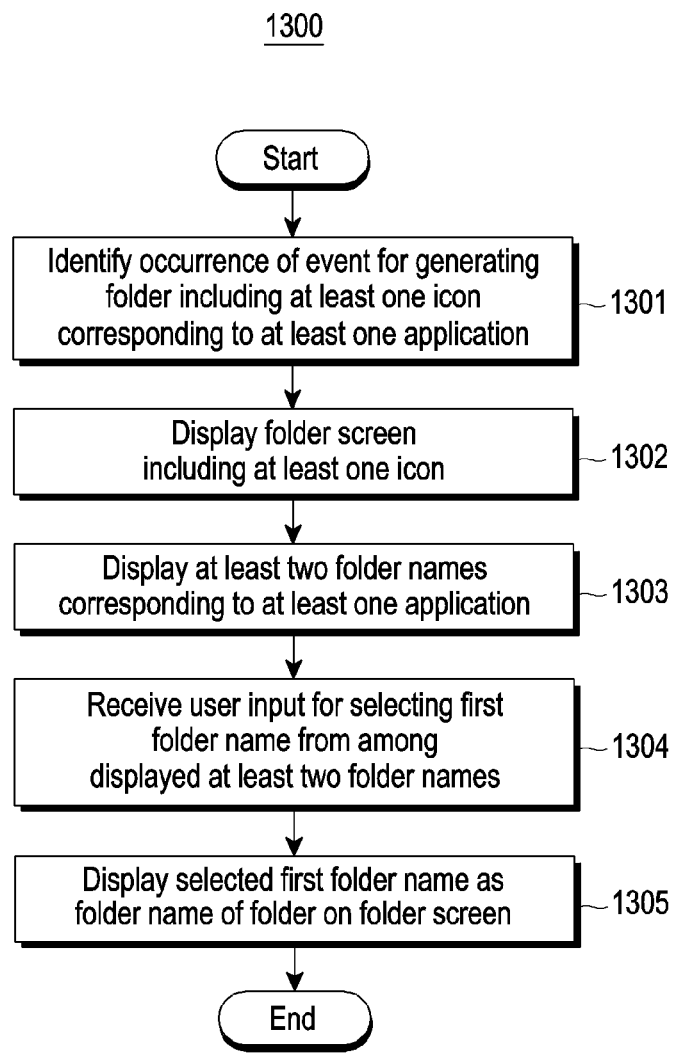
FIG. 13 is a flowchart illustrating another example of an operation of an electronic device according to various embodiments.

FIG. 13 is a flowchart illustrating another example of an operation of the electronic device 101 according to various embodiments. According to various embodiments, the operations illustrated in FIG. 13 are not limited to the illustrated order and may be performed in various orders. In addition, according to various embodiments, more operations than those illustrated in FIG. 13 or at least one operations fewer than those of FIG. 13 may be performed. Hereinafter, FIG. 13 will be described with reference to FIGS. 14 to 15.

Figure 14:
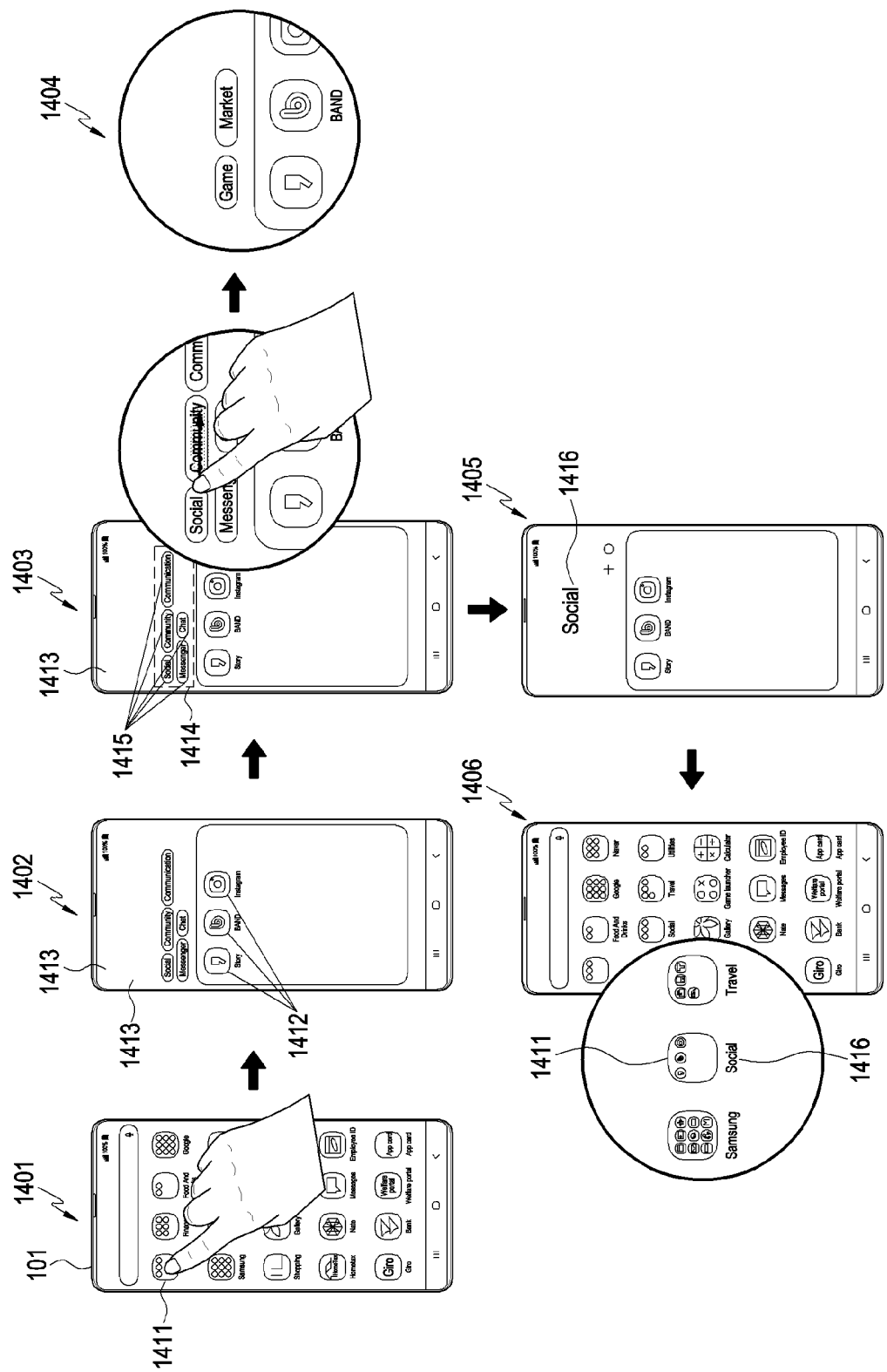
FIG. 14 illustrates an example of an operation of recommending a folder name by an electronic device according to various embodiments.
Figure 15:
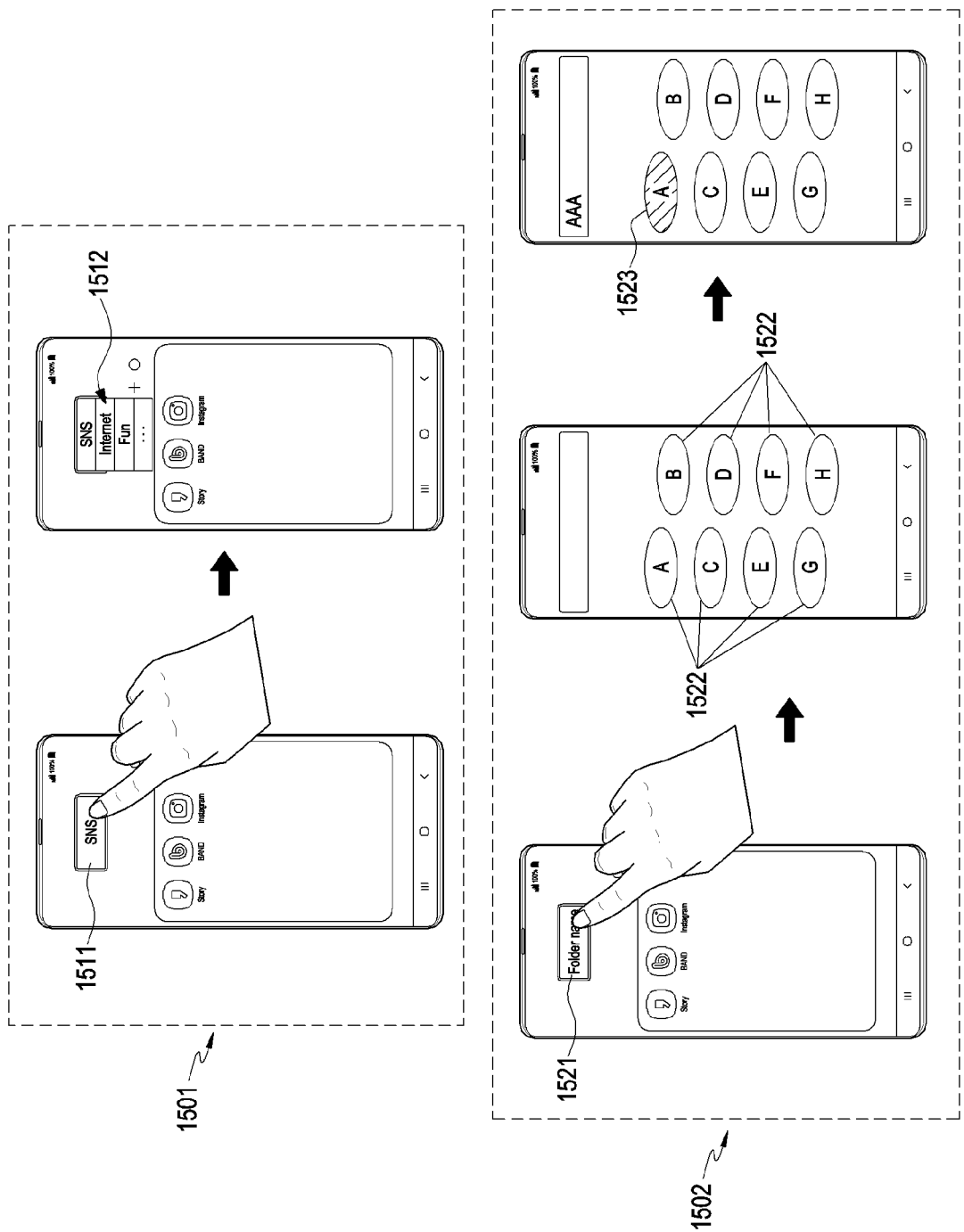
FIG. 15 illustrates an example of an operation of displaying at least two folder names by an electronic device according to various embodiments.

FIG. 14 illustrates an example of a folder name recommendation operation of the electronic device 101 according to various embodiments. FIG. 15 illustrates an example of an operation of displaying at least two folder names of the electronic device 101 according to various embodiments.

Referring to FIGS. 13 to 15, in a method 1300, the electronic device 101 (e.g., the at least one processor 120) may be configured to identify occurrence of an event for generating a folder including at least one icon corresponding to at least one application in operation 1301. For example, the electronic device 101 may generate a folder including at least one icon based on reception of a user input. The operation of generating a folder by the electronic device 101 will be described in detail later with reference to FIGS. 18 to 22.

According to various embodiments, the electronic device 101 (e.g., at least one processor 120) may provide visual information to request configuration of a folder name for a folder when a folder name is not configured for the folder. For example, the electronic device 101 does not display a folder name in an area surrounding the icon corresponding to the folder (e.g., an area within a preconfigured distance from the icon), may display information for requesting configuration of the folder name in the area surrounding the icon (e.g., text information), or may highlight and display the icon.

According to various embodiments, the electronic device 101 (e.g., the at least one processor 120) may display a folder screen including at least one icon in operation 1302. For example, when a folder icon 1411 is selected as shown in reference numeral 1401 of FIG. 14, the electronic device 101 may display a folder screen 1413 including at least one icon 1412 corresponding to at least one application as shown in reference numeral 1402 of FIG. 14.

According to various embodiments, the electronic device 101 (e.g., the at least one processor 120) may display at least two folder names corresponding to the at least one application in operation 1303. For example, the folder screen 1413 may include an area 1414 for displaying folder names. When the folder name for the folder is not selected, the electronic device 101 may display at least two folder names 1415 recommended as a folder name for a folder.

According to various embodiments, the electronic device 101 (e.g., the at least one processor 120) may be configured to acquire at least two folder names related to at least one application corresponding to at least one icon included in the folder. For example, the electronic device 101 may be configured to identify folder names corresponding to at least one application, among multiple predetermined folder names, as folder names to be recommended. The electronic device 101 may be configured to acquire information related to at least one application, and compare the acquired information with multiple predetermined folder names, so as to identify folder names corresponding to the at least one application. In addition, for example, the electronic device 101 may be configured to acquire information related to at least one application, and identify keywords extracted from the acquired information as folder names to be recommended. Since the operation of identifying information on the folder name related to the application of the electronic device 101 is the same as that described above with reference to FIGS. 5 to 9, the duplicated description will be omitted. In addition, the electronic device 101 may recommend at least two folder names by calculating a weight value based on weight value information about a folder name and information related to the application, which will be described later with reference to FIGS. 16 to 17.

According to various embodiments, the electronic device 101 (e.g., at least one processor 120) may display at least two folder names in various formats so as to be identifiable by the user.

For example, as shown in reference numeral 1403 of FIG. 14, the electronic device 101 (e.g., at least one processor 120) may display at least two folder names 1415 on a first area 1414 of a folder screen 1413. The displayed at least two folder names may be displayed in a scrollable manner as shown in reference numeral 1404 of FIG. 14. In other words, when receiving a user's drag input while displaying a part of at least two folder names in the first area, the electronic device 101 may display another part of the at least two folder names in the first area.

In addition, for example, the electronic device 101 (e.g., at least one processor 120) may display the folder names in a drag and drop form as shown in reference numeral 1501 of FIG. 15. The electronic device 101 may display one folder name 1511 among at least two folder names in the first area, and display the other remaining folder names 1512 when the displayed one folder name is selected.

In addition, for example, as shown in reference numeral 1502 of FIG. 15, when receiving a user input to the first area (indicated by reference numeral 1521), the electronic device 101 (e.g., at least one processor 120) may display a screen including at least two folder names 1522. The screen including the at least two folder names 1522 may include a search window for searching for a folder name. When a specific text is input in the search window, the electronic device 101 may highlight (e.g., change visual properties including color, brightness, brightness, etc.) and display a folder name 1523 related to the specific text.

According to various embodiments, the electronic device 101 (e.g., the at least one processor 120) may receive a user input for selecting a first folder name from among displayed at least two folder names in operation 1304. For example, when receiving a user input for selecting one folder name from among at least two folder names being displayed, the electronic device 101 may be configured to identify the one folder name as a folder name for the folder.

According to various embodiments, the electronic device 101 (e.g., the at least one processor 120) may display the selected first folder name as the folder name of the folder on the screen of the folder in operation 1305. For example, as shown in reference numeral 1405 of FIG. 14, the electronic device 101 may display a selected folder name 1416 instead of at least two folder names 1415 displayed in one area (e.g., the first area 1414) of the folder screen. In addition, when the electronic device 101 may display the icon 1411 corresponding to the folder as shown in reference numeral 1406 of FIG. 14, the electronic device 101 may display the selected folder name 1416 in the area surrounding the icon corresponding to the folder (e.g., within a preconfigured distance from the icon).

According to various embodiments, when the at least two folder names 1415 displayed in the first area is replaced by the selected folder name 1416, the electronic device 101 (e.g., the at least one processor 120) may provide a visual effect. For example, the visual effect may be an animation effect in which at least two folder names 1415 disappear and the selected folder name 1416 is displayed. As another example, the visual effect may be an animation effect in which the remaining folder names other than the selected folder name 1416 among at least two folder names 1415 gradually disappear.

According to various embodiments, the electronic device 101 (e.g., at least one processor 120) may visually display a folder name 1416 configured in a folder and at least two folder names 1415 for recommendation differently from each other. For example, the electronic device 101 may display the size, color, brightness, brightness, etc. of at least two folder names 1415 and the selected folder name 1416 differently from each other. For example, referring to reference numerals 1403 and 1405 of FIG. 14, the display size of the selected folder name 1416 may be larger than the display size of the at least two folder names 1415.

As described above, when the electronic device 101 provides a user with at least two folder names related to applications included in a folder during generation of the folder, the user's inconvenience in generation of the folder name can be eliminated.

Hereinafter, another example of the operation of the electronic device 101 will be described.

According to various embodiments of the disclosure, the electronic device 101 may recommend at least two folder names relating to a folder based on weight value information about a folder name and information related to at least one application corresponding to at least one icon included in a folder.

Figure 16:
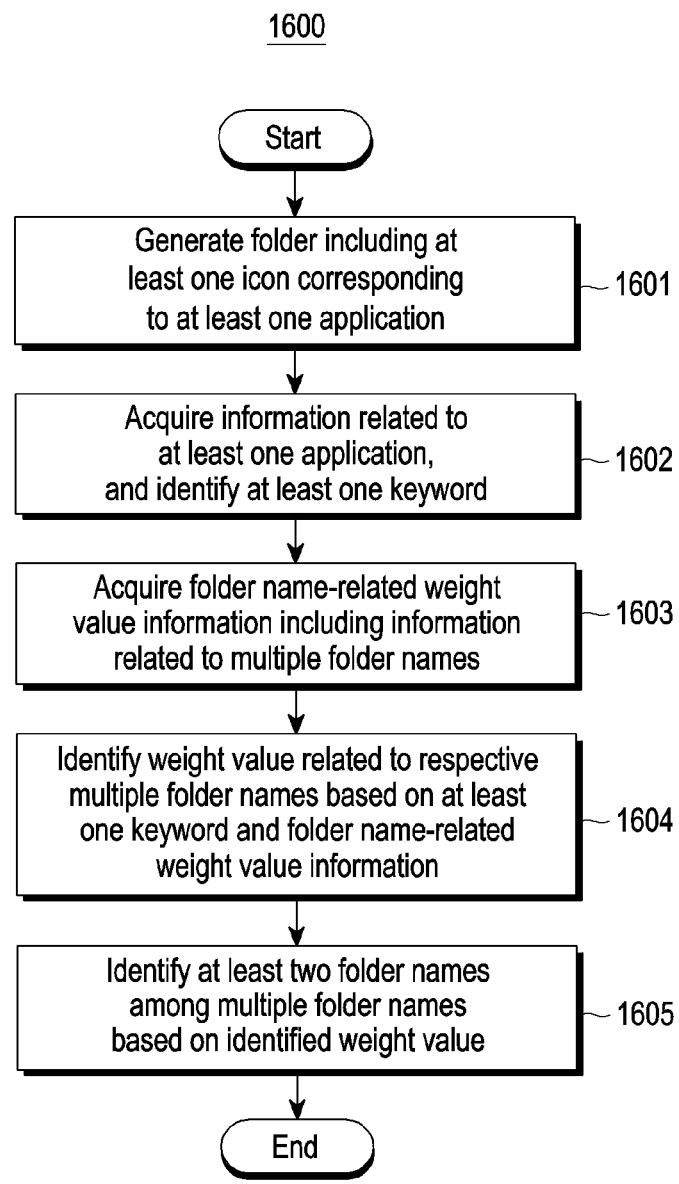
FIG. 16 is a flowchart illustrating still another example of an operation of an electronic device according to various embodiments.

FIG. 16 is a flowchart illustrating another example of an operation of the electronic device according to various embodiments. According to various embodiments, the operations illustrated in FIG. 16 are not limited to the illustrated order and may be performed in various orders. In addition, according to various embodiments, more operations than those illustrated in FIG. 16 or at least one operation fewer than those thereof may be performed. Hereinafter, FIG. 16 will be described with reference to FIG. 17.

Figure 17:
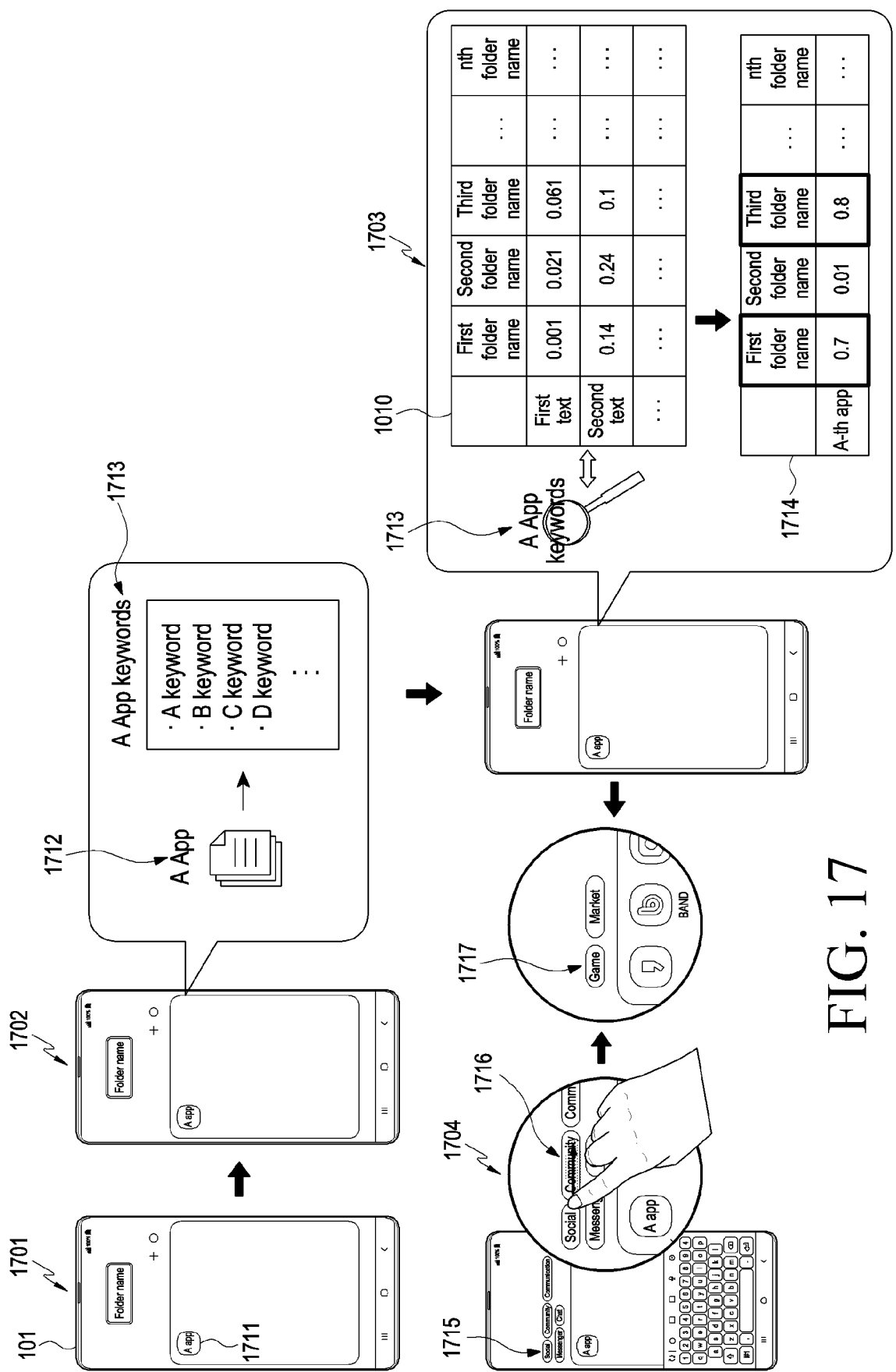
FIG. 17 illustrates an example of an operation of an electronic device for recommending at least two folder names based on weight value information about a folder name and information related to at least one application according to various embodiments.

FIG. 17 illustrates an example of an operation of the electronic device 101 for recommending at least two folder names based on weight value information about a folder name and information related to at least one application according to various embodiments. The value for the weight value described in FIG. 17 is only an example and is not limited thereto and may be configured to be various values.

Referring to FIGS. 16 and 17, in a method 1600, the electronic device 101 (e.g., the at least one processor 120) may generate a folder including at least one icon corresponding to at least one application in operation 1601. For example, the electronic device 101 may generate a folder including at least one icon based on reception of a user input. As shown in reference numeral 1701 of FIG. 17, the electronic device 101 may display at least one icon 1711 corresponding to at least one application on the screen of the generated folder. The operation of generating a folder by the electronic device 101 will be described in detail later with reference to FIGS. 18 to 22.

According to various embodiments, the electronic device 101 (e.g., the at least one processor 120) may be configured to acquire information related to at least one application and identify at least one keyword in operation 1602. For example, as shown in reference numeral 1702 of FIG. 17, the electronic device 101 may be configured to acquire pieces of information related to an application (application A) corresponding to the icon 1711 included in a folder (indicated by reference numeral 1712), and to extract at least one keyword 1713 related to the application from the acquired information. Since the operation of acquiring the information related to the application of the electronic device 101 and the operation of extracting the keyword may be performed as in operations 701 to 702 of the electronic device 101, a duplicate description will be omitted.

According to various embodiments, the electronic device 101 (e.g., the at least one processor 120) may be configured to acquire folder name-related weight value information including information related to multiple folder names in operation 1603. For example, the electronic device 101 may be configured to receive, from a server, the folder name-related weight value information 1010 including weight values for pieces of information related to an application for each of the multiple folder names. A duplicate description related to the folder name-related weight value information 1010 will be omitted.

According to various embodiments, the electronic device 101 (e.g., the at least one processor 120) may be configured to identify a weight value related to each of the multiple folder names based on the at least one keyword and the folder name-related weight value information in operation 1604. For example, as shown in reference numeral 1703 of FIG. 17, the electronic device 101 may be configured to identify a weight value for each of multiple folder names for each of the applications based on the at least one keyword 1713 related to an application and weight value information for each of multiple folder names included in the folder name-related weight value information 1010. In other words, the electronic device 101 may be configured to identify a weight value for each of multiple folder names corresponding to at least one keyword from the folder name-related weight value information 1010. When there are two or more keywords, the electronic device 101 may be configured to add up weight values for the respective multiple folder names identified for the respective keywords or take an average thereof. Since operation 1604 of the electronic device 101 may be performed as in the above-described operation 704 of the electronic device 101, a duplicate description will be omitted.

According to various embodiments, the electronic device 101 (e.g., the at least one processor 120) may be configured to identify at least two folder names among the multiple folder names based on the identified weight value in operation 1605. For example, as shown in reference numeral 1703 of FIG. 17, the electronic device 101 may be configured to identify an application-related weight value 1714 for each of multiple folder names based on the comparison result, and as shown in reference numeral 1704 of FIG. 17, the electronic device may be configured to display at least two folder names 1715 selected based on the identified weight value.

For example, the electronic device 101 (e.g., the at least one processor 120) may be configured to identify a folder name having a weight value equal to or higher than a preconfigured threshold among multiple folder names as a recommended folder name. For example, as shown in reference numeral 1703 of FIG. 17, the electronic device 101 may be configured to identify the identified application-related weight value 1714 for each of multiple folder names, and to identify a first folder name and a third folder name having a weight value equal to or higher than a preconfigured threshold value as a recommended folder name.

In addition, for example, the electronic device 101 (e.g., the at least one processor 120) may be configured to identify, as a recommended folder name, a folder name having the highest weight value among the multiple folder names and a preconfigured number of folder names in descending order of weight values, in which a folder name having the highest weight value goes first. For example, when there is one folder name having a weight value equal to or higher than the preconfigured threshold value, or when the threshold value is not configured, the electronic device 101 may be configured to identify a preconfigured number of folder names in descending order of weight values as recommended folder names.

According to various embodiments, the electronic device 101 (e.g., the at least one processor 120) may be configured to arrange at least two folder names identified based on a weight value and provide the arranged folder names to the user.

For example, the electronic device 101 may display at least two folder names 1715 in descending order of weight values, in which a folder name having the highest weight value goes first. When displaying at least two folder names in a scrollable manner, the electronic device 101 may display a part 1716 having a relatively high weight value shown in reference numeral 1704 of FIG. 17, and when at least two folder names are scrolled, may display a part 1717 having a relatively low weight value.

In addition, for example, the electronic device 101 (e.g., the at least one processor 120) may visually differently display the displayed at least two folder names 1715 in descending order of weight values, in which the highest weight value goes first. For example, the electronic device 101 may display a folder name having a relatively high weight value among at least two folder names to have a large size and may display a folder name having a relatively low weight value to have a small size. As another example, the electronic device 101 may configure, as a first value, at least one of color, brightness, and saturation of a folder name having a relatively high weight value among at least two folder names 1715, and may configure, as a second value, at least one of color, brightness, and saturation of a folder name having a relatively high weight value. The first value may be configured to be greater than or smaller than the second value. The size, color, brightness, saturation, and the like may be configured for each of the folder names and may be gradually configured differently.

On the other hand, the operation of displaying at least two folder names based on the weight value by the electronic device 101 is not limited to the illustration (displaying the folder names on the folder screen), but may be applied to a drop-and-down method or a method of displaying a screen including at least two folder names.

As described above, the electronic device 101 may be configured to identify at least two folder names related to an application included a folder during generation of the folder, based on the learned folder name information and weight value, and thus more accurate folder name can be provided to a user.

Hereinafter, another example of the operation of the electronic device 101 will be described.

According to various embodiments, the electronic device 101 may generate a folder including at least one icon based on a user input.

Figure 18:
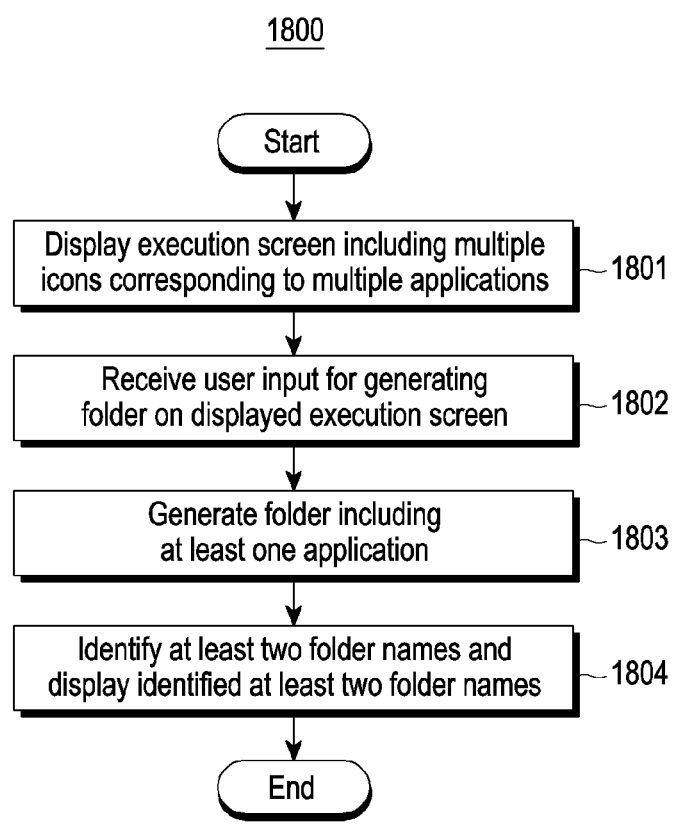
FIG. 18 is a flowchart illustrating an example of still another operation of an electronic device according to various embodiments.

FIG. 18 is a flowchart illustrating still another example of an operation of the electronic device 101 according to various embodiments. The operations illustrated in FIG. 18 are not limited to the illustrated order and may be performed in various orders. In addition, according to various embodiments, more operations than those illustrated in FIG. 18 or at least one operation fewer than that of FIG. 19 may be performed. Hereinafter, FIG. 18 will be described with reference to FIGS. 19 to 22.

Figure 19:
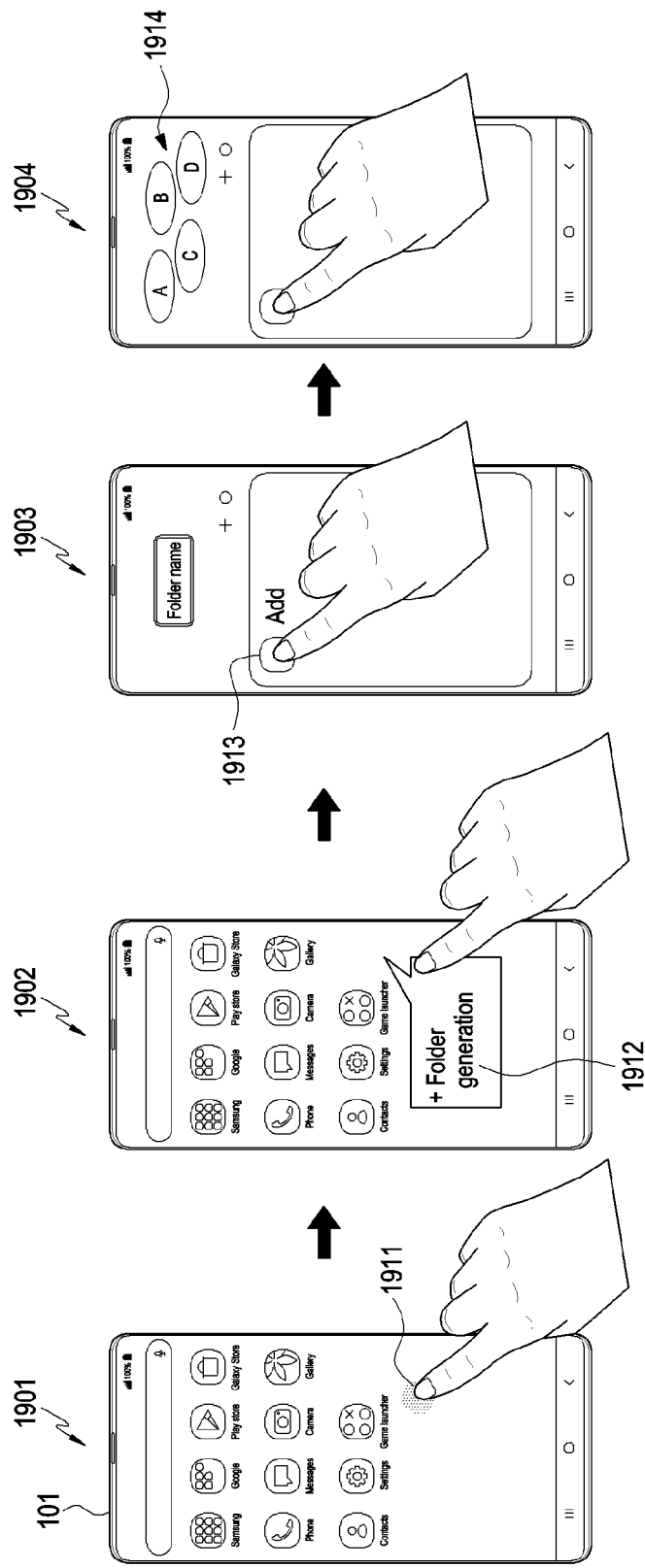
FIG. 19 illustrates an example of an operation for generating a folder by an electronic device according to various embodiments.
Figure 20:
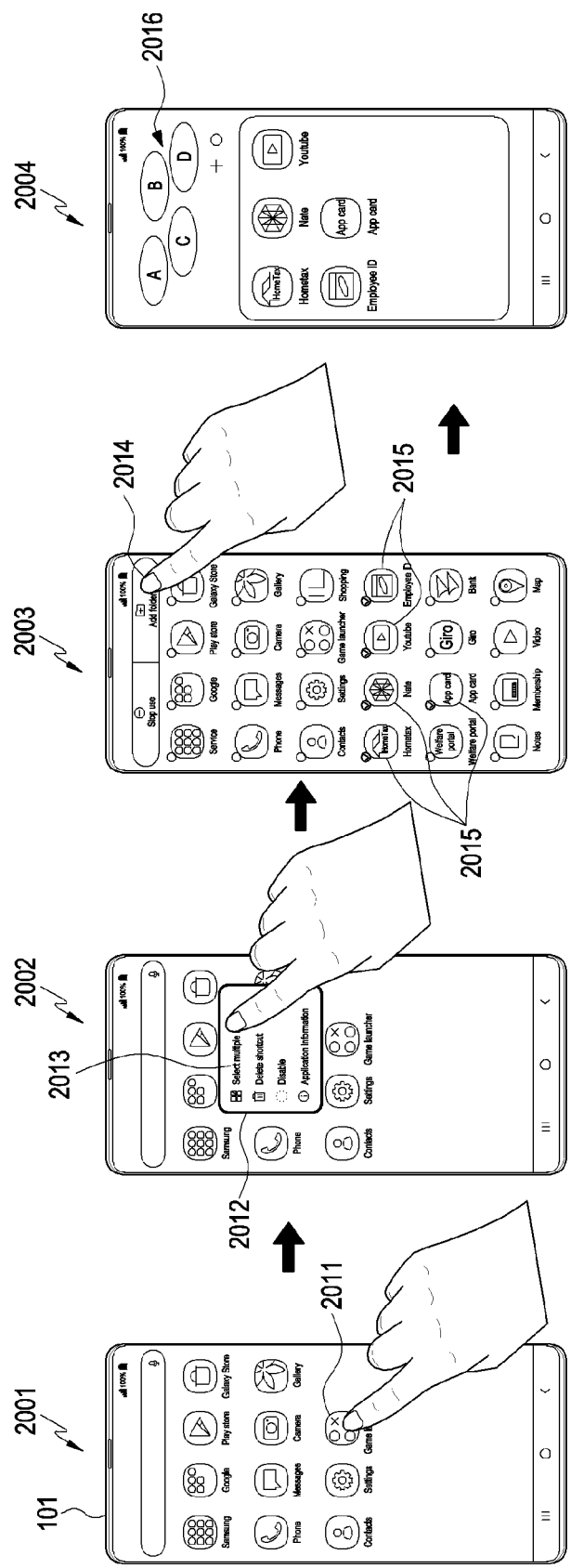
FIG. 20 illustrates another example of an operation for generating a folder by an electronic device according to various embodiments.
Figure 21:
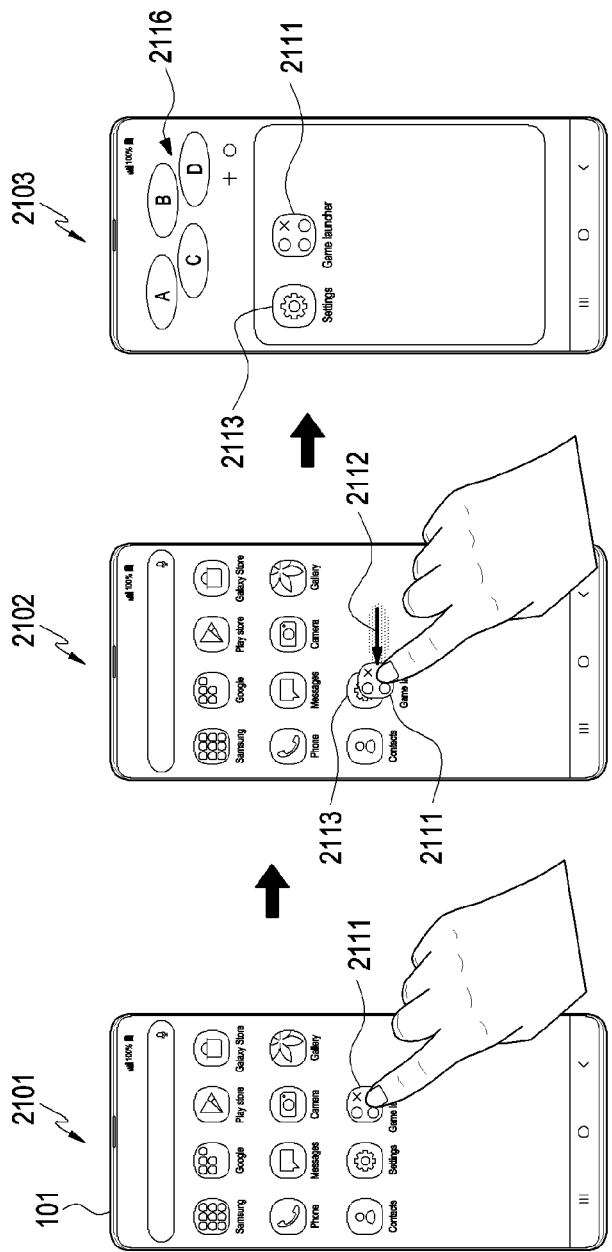
FIG. 21 illustrates still another example of an operation for generating a folder by an electronic device according to various embodiments.
Figure 22:
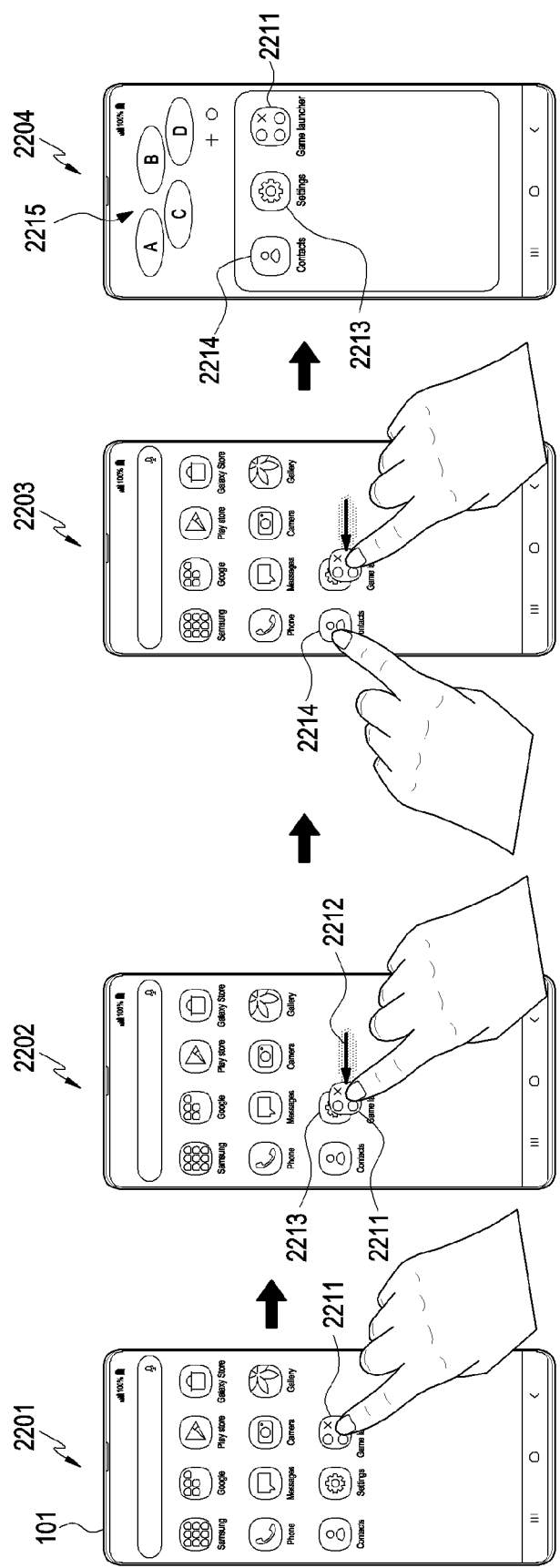
FIG. 22 illustrates still further another example of an operation for generating a folder by an electronic device according to various embodiments.

FIG. 19 illustrates an example of an operation for generating a folder of the electronic device according to various embodiments. FIG. 20 illustrates another example of an operation for generating a folder of the electronic device according to various embodiments. FIG. 21 illustrates further another example of an operation for generating a folder of the electronic device according to various embodiments. FIG. 22 illustrates still further another example of an operation for generating a folder of the electronic device according to various embodiments.

According to various embodiments, the electronic device 101 (e.g., the at least one processor 120) may display an execution screen including icons corresponding to multiple applications in operation 1801. For example, the electronic device 101 may display a home screen including icons corresponding to multiple applications as shown in FIGS. 19 to 22 (e.g., reference numerals 1901, 2001, 2101, and 2201). Without being limited to the above description, the electronic device 101 may display various types of execution screens that provide a function for generating a folder.

Referring to FIGS. 18 to 22, in a method 1800, the electronic device 101 (e.g., the at least one processor 120) may be configured to receive a user input for generating a folder on the displayed execution screen in operation 1802, and to generate a folder including at least one application in operation 1803.

For example, as shown in FIG. 19, the electronic device 101 (e.g., at least one processor 120) may generate an empty folder on the execution screen based on a user's request for generating a folder. The empty folder may denote a folder that does not include at least one icon corresponding to at least one application when the folder is generated. For example, as shown in reference numeral 1901 of FIG. 19, the electronic device 101 may be configured to receive a user input for selecting an area (or element) for requesting a pop-up screen on the execution screen (indicated by reference numeral 1911), and as shown in reference numeral 1902 of FIG. 19, the electronic device may be configured to receive another user input for selecting a folder generation menu 1912 displayed on the pop-up screen, so as to generate a folder. That is, the generated folder may be an empty folder. In response to the generation of the folder, the electronic device 101 may display a folder screen as shown in reference numeral 1903 of FIG. 19. As shown in reference numeral 1903 of FIG. 19, the electronic device 101 may receive an input requesting to add a specific icon 1913 corresponding to a specific application to the empty folder from the user, and may allow the specific icon to be included in the folder.

In addition, for example, the electronic device 101 (e.g., at least one processor 120) may be configured to generate a folder including at least one icon corresponding to at least one application based on a user's request to generate a folder on the execution screen as shown in FIG. 20. For example, as shown in reference numeral 2001 of FIG. 20, the electronic device 101 may be configured to receive a user's touch input which is maintained for a preconfigured period of time and used for selecting an icon 2011 among multiple icons being displayed, and may display a pop-up screen 2012 as shown in reference numeral 2002 of FIG. 20. When a request for selecting the remaining icons on the pop-up screen 2012 is received (e.g., a menu (multiple item selections) for selecting the remaining icons other than the selected one icon is selected) (indicated by reference numeral 2013), the electronic device 101 may receive selections for the remaining icons 2015 as shown in reference numeral 2003 of FIG. 20. As shown in reference numeral 2003 of FIG. 20, when a request for generating a folder after multiple icons are selected (e.g., one icon 2011 and the remaining icons 2015 are selected) is received (indicated by reference numeral 2014) (e.g., an input for an element for generating a folder is received), the electronic device 101 may generate a folder including one icon and the remaining icons. Alternatively, without being limited thereto, the electronic device 101 may display a pop-up screen and generate a folder based on a received user input for calling a pop-up screen in addition to a touch input for an icon of the execution screen. In response to the generation of the folder, the electronic device 101 may display a folder screen as shown in reference numeral 2004 of FIG. 20.

As another example, as shown in reference numerals 2101 to 2102 of FIG. 21, the electronic device 101 (e.g., at least one processor 120) may be configured to generate a folder including one icon 2111 and another icon 2113 based on a user input 2112 for dragging the one icon 2111 to the another icon 2113. In response to the generation of the folder, the electronic device 101 may display a folder screen as shown in reference numeral 2103 of FIG. 21.

As another example, as shown in reference numerals 2201 to 2202 of FIG. 22, the electronic device 101 may receive a user input 2212 for dragging one icon 2211 to another icon 2213. When at least one other icon 2214 is selected after receiving the user input 2212 for dragging the icon, the electronic device 101 may generate a folder including one icon 2211, another icon 2213, and at least one other icon 2214. For example, as shown in reference numeral 2203 of FIG. 22, when at least one icon 2214 is selected while the user input 2212 for dragging the icon is received, the electronic device 101 may generate a folder including the one icon 2211, the another icon 2213, and the selected at least one icon 2214. In response to the generation of the folder, the electronic device 101 may display a folder screen as shown in reference numeral 2204 of FIG. 22.

According to various embodiments, the electronic device 101 (e.g., the at least one processor 120) may be configured to identify at least two folder names and display the identified at least two folder names in operation 1804. For example, as shown in FIGS. 19 to 22 (e.g., reference numerals 1904, 2004, 2103, and 2204), the electronic device 101 may be configured to identify at least two folder names 1914, 2016, 2116, and 2215 related to at least one application corresponding to at least one icon included in the generated folder, and to provide the identified at least two folder names 1914, 2016, 2116, and 2215. Since operation 1804 of the electronic device 101 may be performed as in operation 1303 of the electronic device 101 and operations 1602 to 1604 of the electronic device 101, a duplicate description will be omitted.

As described above, since the electronic device 101 may recommend at least one application related to a folder at the time of folder generation, unnecessary switching of the execution screen is reduced, thereby reducing the operational burden of the electronic device and eliminating the user's inconvenience.

Hereinafter, another example of an operation of an electronic device according to various embodiments will be described.

According to various embodiments, the electronic device may perform an operation of recommending at least one application with respect to a folder including at least one icon.

Figure 23:
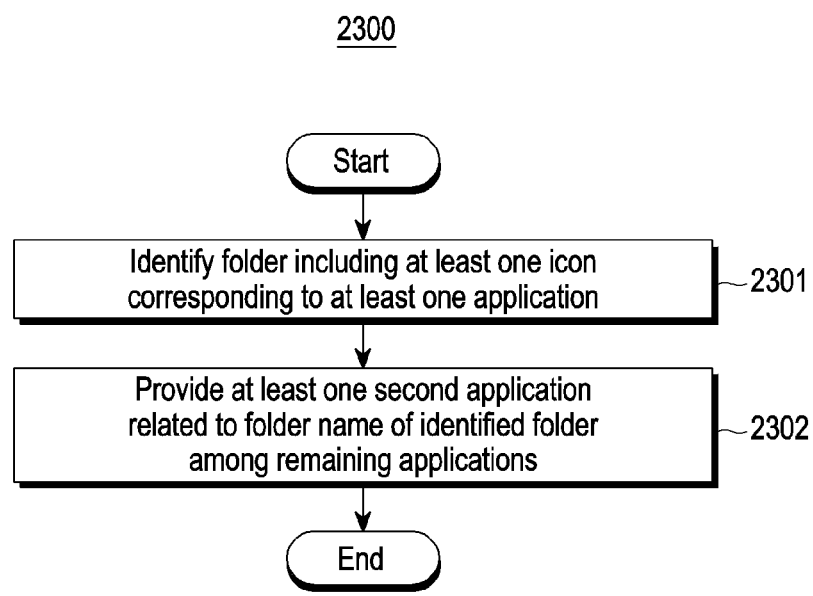
FIG. 23 is a flowchart illustrating another example of an operation of an electronic device according to various embodiments.

FIG. 23 is a flowchart illustrating another example of an operation of an electronic device according to various embodiments. The operations illustrated in FIG. 23 are not limited to the illustrated order and may be performed in various orders. In addition, according to various embodiments, more operations than those illustrated in FIG. 23 or at least one operation fewer than those thereof may be performed. Hereinafter, FIG. 23 will be described with reference to FIGS. 24 to 25.

Figure 24:
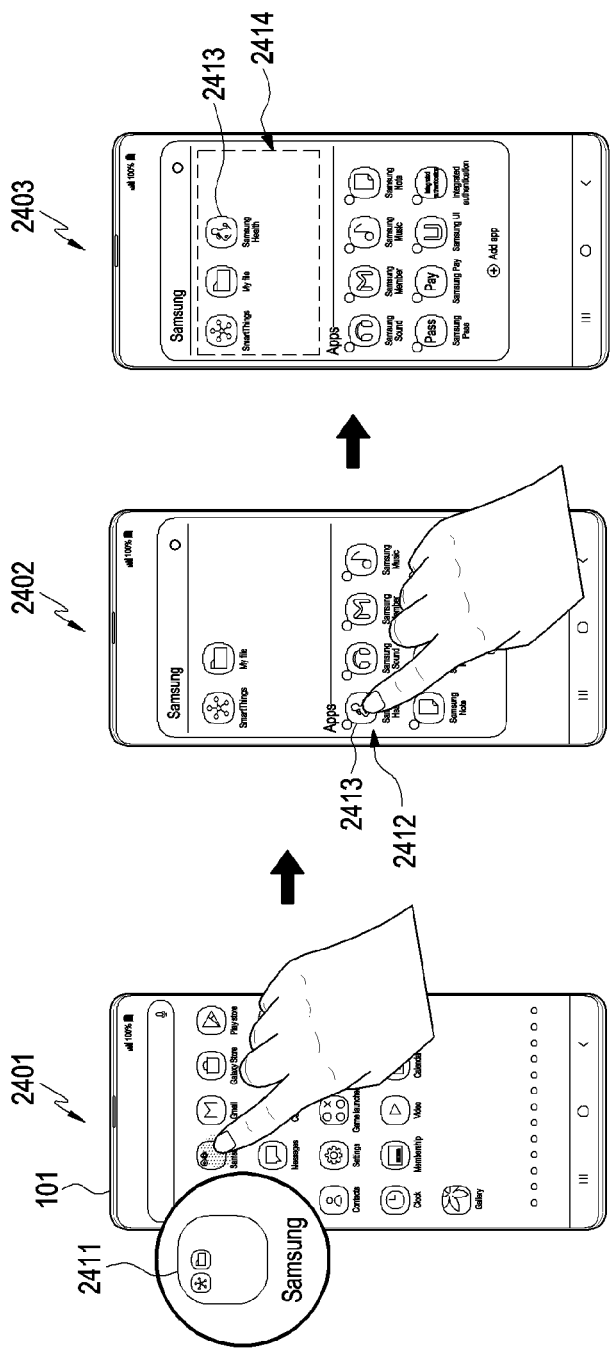
FIG. 24 illustrates an example of an operation of recommending at least one application with respect to a folder by an electronic device according to various embodiments.
Figure 25:
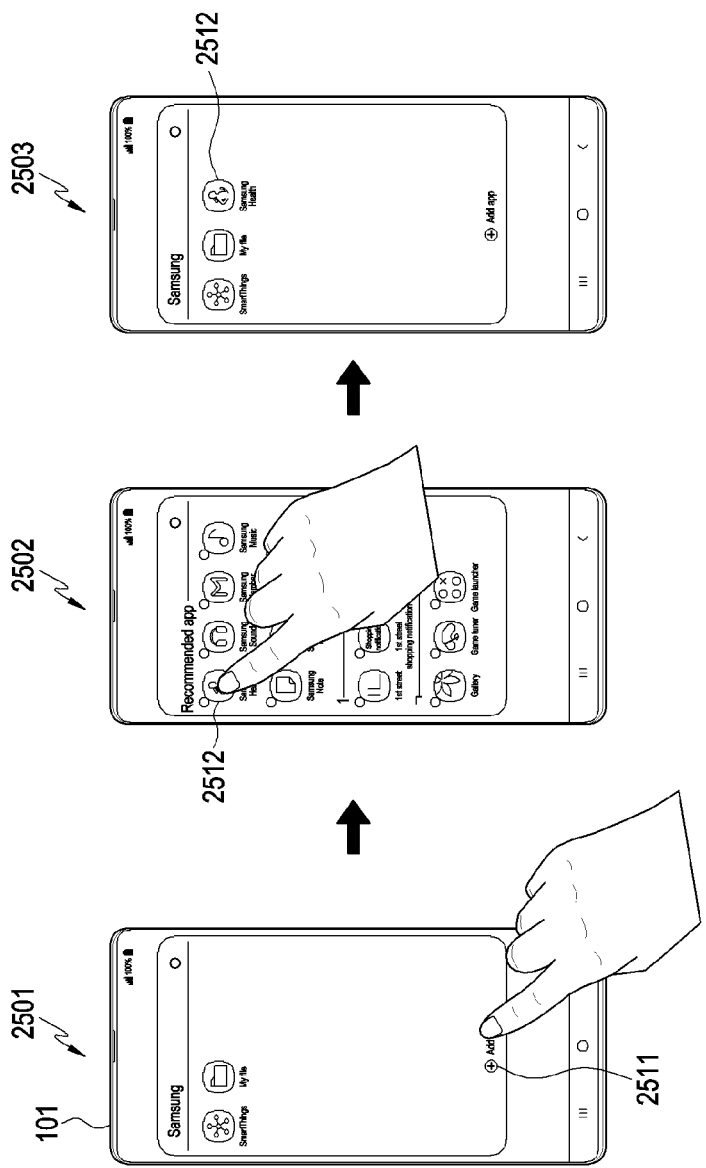
FIG. 25 illustrates another example of an operation of recommending at least one application with respect to a folder by an electronic device according to various embodiments.

FIG. 24 illustrates an example of an operation of an electronic device for recommending at least one application with respect to a folder according to various embodiments. FIG. 25 illustrates another example of an operation of an electronic device for recommending at least one application with respect to a folder according to various embodiments.

Referring to FIGS. 23 to 25, in a method 2300, the electronic device 101 (e.g., at least one processor 120) may be configured to identify a folder including at least one icon corresponding to at least one application among multiple applications in operation 2301. For example, as shown in reference numeral 2401 of FIG. 24, the electronic device may display an execution screen (e.g., a home screen) including icons corresponding to applications and icons corresponding to folders. The electronic device may be configured to receive a user input corresponding to an icon 2411 corresponding to one folder among icons corresponding to the folders, and identify one folder based on the received user input (e.g., identify an identification number of a folder icon). Based on the identification of one folder, the electronic device may be configured to identify application icons (e.g., identification numbers of icons) included in the folder. Based on the identification of one folder, the electronic device may be configured to identify application icons (e.g., identification numbers of icons) included in the folder.

According to various embodiments, the electronic device 101 (e.g., the at least one processor 120) may provide at least one second application related to a folder name of the identified folder among the remaining applications in operation 2302. For example, the electronic device may display a folder screen corresponding to the selected icon. The folder screen may include a first area for displaying a folder name and a second area for recommending at least one application related to the selected folder.

According to various embodiments, the electronic device 101 (e.g., the at least one processor 120) may recommend at least one application related to the folder name of the selected folder. For example, the electronic device may be configured to identify the folder name of the selected folder, and may recommend at least one application, which includes information (e.g., Descriptions) related to the identified folder name, among applications other than at least one application corresponding to at least one icon included in the folder. In addition, for example, the electronic device may be configured to identify folder names related to applications other than at least one application corresponding to at least one icon included in a folder (e.g., identify a folder name having the highest weight value or folder names having a weight value equal to or higher than a preconfigured value), and to recommend applications having a folder name corresponding to a folder name of the currently selected folder (e.g., having a similarity which is identical or which has a preconfigured value or higher). The electronic device may be configured to identify a folder name related to applications, and when applications having the currently selected folder name are recommended, the electronic device may use weight value information about the folder name, which will be described later with reference to FIGS. 26 to 27.

In addition, without being limited thereto according to various embodiments, the electronic device 101 (e.g., the at least one processor 120) may be configured to identify applications corresponding to at least one application corresponding to at least one icon included in a folder from among applications other than the at least one application, and recommend the identified applications.

According to various embodiments, the electronic device 101 (e.g., the at least one processor 120) may be configured to provide the identified applications for recommendation on a folder screen being displayed, and when the recommended application is selected, the electronic device may allow an icon corresponding to the selected application to be included in a folder.

For example, as shown in reference numeral 2402 of FIG. 24, the electronic device 101 (e.g., the at least one processor 120) may display at least one icon corresponding to at least one application related to the identified folder in a second area 2412 of the folder screen. In this case, the electronic device may display icons related to other applications on the second area based on a user input for scrolling the second area. As shown in reference numeral 2403 of FIG. 24, when one icon 2413 is selected from among at least one icon displayed in the second area 2412, the electronic device 101 may allow one icon 2413 to be included in a folder, and may display the one icon in an area 2414 for displaying icons included in a folder of a folder screen.

In addition, for example, when receiving an input for requesting at least one application related to a folder identified from the folder screen, the electronic device 101 (e.g., at least one processor 120) may display a screen including at least one icon corresponding to the at least one application. For example, as shown in reference numeral 2501 of FIG. 25, the electronic device may receive an input for an icon 2511 for requesting provision of at least one application displayed on the folder screen, and as shown in reference numeral 2502 of FIG. 25, the electronic device may display a screen including at least one icon corresponding to at least one application. As shown in reference numerals 2502 to 2503 of FIG. 25, when an icon 2512 is selected from among at least one icon, the electronic device may include the one icon in the folder and display the one icon 2512 on the folder screen.

As described above, when the electronic device 101 recommends at least one application related to a folder generated at the time of folder generation, more accurate information (e.g., information on the application to be recommended) can be provided by identifying the application to be recommended based on weight value information about the folder name.

Hereinafter, still another example of the operation of the electronic device 101 according to various embodiments will be described.

The electronic device 101 may recommend applications for a folder based on the folder name-related weight value information 1010 and pieces of information related to multiple applications.

Figure 26:
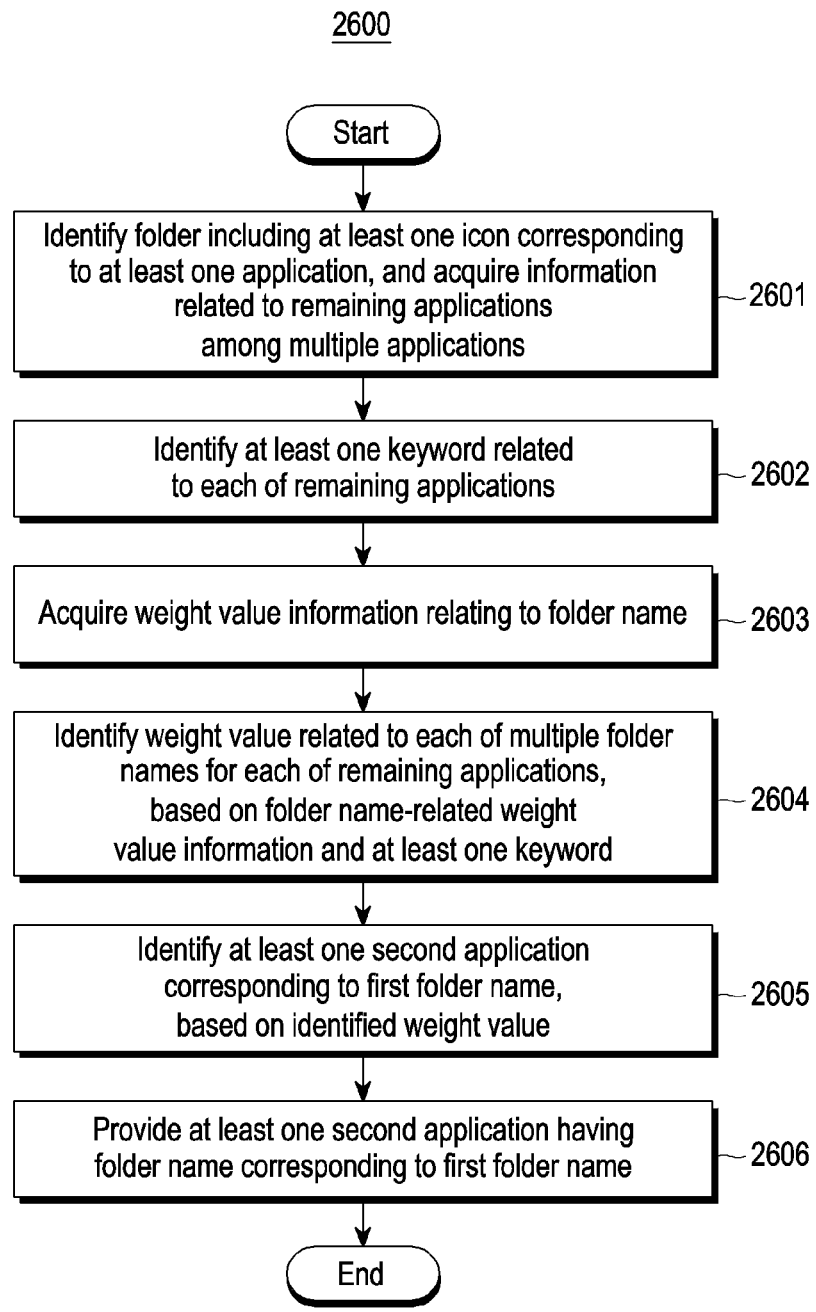
FIG. 26 is a flowchart illustrating still another example of an operation of an electronic device according to various embodiments.

FIG. 26 is a flowchart illustrating still another example of an operation of an electronic device according to various embodiments. The operations illustrated in FIG. 26 are not limited to the illustrated order and may be performed in various orders. In addition, according to various embodiments, more operations than those illustrated in FIG. 26 or at least one operation fewer than those thereof may be performed. Hereinafter, FIG. 26 will be described with reference to FIG. 27.

Figure 27:
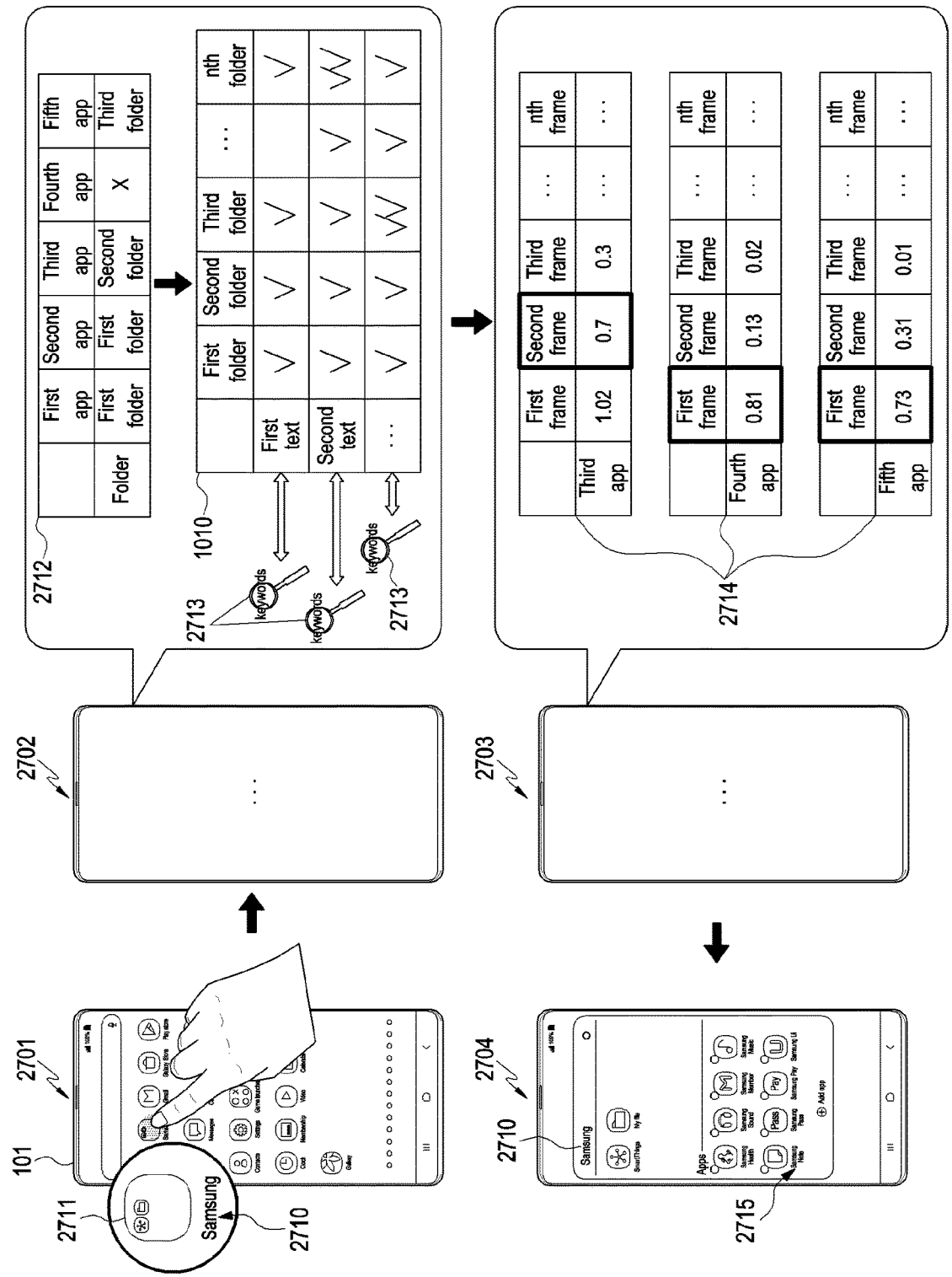
FIG. 27 illustrates an example of an operation of an electronic device for recommending applications for a folder based on weight value information about a folder name and information related to multiple applications according to various embodiments.

FIG. 27 illustrates an example of an operation of recommending applications for a folder based on folder name-related weight value information 1010 of the electronic device 101 and information related to multiple applications according to various embodiments. Values for the weight value described in FIG. 27 are only an example, and are not limited thereto and may be configured to be various values.

Referring to FIGS. 26 and 27, in a method 2600, the electronic device 101 (e.g., the at least one processor 120) may be configured to identify a folder including at least one icon corresponding to at least one application, and acquire information related to the remaining applications in operation 2601. For example, as shown in reference numeral 2701 of FIG. 27, when the electronic device 101 receives a selection for one icon 2711 corresponding to one folder having a specific folder name 2710, the electronic device may identify at least one icon included in one folder.

According to various embodiments, the electronic device 101 (e.g., the at least one processor 120) may be configured to identify at least one application corresponding to at least one icon included in a folder, and identify the remaining applications other than the at least one application among multiple applications installed in the electronic device 101. The electronic device 101 may acquire information related to the remaining applications. Since the operation of obtaining information related to the application by the electronic device 101 may be performed as in operation 501 of the electronic device 101 and operation 701 of the electronic device 101, a duplicate description will be omitted.

According to various embodiments, the electronic device 101 (e.g., the at least one processor 120) may be configured to identify at least one keyword related to each of the remaining applications in operation 2602, and acquire weight value information about a folder name in operation 2603.

According to various embodiments, the electronic device 101 (e.g., the at least one processor 120) may be configured to extract at least one keyword related to each of the remaining applications from the acquired information related to each of the remaining applications. For example, as shown in reference numeral 2702 of FIG. 27, the electronic device 101 may be configured to identify a state in which multiple applications installed in the electronic device 101 are included in a folder (indicated by reference numeral 2712), and identify a folder other than the currently selected folder (e.g., a first folder) or applications not included in a folder (e.g., a third app, a fourth app, and a fifth app). Since the operation of extracting at least one keyword by the electronic device 101 may be performed as in operations 702 to 703, a duplicate description will be omitted.

According to various embodiments, as shown in reference numeral 2702 of FIG. 27, the electronic device 101 (e.g., at least one processor 120) may be configured to acquire multiple folder names and folder name-related weight value information 1010 including a weight value relating to pieces of information related to an application for each of the multiple folder names. A duplicate description related to the folder name-related weight value information 1010 will be omitted.

According to various embodiments, the electronic device 101 (e.g., at least one processor 120) may be configured to identify a weight value related to each of the multiple folder names for each of the remaining applications based on the weight value information about a folder name and at least one keyword, in operation 2604. For example, as shown in reference numeral 2702 of FIG. 27, the electronic device 101 may compare at least one related keyword 2713 and the weight values of information allocated to each of multiple folder names included in the folder name-related weight value information 1010 according to each of the remaining applications (e.g., a third app, a fourth app, and a fifth app). Based on a result of the comparison, as shown in reference numeral 2703 of FIG. 27, the electronic device 101 may be configured to acquire multiple folder name-specific weight values 2714 according to each of the remaining applications (e.g., a third app, a fourth app, and a fifth app). The operation of calculating a weight value for each folder name based on the keyword related to the application and the folder name-related weight value information 1010 by the electronic device 101 may be performed as in operation 704 of the electronic device 101, and thus duplicated description is omitted.

According to various embodiments, the electronic device 101 (e.g., the at least one processor 120) may be configured to identify at least one second application corresponding to the first folder name based on the identified weight value, in operation 2605.

For example, the electronic device 101 (e.g., the at least one processor 120) may be configured to identify a folder name related to the remaining applications based on the weight value (e.g., identify a folder name having the highest weight value or folder names having a weight value equal to or higher than a preconfigured value), and to identify, as a recommended application, at least some of the remaining applications having a folder name corresponding to the folder name 2710 (e.g., the first folder name) of the selected folder (e.g., having a similarity which is identical or which has a preconfigured value or higher). For example, as shown in reference numeral 2703 of FIG. 27, the electronic device 101 may be configured to identify a folder name having the highest weight value as a folder name related to the remaining applications. In addition, for example, as a folder name related to the remaining applications, the electronic device 101 may be configured to identify a folder name having a weight value equal to or higher than a preconfigured value. The operation of identifying the folder name of applications based on the weight value by the electronic device 101 may be performed as in operation 704 of the electronic device 101, and thus a duplicated description will be omitted.

According to various embodiments, the electronic device 101 (e.g., the at least one processor 120) may provide at least one second application having a folder name corresponding to the first folder name in operation 2606. For example, as shown in reference numeral 2704 of FIG. 27, the electronic device 101 may display at least one icon 2715 corresponding to at least one second application having a folder name corresponding to a specific folder name 2710.

According to various embodiments, the electronic device 101 (e.g., the at least one processor 120) may display at least one icon corresponding to the recommended at least one application (e.g., at least one second application) based on a weight value of the recommended at least one application (e.g., the at least one second application). Hereinafter, the weight value of an icon may be defined as the weight value, which the application corresponding to the icon has with respect to the folder name of the selected folder.

For example, the electronic device 101 (e.g., the at least one processor 120) may display the at least two icons in descending order of weight values, in which the highest weight value goes first. When displaying at least two icons in a scrollable manner, the electronic device 101 may display a part having a relatively high weight value, and may display a part having a relatively low weight value when the at least two icons are scrolled.

In addition, for example, the electronic device 101 (e.g., the at least one processor 120) may visually differently display the displayed at least two icons in descending order of weight values, in which the highest weight value goes first. For example, the electronic device 101 may display icons having a relatively high weight value among at least two icons to have large sizes and may display icons having a relatively low weight value to have small sizes. As another example, the electronic device 101 may configure, as a first value, at least one of color, brightness, and saturation of a folder name having a relatively high weight value among at least two folder names, and may configure, as a second value, at least one of color, brightness, and saturation of icons having a relatively high weight value. The first value may be configured to be greater than or smaller than the second value. The size, color, brightness, saturation, etc. may be configured for each icon and may be gradually configured differently.

Meanwhile, the operation of displaying at least two icons based on the weight value by the electronic device 101 is not limited to the illustration (displaying the icons on the folder screen), but may be applied to a method of displaying a screen including at least two icons.

As described above, the electronic device 101 performs an operation of including the respective large number of icons into an associated folder, thereby reducing the operational burden of the electronic device for managing a large number of icons and improving the user's convenience in icon use.

Hereinafter, further another example of the operation of the electronic device 101 according to various embodiments will be described.

According to various embodiments, the electronic device 101 may arrange multiple icons corresponding to multiple applications based on folder names related to the multiple applications.

Figure 28:
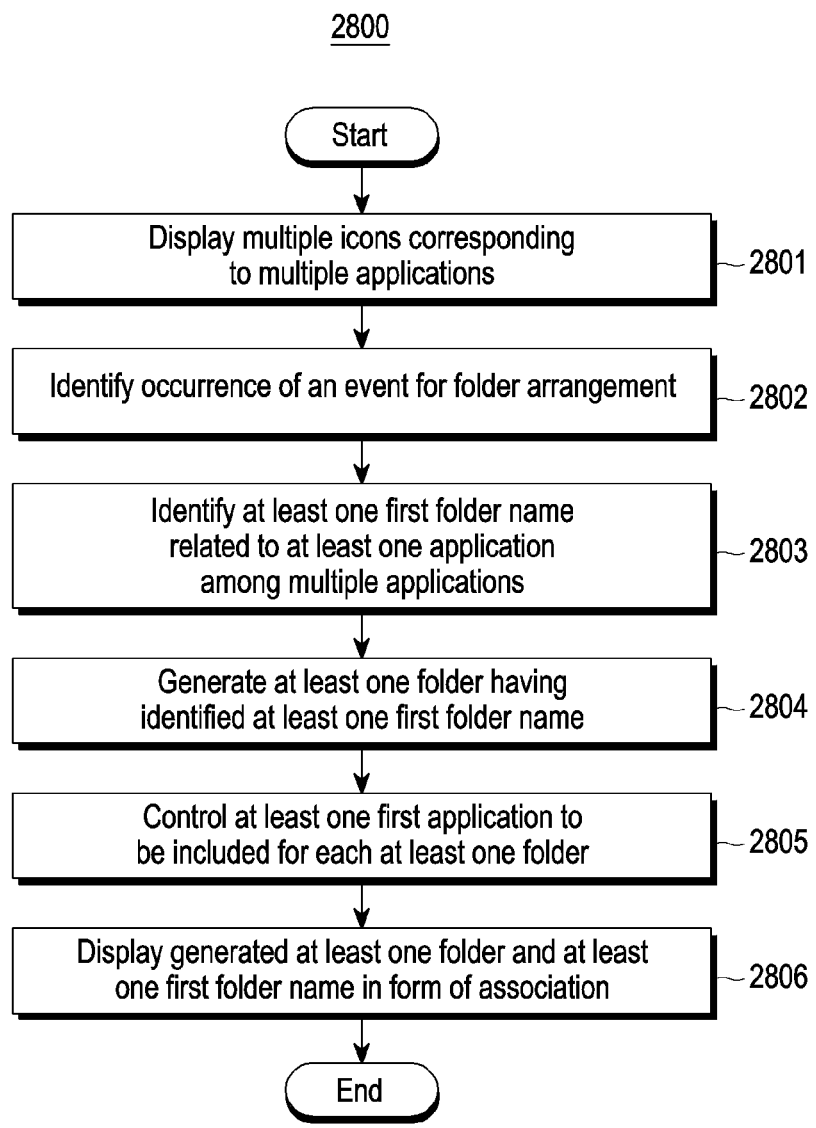
FIG. 28 is a flowchart illustrating further another example of an operation of an electronic device according to various embodiments.

FIG. 28 is a flowchart illustrating further another example of an operation of an electronic device according to various embodiments. The operations illustrated in FIG. 28 are not limited to the illustrated order and may be performed in various orders. In addition, according to various embodiments, more operations than those illustrated in FIG. 28 or at least one operation fewer than those thereof may be performed. Hereinafter, FIG. 28 will be described with reference to FIGS. 29 to 30.

Figure 29:
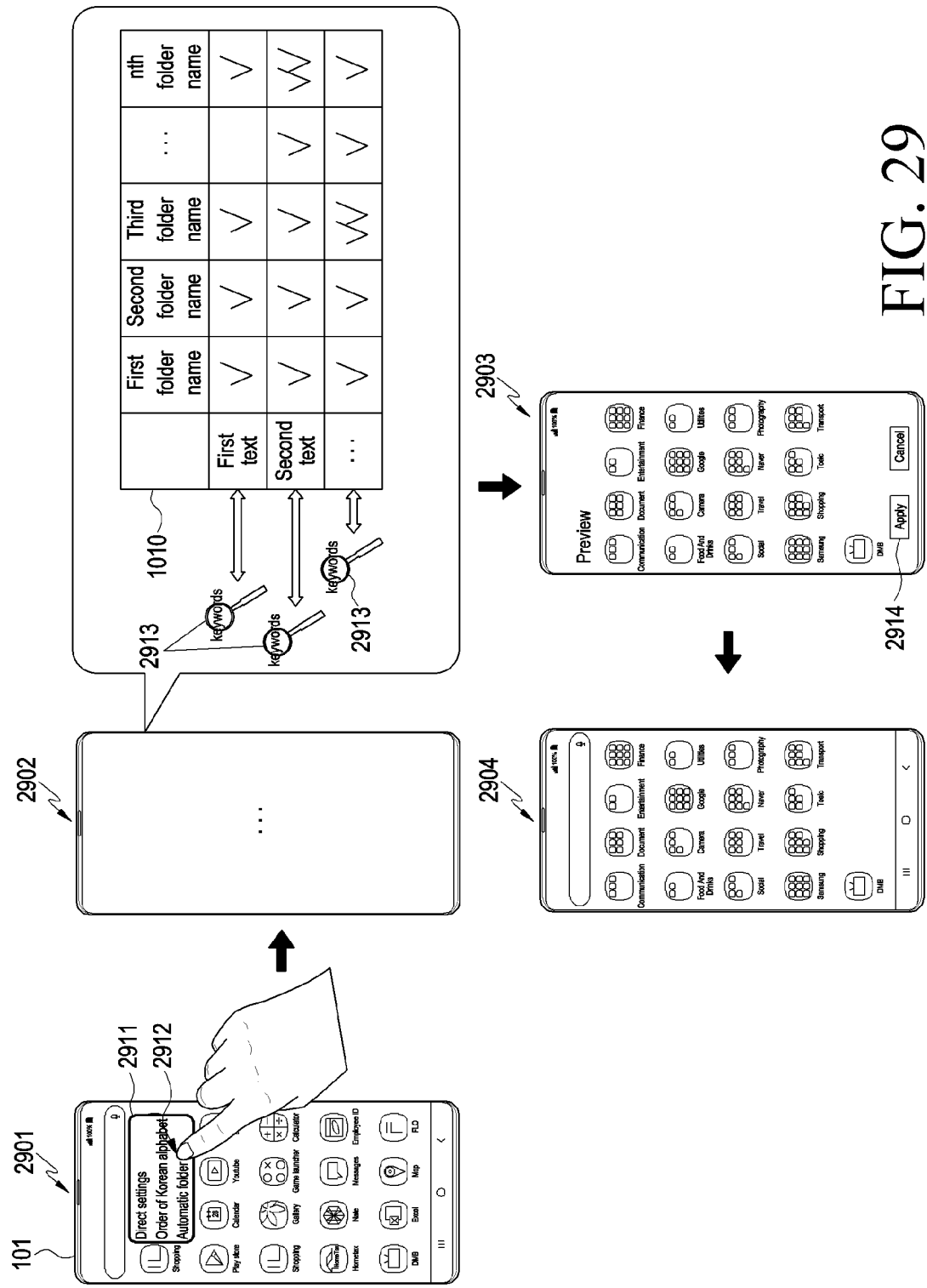
FIG. 29 illustrates an example of an operation of an electronic device for arranging multiple icons based on folder names related to multiple applications according to various embodiments.
Figure 30:
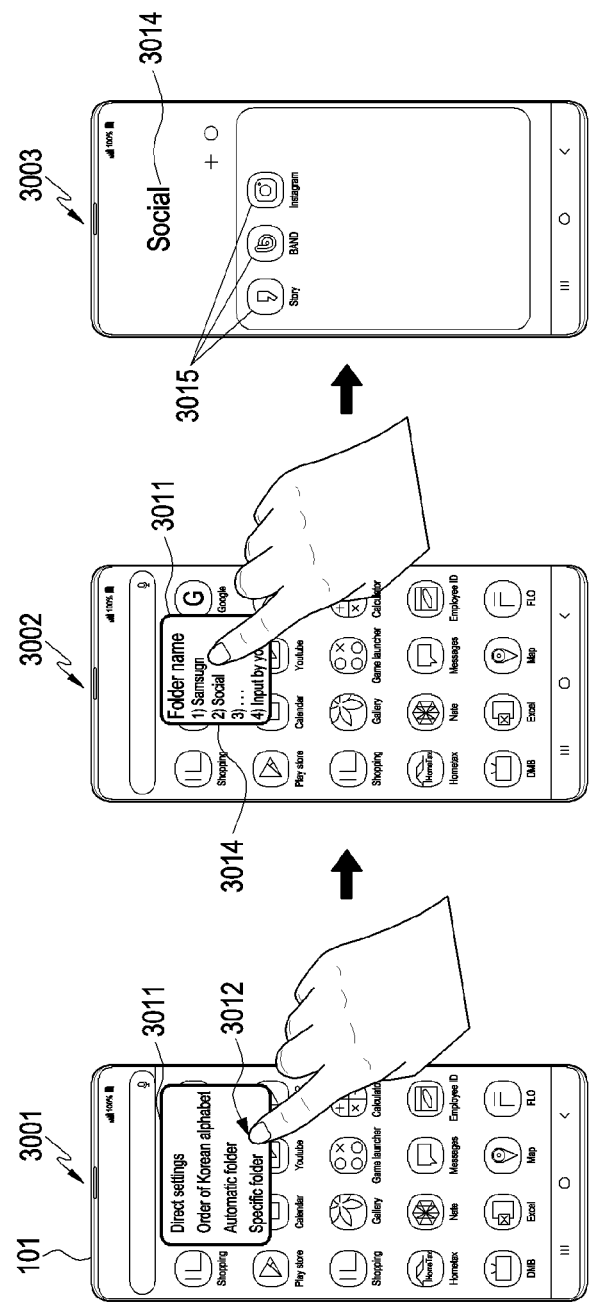
FIG. 30 illustrates an example of an operation of an electronic device for arranging some of multiple icons based on folder names related to multiple applications according to various embodiments.

FIG. 29 illustrates an example of an operation of arranging multiple icons based on folder names related to multiple applications by an electronic device 101 according to various embodiments. The value for the weight value described in FIG. 29 is only an example and is not limited thereto and may be configured to be various values. FIG. 30 illustrates an example of arranging some of multiple icons based on folder names related to multiple applications by the electronic device 101 according to various embodiments.

Referring to FIGS. 28 to 30, in a method 2800, the electronic device 101 (e.g., the at least one processor 120) may display multiple icons corresponding to multiple applications in operation 2801. For example, as shown in FIGS. 29 and 30 (e.g., reference numerals 2901 and 3001), the electronic device 101 may display an execution screen (e.g., a home screen) including multiple icons corresponding to multiple applications and at least one icon corresponding to at least one folder. In addition, for example, the electronic device 101 may display a folder screen including an icon corresponding to an application and an icon corresponding to a subfolder. The execution screen is not limited to the above description, and may be various screens on which icons may be displayed.

According to various embodiments, the electronic device 101 (e.g., the at least one processor 120) may be configured to identify occurrence of an event for folder arrangement in operation 2802.

According to various embodiments, the electronic device 101 (e.g., the at least one processor 120) may receive the occurrence of event for arranging folders on an execution screen (e.g., a home screen and a folder screen).

For example, as shown in reference numeral 2901 of FIG. 29 and reference numeral 3001 of FIG. 30, the electronic device 101 (e.g., at least one processor 120) may display pop-up screens 2911 and 3011 when receiving a user input on an execution screen (e.g., receiving a touch input maintained for a preconfigured period of time or more). The electronic device 101 may receive an input for selecting menus 2912 and 3012 for arranging folders displayed on the pop-up screens 2911 and 3011. The folder arrangement may include arranging for all of multiple predetermined folder names as shown in reference numeral 2901 of FIG. 29 and arranging for selected folder names from among multiple folder names as shown in reference numeral 3001 to 3002 of FIG. 30.

In addition, for example, without being limited thereto, the electronic device 101 may be configured to identify occurrence of an event for folder arrangement. For example, the electronic device 101 may be configured to identify the occurrence of an event for folder arrangement based on a configuration (e.g., a folder arranging configuration) on a screen such as a setup window.

According to various embodiments, the electronic device 101 (e.g., the at least one processor 120) may receive the occurrence of an event for folder arrangement of at least some of multiple icons being displayed. For example, as shown in reference numeral 3001 of FIG. 30, the electronic device 101 may receive the occurrence of an event for folder arrangement of multiple icons currently stored in the electronic device 101 (or icons of the currently displayed screen). In addition, for example, as shown in reference numeral 3002 of FIG. 30, the electronic device 101 may receive the occurrence of an event for allowing at least some of the multiple icons to be included in a folder for a specific folder name.

According to various embodiments, the electronic device 101 (e.g., the at least one processor 120) may be configured to identify at least one first folder name related to at least one application among the multiple applications in operation 2803, and generate at least one folder having the identified at least one first folder name in operation 2804. For example, the electronic device 101 may be configured to identify multiple folder names related to multiple applications, and may generate respective folders having the multiple identified folder names.

According to various embodiments, the electronic device 101 (e.g., the at least one processor 120) may be configured to identify a folder name of at least one application corresponding to at least some of the multiple icons, and generate a folder based on the identified folder name.

For example, the electronic device 101 (e.g., at least one processor 120) may be configured to identify a folder name corresponding to multiple applications corresponding to multiple icons, and generate a folder having the identified folder name. In this case, as shown in reference numeral 2902 of FIG. 29, the electronic device 101 may be configured to identify folder names relating to applications (e.g., identify a folder name having the highest weight value or folder names having a weight value equal to or higher than a preconfigured value) based on information 2913 related to applications corresponding to at least some of the multiple icons stored in the electronic device 101 and the folder name-related weight value information 1010. The electronic device may generate folders having each of the identified folder names. A description duplicating with the operation of identifying the folder name related to the application, by the electronic device 101, based on the information related to the application and the folder name-related weight value information 1010 will be omitted.

In addition, for example, as shown in reference numerals 3002 to 3003 of FIG. 30, the electronic device 101 (e.g., at least one processor 120) may be configured to generate a folder having a selected folder name 3014 from among multiple folder names 3013, and allow at least one icon 3015 corresponding to at least one application related to the folder name 3014 to be included in the generated folder. The electronic device may be configured to identify a folder name related to multiple applications, and identify at least one application corresponding to the selected folder name 3014 based on the identified folder names. The electronic device may generate a folder including at least one icon 3015 corresponding to at least one identified application and having the selected folder name 3014.

According to various embodiments, the electronic device 101 (e.g., the at least one processor 120) may be configured to control the at least one first application to be included in each at least one folder in operation 2805. For example, the electronic device 101 may perform folder arrangement by including applications having a corresponding folder name in the generated folder having the folder name. For example, when the folder name of a generated first folder is a first folder name and the folder name related to the first application is a first folder name, the electronic device 101 may include the first application in the first folder. In addition, for example, as shown in reference numeral 2903, the electronic device 101 may include at least one icon corresponding to at least one application having a selected folder name in the generated folder.

According to various embodiments, the electronic device 101 (e.g., the at least one processor 120) may provide previews of folders to be generated. For example, as shown in reference numeral 2903 of FIG. 29, the electronic device 101 may display a screen including icons corresponding to folders to be generated, and may complete the generation of folders when receiving a request for completing generation of folders on the displayed screen (indicated by reference numeral 2914) (e.g., receiving input for the Apply button).

According to various embodiments, the electronic device 101 (e.g., the at least one processor 120) may display the generated at least one folder and the at least one first folder name in the form of association, in operation 2806, as shown in reference numeral 2904 of FIG. 29. For example, the electronic device 101 may display a folder name, which is configured in a folder, in an area surrounding an icon corresponding to each of folders (e.g., an area within a preconfigured distance from the icon).

As described above, the electronic device 101 may automatically update the folder name and the recommended application at the time of updating the icon in the folder, so that the icons stored in the electronic device 101 are more systematically classified and the user's convenience in using the folder can be improved.

Hereinafter, still further another example of the operation of the electronic device 101 according to various embodiments will be described.

According to various embodiments, when an icon corresponding to an application is added to a folder, the electronic device 101 may update a folder name configured in the folder and an application recommended for the folder.

Figure 31:
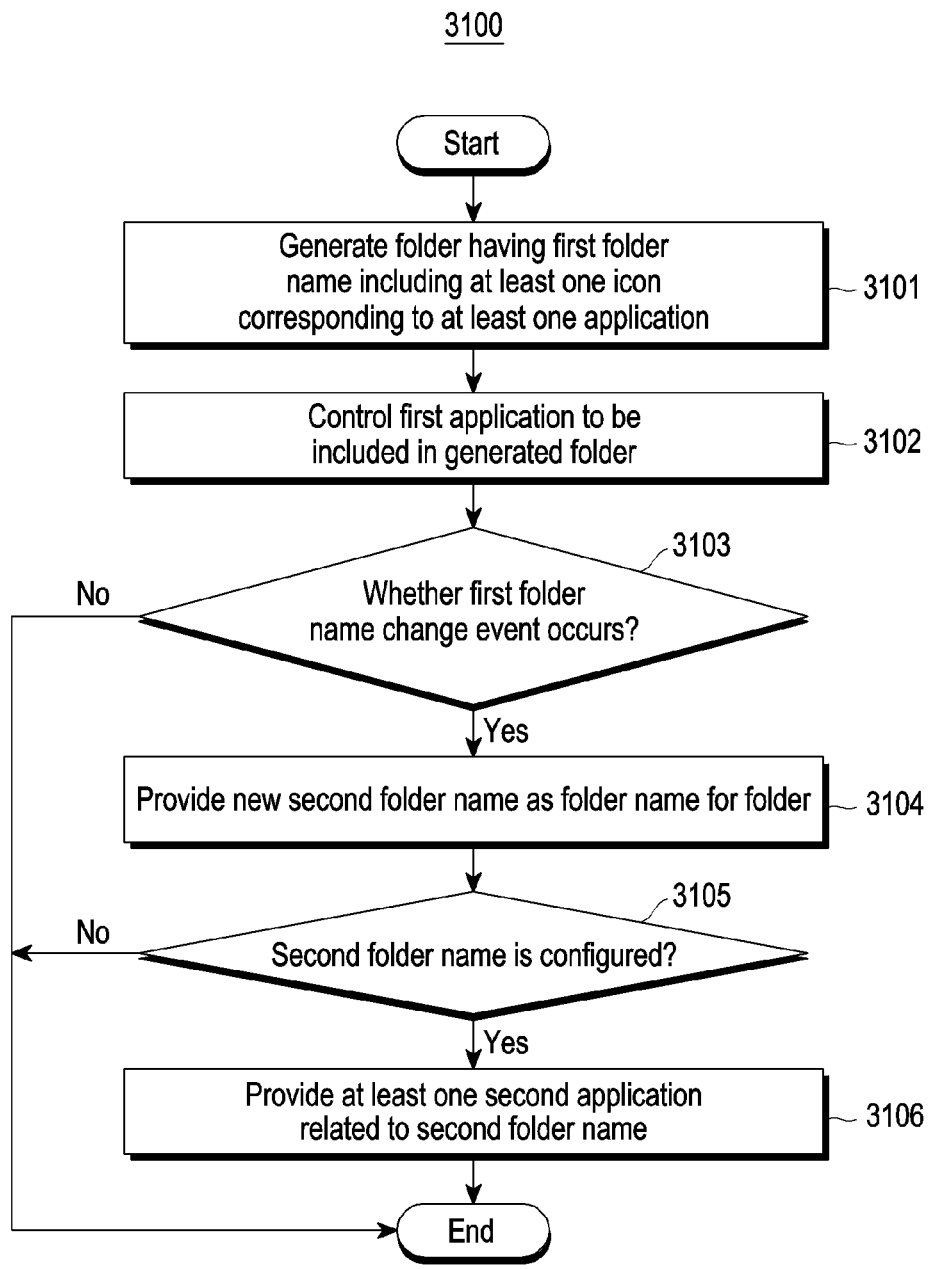
FIG. 31 is a flowchart illustrating still further another example of an operation of an electronic device according to various embodiments.

FIG. 31 is a flowchart illustrating still further another example of an operation of an electronic device according to various embodiments. The operations illustrated in FIG. 31 are not limited to the illustrated order and may be performed in various orders. In addition, according to various embodiments, more operations than the operations illustrated in FIG. 31 may be performed, or at least one operation fewer than those thereof may be performed. Hereinafter, FIG. 31 will be described with reference to FIG. 32.

Figure 32:
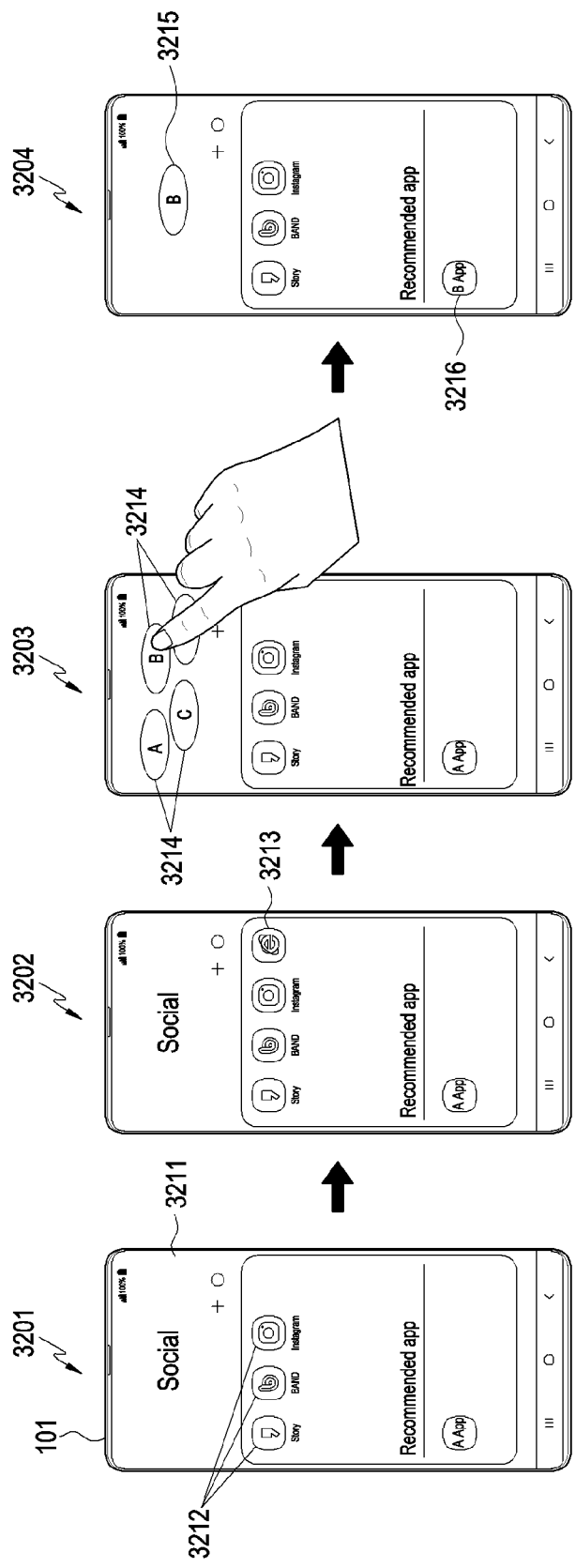
FIG. 32 illustrates an example of an operation of updating a folder name configured in a folder of an electronic device and an application recommended for the folder according to various embodiments.

FIG. 32 illustrates an example of an operation of updating a folder name configured in a folder and an application recommended for the folder by an electronic device 101 according to various embodiments.

According to various embodiments, in operation 3101, the electronic device 101 (e.g., the at least one processor 120) may generate a folder having a first folder name 3211 including at least one icon 3212 corresponding to at least one application as shown in reference numeral 3201 of FIG. 32. The first folder name 3211 may be a folder name directly configured (e.g., directly input) by a user or a folder name selected by the user from among folder names recommended by the electronic device 101.

According to various embodiments, in operation 3102, the electronic device 101 (e.g., the at least one processor 120) may be configured to control a first icon 3213 corresponding to a first application to be included in the generated folder as shown in reference numeral 3202 of FIG. 32.

According to various embodiments, the electronic device 101 (e.g., the at least one processor 120) may be configured to allow an icon 3213 corresponding to an application to be newly added to a folder based on a user input. For example, while displaying the corresponding icon in a folder, the electronic device 101 may allow one icon to be included in the folder based on a user input of dragging one icon to the icon corresponding to the folder. In addition, for example, the electronic device 101 may receive a request to add an application on the folder screen (e.g., an application addition icon selection and an application selection), and may allow an icon corresponding to the selected application to be added to the folder.

According to various embodiments, the electronic device 101 (e.g., the at least one processor 120) may be configured to identify whether a first folder name change event occurs in operation 3103. In other words, the electronic device 101 may identify whether the first folder name configured in the current folder needs to be changed.

According to various embodiments, the electronic device 101 (e.g., the at least one processor 120) may be configured to identify whether an application corresponding to the newly added icon and the first folder name correspond to each other, and identify that the first folder name change event has occurred when the application and the first folder name correspond to each other. In other words, the electronic device 101 may be configured to identify the degree of association between the application corresponding to the icon newly added to the folder and the folder name of the folder.

For example, the electronic device 101 (e.g., the at least one processor 120) may be configured to identify a similarity between information related to the first application and the first folder name configured in the folder, and identify that the first application and the first folder name correspond to each other when the identified similarity is equal to or higher than a preconfigured threshold.

In addition, for example, the electronic device 101 (e.g., at least one processor 120) may be configured to identify information on weight values for respective folder names related to the first application, and identify whether the first folder name and the first application correspond to each other, based on the identified weight values. As an example, the electronic device 101 may be configured to identify a folder name related to the first application (e.g., identify a folder name having the highest weight value or identify folder names having a weight value equal to or higher than a preconfigured value), and identify whether the first folder name and the first folder name related to the first application correspond to each other (e.g., having a similarity which is identical or which has a preconfigured value or higher). As another example, the electronic device 101 may be configured to identify the weight value for the first folder name related to the first application, and identify that the first application and the first folder name correspond to each other when the identified weight value has a value equal to or greater than a preconfigured value. The operation of identifying folder names related to the application and the operation of identifying the information on the weight value for each folder name, by the electronic device 101 may be performed as in operations 701 to 704 of the electronic device 101. Therefore, duplicated descriptions will be omitted.

According to various embodiments, the electronic device 101 (e.g., the at least one processor 120) may be configured to identify whether a first folder name change event has occurred, based on applications corresponding to the existing icons included in a folder and an application corresponding to newly added icons. For example, the electronic device 101 may be configured to finally identify folder names related to the multiple applications corresponding to the existing icons and the new icons included in a folder (e.g., identify a folder name having the highest weight value or identify folder names having a weight value equal to or higher than a preconfigured value), and when the identified folder name and the first folder name configured in a folder do not correspond to each other (e.g., having a similarity which is different or which has a similarity less than a preconfigured value), the electronic device may be configured to identify that a folder name change event has occurred. In addition, for example, the electronic device 101 may be configured to finally identify the weight values for the first folder name of the multiple applications corresponding to the existing icons and the new icons included in the folder, and identify that the folder name change event has occurred when the identified weight value is less than a preconfigured value. The operation of identifying the folder names related to the multiple applications and the operation of identifying the weight values by the electronic device 101 may be performed as in operations 701 to 704 of the electronic device 101, and thus a duplicate description thereof will be omitted.

According to various embodiments, when it is identified that the first application and the first folder name do not correspond to each other, the electronic device 101 (e.g., the at least one processor 120) may provide a new second folder name as a folder name for a folder in operation 3104. For example, as shown in reference numeral 3203 of FIG. 32, the electronic device 101 may recommend at least two folder names 3214 instead of the first folder name 3211 as a folder name of a folder. As shown in reference numeral 3204 of FIG. 32, when one folder name 3215 is selected among the provided at least two folder names 3214, the electronic device 101 may update the folder name with the selected one folder name 3215. In addition, for example, the electronic device 101 may automatically configure a new folder name 3215 in a folder instead of the first folder name 3211.

According to various embodiments, the electronic device 101 may be configured to identify folder names 3214 and 3215 to be newly recommended related to the folder, based on information related to applications corresponding to updated icons in a folder. For example, as the folder names 3214 and 3215 to be newly recommended for a folder, the electronic device 101 may be configured to identify folder names related to the multiple applications corresponding to the existing icons and new icons included in the folder (e.g., identify folder names having the highest weight value or identify folder names having a weight value equal to or higher than a preconfigured value). A duplicated description relating to an operation of identifying folder names related to multiple applications by the electronic device 101 will be omitted.

According to various embodiments, the electronic device 101 (e.g., the at least one processor 120) may provide a visual effect on the folder screen when an existing folder name is updated with a new folder name. For example, the visual effect may be an animation effect in which an existing folder name disappears and at least one updated folder name is displayed.

According to various embodiments, when it is determined that a provided second folder name is configured as the folder name of the folder in operation 3105, the electronic device 101 (e.g., the at least one processor 120) may provide at least one second application related to the second folder name in operation 3106. For example, when one folder name 3215 is selected as shown in reference numeral 3204 of FIG. 32, the electronic device 101 may display at least one icon 3216 corresponding to at least one application to be recommended, which is related to the selected one folder name. Since the operation of identifying at least one application to be recommended, which is related to the folder name, by the electronic device 101 may be performed as described above with reference to FIGS. 23 to 28 of the electronic device 101, a duplicated description will be omitted.

According to various embodiments, the electronic device 101 (e.g., at least one processor 120) may provide a visual effect on a folder screen when an existing recommended application is updated with a new recommended application. For example, the visual effect may be an animation effect in which an icon corresponding to an existing recommended application disappears and at least one icon corresponding to at least one updated recommended application is displayed.

As described above, since the electronic device 101 automatically simultaneously provides icons to be included in the folder while the folder is being generated, the icons to be included in the folder may be more systematically managed, and the user's convenience in using the folder may be improved.

Hereinafter, still further another example of the operation of the electronic device 101 according to various embodiments will be described.

According to various embodiments, while generating a folder including at least one icon, the electronic device 101 may provide information for recommending an application to be included in the folder.

Figure 33:
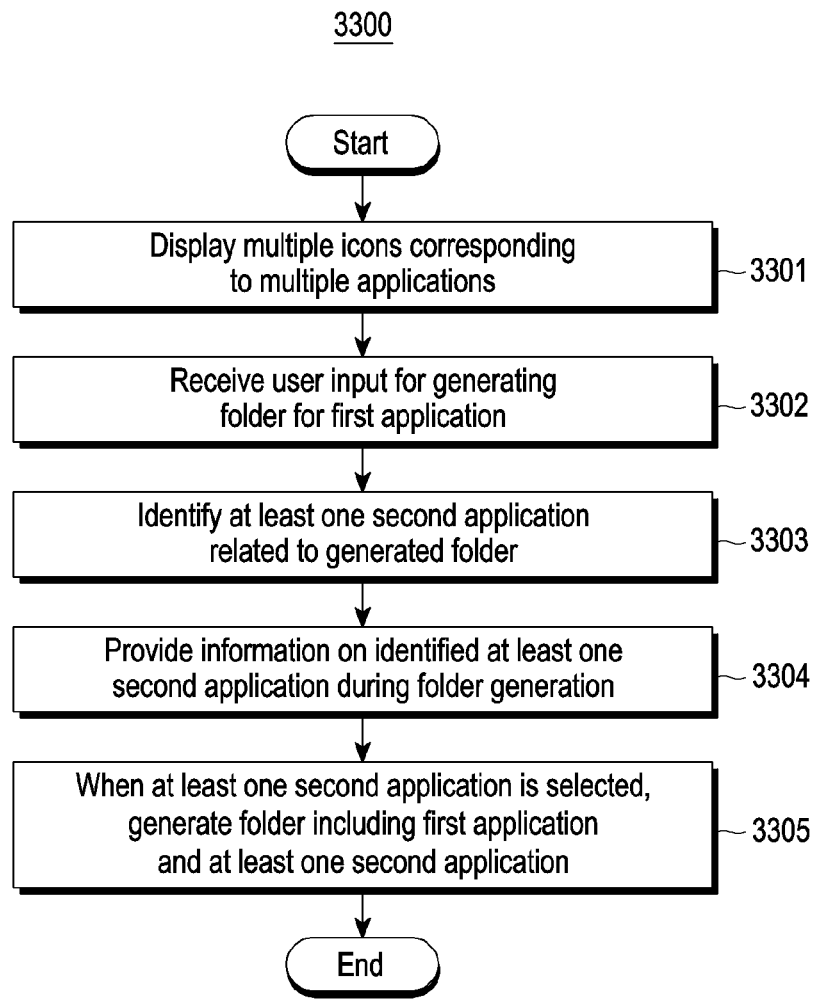
FIG. 33 is a flowchart illustrating still further another example of an operation of an electronic device according to various embodiments.

FIG. 33 is a flowchart illustrating still further another example of an operation of an electronic device according to various embodiments. The operations illustrated in FIG. 33 are not limited to the illustrated order and may be performed in various orders. In addition, according to various embodiments, more operations than those illustrated in FIG. 33 or at least one operation fewer than those thereof may be performed. Hereinafter, FIG. 33 will be described with reference to FIG. 34.

Figure 34:
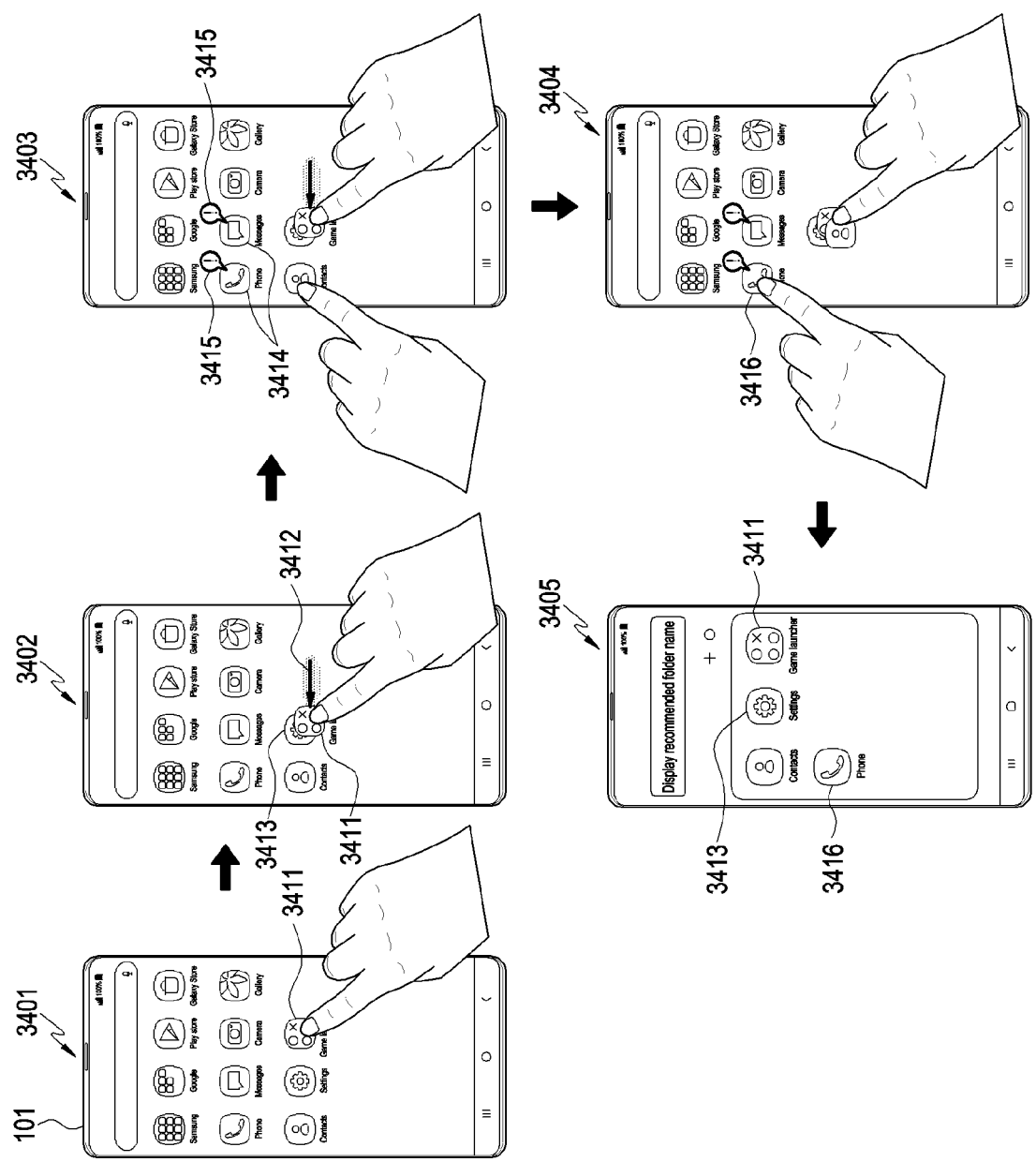
FIG. 34 illustrates an operation of an electronic device for providing information for recommending an application to be included in a folder while generating the folder according to various embodiments.

FIG. 34 illustrates an operation of an electronic device 101 for providing information for recommending an application to be included in a folder while generating the folder according to various embodiments.

According to various embodiments, the electronic device 101 (e.g., at least one processor 120) may display icons corresponding to multiple applications in operation 3301. For example, as shown in reference numeral 3401 of FIG. 34, the electronic device 101 may display an execution screen (e.g., a home screen or a folder screen (not shown)) including multiple icons corresponding to multiple applications and at least one icon corresponding to at least one folder.

According to various embodiments, the electronic device 101 (e.g., the at least one processor 120) may receive a user input for generating a folder for the first application in operation 3302. For example, as shown in reference numerals 3401 to 3402 of FIG. 34, the electronic device 101 may receive an input 3412 for dragging an icon 3411 corresponding to the first application to another icon 3413, and may identify that an event for generating a folder including the first application and a second application corresponding to another icon has occurred, based on the reception of the drag input. In addition, for example, without being limited thereto, the electronic device 101 may be configured to identify a folder generation event as shown in FIG. 20.

According to various embodiments, the electronic device 101 (e.g., the at least one processor 120) may be configured to identify at least one second application related to a folder to be generated in operation 3303, and to provide information on the identified at least one second application in operation 3304. For example, when the electronic device 101 identifies that an event for generating a folder has occurred (e.g., reference numeral 3402 of FIG. 34), the electronic device 101 may provide information for recommending an application to be added to the folder to be generated.

According to various embodiments, the electronic device 101 (e.g., at least one processor 120) may be configured to identify applications recommended in the folder to be generated based on information related to applications included in the folder to be generated. For example, the electronic device 101 may be configured to compare information related to applications included in a folder to be generated (e.g., a first application corresponding to a first icon 3411 and a second application corresponding to a second icon 3413) and information related to the remaining applications, and to identify some of the remaining applications as recommended applications based on a result of the comparison. For example, when a similarity between information related to some of the remaining applications and information of applications included in a folder to be generated is equal to or higher than a preconfigured value, the electronic device 101 may be configured to identify some of the remaining applications as recommended applications. In addition, for example, the electronic device 101 may be configured to identify folder names related to applications (e.g., the first application and the second application) included in a folder to be generated (e.g., identify a folder name having the highest weight value or folder names having a weight value equal to or higher than a preconfigured value), and to identify at least one application having the identified folder name among the remaining applications. Since the operation of identifying the folder name related to the applications by the electronic device 101 may be performed as described above, a duplicated description will be omitted.

According to various embodiments, the electronic device 101 (e.g., the at least one processor 120) may display information on the identified recommended application while the folder is being generated. For example, while the user's drag input for generating a folder is maintained, the electronic device 101 may visually highlight and display at least one icon corresponding to the identified and recommended at least one application. As an example, as shown in reference numeral 3403 of FIG. 34, the electronic device 101 may display an element 3415 for notifying of recommendation around at least one icon 3414 corresponding to at least one recommended application. The element 3415 is not limited thereto, and may include various elements such as a thick line displayed on the border of the icon. As another example, the electronic device 101 may change and display visual properties such as a shape, color, and visibility of at least one icon corresponding to at least one recommended application. In addition, for example, the electronic device displays a screen including multiple icons for generating a folder as shown in FIG. 20, and when at least one icon from among the multiple icons is selected, the electronic device may visually highlight and display at least one other icon corresponding to at least one recommended application.

According to various embodiments, in operation 3305, when the at least one second application is selected, the electronic device 101 (e.g., the at least one processor 120) may generate a folder including the first application and the at least one second application. For example, when at least one icon 3416 corresponding to at least one recommended application is selected while the user's drag input 3412 is maintained as shown in reference numeral 3404 of FIG. 34, the electronic device 101 may display a folder screen by generating a folder including icons 3411, 3413, and 3416 corresponding to the selected application as shown in reference numeral 3405 of FIG. 34.

As described above, at the time of updating the folder name of a folder, the electronic device 101 may automatically provide information on whether to exclude icons included in the folder, and thus the icons included in the folder are managed more systematically and the user's convenience in folder use can be improved.

Hereinafter, still further another example of the operation of the electronic device 101 according to various embodiments will be described.

According to various embodiments, when a folder name of a folder is changed, the electronic device 101 may provide information for excluding an icon included in the folder.

Figure 35:
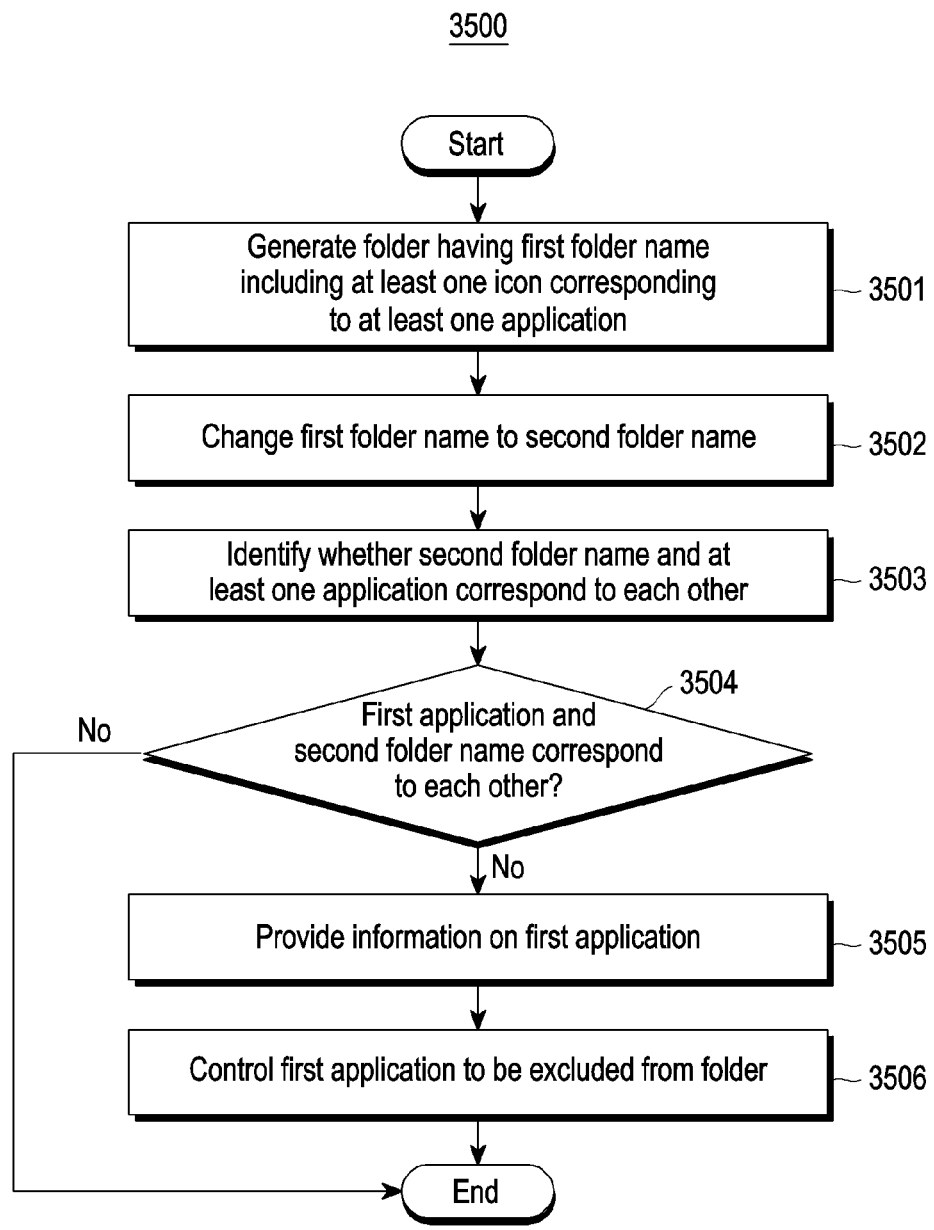
FIG. 35 is a flowchart illustrating still further another example of an operation of an electronic device according to various embodiments.

FIG. 35 is a flowchart illustrating another example of an operation of an electronic device according to various embodiments. The operations illustrated in FIG. 35 are not limited to the illustrated order and may be performed in various orders. In addition, according to various embodiments, more operations than those illustrated in FIG. 35 or at least one operation fewer than those thereof may be performed. Hereinafter, FIG. 35 will be described with reference to FIG. 36.

Figure 36:
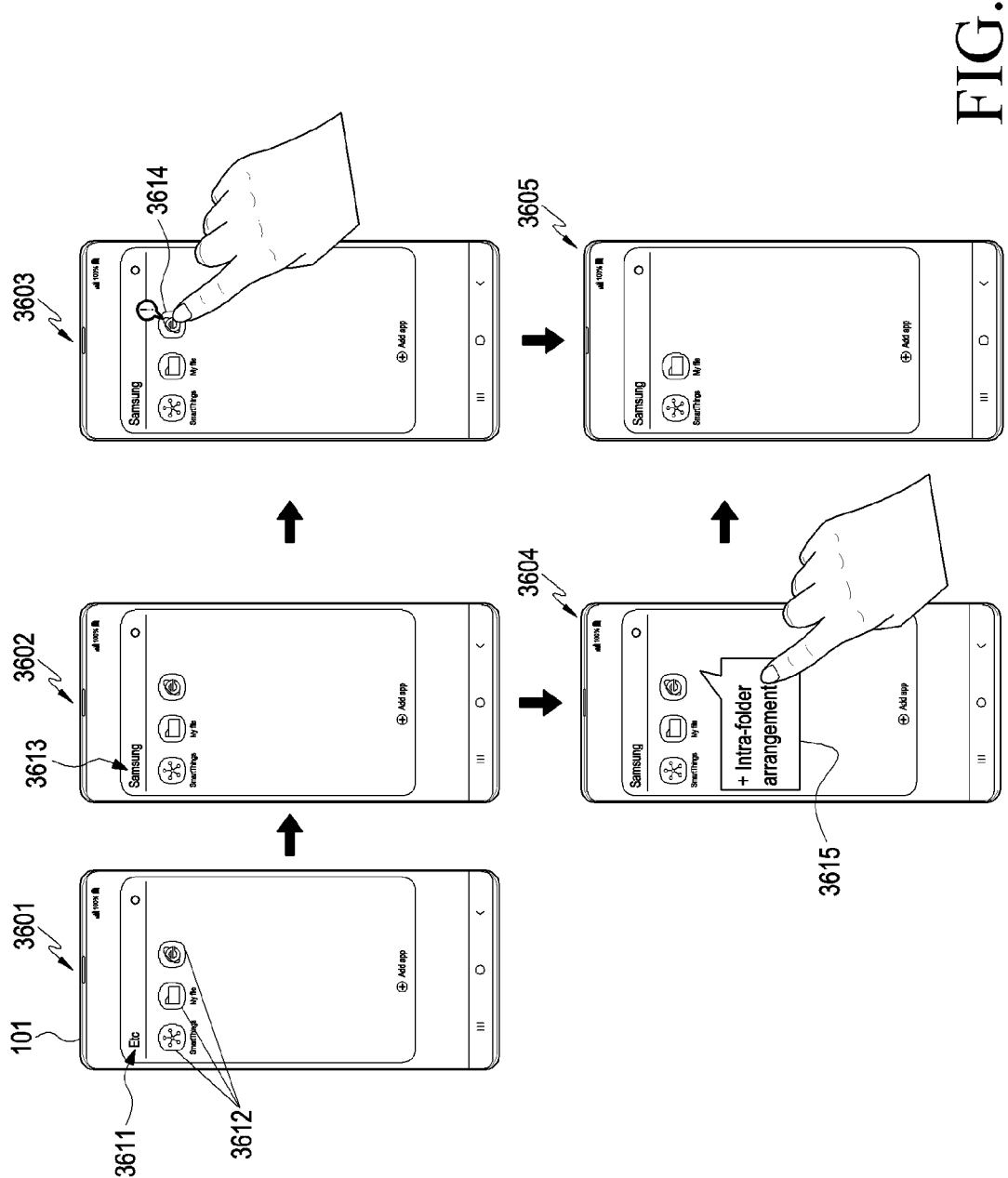
FIG. 36 is a flowchart illustrating an example of an operation of an electronic device for providing information for excluding an icon included in a folder when a folder name is changed according to various embodiments.

FIG. 36 is a flowchart illustrating an example of an operation of an electronic device for providing information for excluding an icon included in a folder when a folder name is changed according to various embodiments.

Referring to FIGS. 35 and 36, in a method 3500, in operation 3501, the electronic device 101 (e.g., at least one processor 120) may be configured to generate a folder having a first folder name 3611 including at least one icon 3612 corresponding to at least one application as shown in reference numeral 3601 of FIG. 36. The first folder name 3611 may be a folder name directly configured (e.g., directly input) by the user, or a folder name selected by the user from among folder names recommended by the electronic device 101.

According to various embodiments, the electronic device 101 (e.g., the at least one processor 120) may change the first folder name to a second folder name in operation 3502. For example, as shown in reference numeral in 3602 of FIG. 36, the electronic device 101 may change the first folder name 3611 to another second folder name 3613. The second folder name 3613 may be a folder name directly configured (e.g., directly input) by the user or a folder name selected by the user from among folder names recommended by the electronic device 101.

According to various embodiments, the electronic device 101 (e.g., at least one processor 120) may be configured to identify whether the second folder name and at least one application correspond to each other in operation 3503. For example, the electronic device 101 may be configured to identify whether the changed second folder name and at least one application corresponding to at least one icon included in a folder correspond to each other.

According to various embodiments, in response to the folder name being changed, the electronic device 101 may be configured to identify whether the changed folder name (e.g., the second folder name) and at least one application corresponding to at least one icon included in the folder correspond to each other.

For example, the electronic device 101 (e.g., the at least one processor 120) may be configured to identify a folder name related to at least one application, and identify a similarity between the identified folder name and the changed folder name (e.g., a second folder name). The electronic device 101 may be configured to identify that the changed folder name and the application correspond to each other when the identified similarity is equal to or higher than a preconfigured value, and to identify that they do not correspond to each other when the identified similarity is less than a preconfigured value.

In addition, for example, the electronic device 101 (e.g., at least one processor 120) may be configured to identify a weight value for a second folder name related to at least one application, identify that the folder name and the application correspond to each other when the identified weight value has a value equal to or greater than a preconfigured value, and identify that they do not correspond to each other when the identified weight value has a value less than a preconfigured value. Since the operation of identifying the weight value of the folder name related to the application by the electronic device 101 may be performed as in the operations of the electronic device 101 described above, a duplicated description will be omitted.

According to various embodiments, when the first application and the second folder name do not correspond in operation 3504, the electronic device 101 (e.g., at least one processor 120) may provide information on the first application in operation 3505, and may control the first application to be excluded from the folder in operation 3506.

For example, the electronic device 101 (e.g., at least one processor 120) may display information for excluding the first icon corresponding to the first application, which is identified as not corresponding to the changed folder name, and may exclude the first icon from the folder when exclusion of the first icon is selected. As an example, the electronic device 101 may display an element for requesting exclusion on the icon 3614 to be excluded as shown in reference numeral 3603 of FIG. 36 and, when the exclusion is selected, may exclude the icon 3614 from the folder as shown in reference numeral 3605 of FIG. 36.

In addition, for example, when the electronic device 101 (e.g., the at least one processor 120) receives a request for excluding the first icon corresponding to the first application which is identified as not corresponding to the changed folder name on the folder screen, the electronic device may exclude the first icon from the folder if exclusion of the first icon is selected. When the electronic device 101 receives a command (e.g., intra-folder arrangement 3615) for excluding an icon that does not correspond to the changed folder name from a pop-up screen displayed on the folder screen as shown in reference numeral 3604 of FIG. 36, the electronic device may exclude the first icon from the folder as shown in reference numeral 3605 of FIG. 36.

Hereinafter, still further another example of the operation of the electronic device 101 according to various embodiments will be described.

According to various embodiments, the electronic device 101 may generate a subfolder in a folder and provide hierarchical information between folders.

Figure 37:
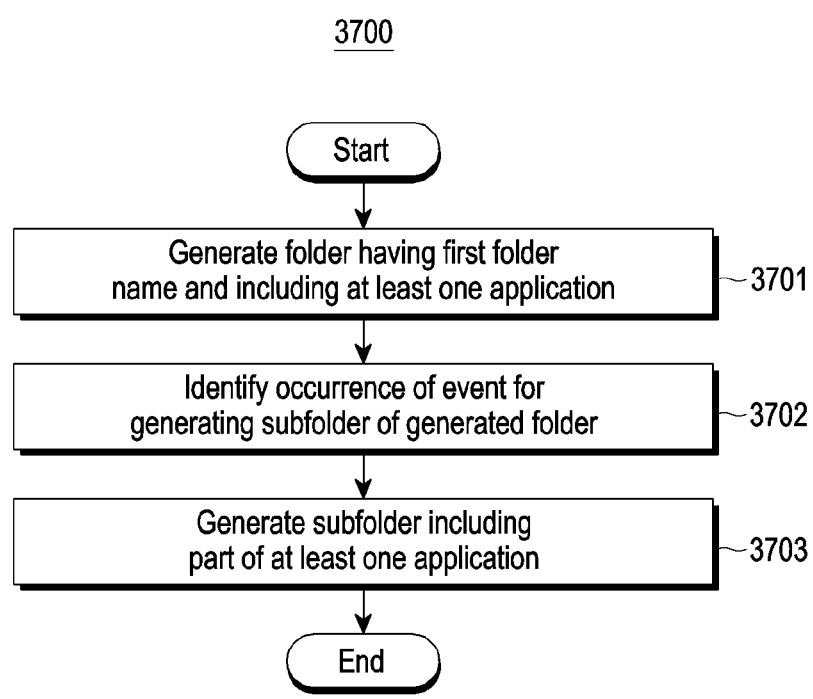
FIG. 37 illustrates still further another example of an operation of an electronic device according to various embodiments.

FIG. 37 illustrates another example of an operation of an electronic device according to various embodiments. The operations illustrated in FIG. 37 are not limited to the illustrated order and may be performed in various orders. In addition, according to various embodiments, more operations than those illustrated in FIG. 37 or at least one operation fewer than those thereof may be performed. Hereinafter, FIG. 37 will be described with reference to FIGS. 38 to 39.

Figure 38:
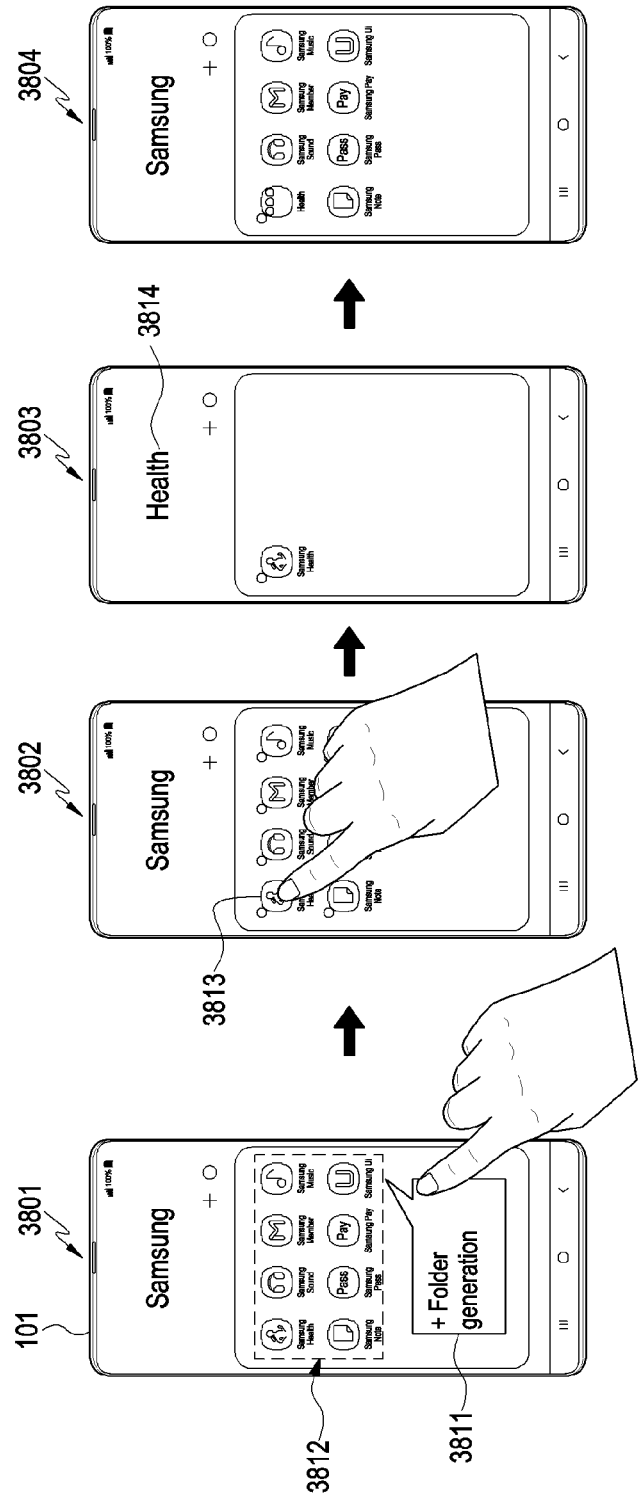
FIG. 38 illustrates an example of an operation of an electronic device for generating a subfolder according to various embodiments.
Figure 39:
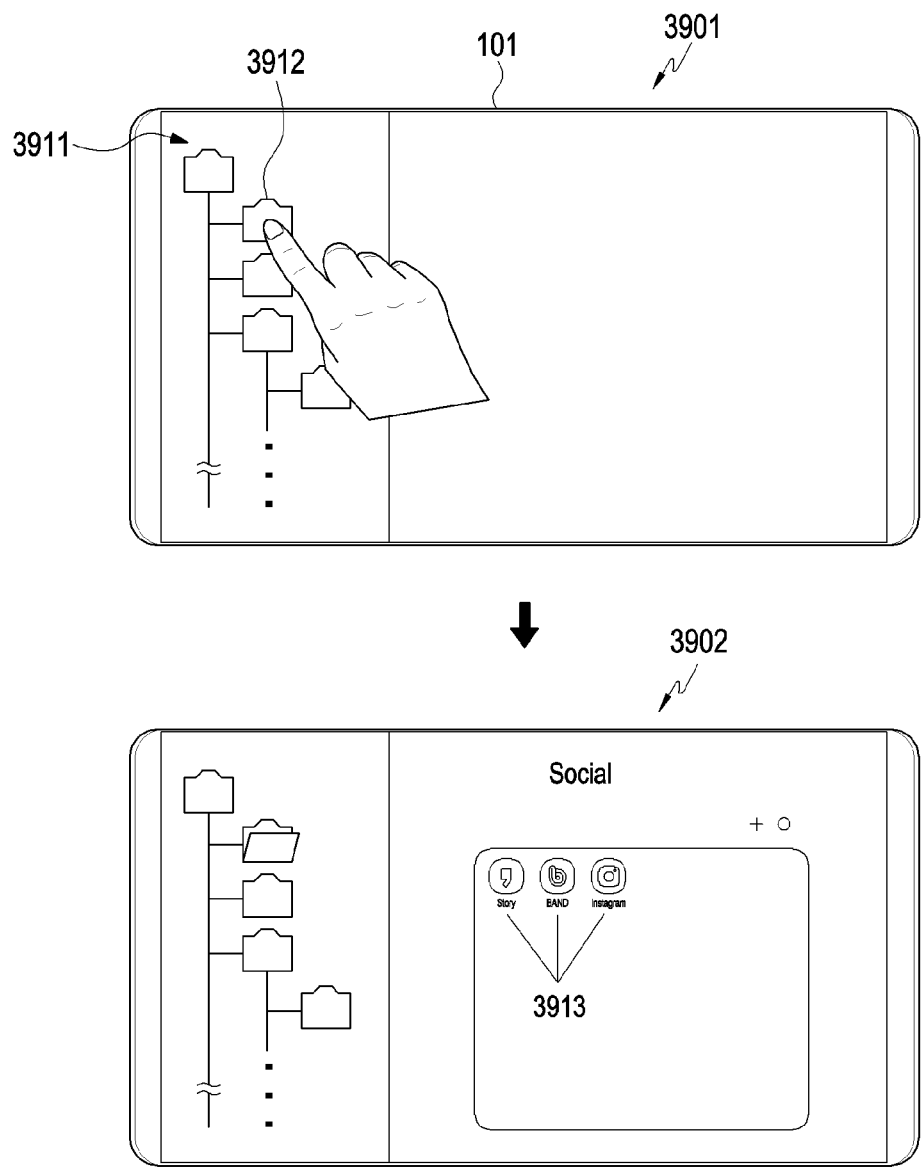
FIG. 39 illustrates an example of an operation of an electronic device for providing hierarchical information between folders according to various embodiments.

FIG. 38 illustrates an example of an operation of generating a subfolder by an electronic device according to various embodiments. FIG. 39 illustrates an example of an operation of providing hierarchical information between folders by the electronic device 101 according to various embodiments.

Referring to FIGS. 37 to 39, in a method 3700, in operation 3701, the electronic device 101 (e.g., the at least one processor 120) may be configured to generate a folder (e.g., a folder having the name "Samsung") including at least one icon 3812 corresponding to at least one application as shown in reference numeral 3801 of FIG. 38.

According to various embodiments, the electronic device 101 (e.g., the at least one processor 120) may be configured to identify occurrence of an event for generating a subfolder of the generated folder in operation 3702, and generate a subfolder including a part of the at least one icon in operation 3703.

According to various embodiments, the electronic device 101 may generate a subfolder based on the occurrence of an event for generating a folder including at least one icon on the folder screen.

For example, as shown in reference numeral 3801 of FIG. 38, upon receiving a user input for selecting an area (or element) for requesting a pop-up screen 3811 on a folder screen, the electronic device 101 (e.g., at least one processor 120) may display a pop-up screen 3811 and generate a folder by receiving a request for folder generation (e.g., a menu for folder generation is selected) on the displayed pop-up screen 3811. The electronic device 101 may receive a user input for selecting an icon 3813 to be included in a subfolder as shown in reference numeral 3802 of FIG. 38, and may generate a subfolder including the selected icon 3813 as shown in reference numeral 3803 of FIG. 38.

Without being limited to the above description, the electronic device 101 may generate a subfolder on a folder screen based on the occurrence of an event for folder generation described above with reference to FIGS. 20 to 22.

According to various embodiments, the electronic device 101 (e.g., at least one processor 120) may provide a folder name 3814 (e.g., Health) for a subfolder. For example, the electronic device 101 may provide a folder name corresponding to at least one application corresponding to at least one icon included in a subfolder as the folder name 3814 of the subfolder. When displaying an icon corresponding to a subfolder on an upper folder screen, the electronic device 101 may display the folder name (e.g., Health) in an area surrounding the icon corresponding to the subfolder (e.g., an area within a preconfigured distance from the icon), as shown in reference numeral 3804 of FIG. 38. Since the operation of providing the folder name by the electronic device 101 may be performed as described above, a duplicated description will be omitted.

According to various embodiments, the electronic device 101 (e.g., at least one processor 120) may provide hierarchical information between folders based on information about folders stored in the electronic device 101.

For example, the electronic device 101 (e.g., the at least one processor 120) may store and manage information on icons included in each of the folders. In other words, the electronic device 101 may store and manage information on an icon corresponding to an application included in a folder and pieces of information on an icon corresponding to a folder and included in a folder. Based on the information on the icons included in the folder, the electronic device 101 may display a tree-type hierarchical diagram 3911 for indicating the relationship between the upper folder and the subfolder as shown in reference numeral 3901 of FIG. 39. The hierarchy diagram may include objects corresponding to folders (e.g., an upper folder and a subfolder), may include an element (e.g., a line, etc.) for displaying a hierarchy between folders, and may include objects for hiding subfolders of the upper folder. As shown in reference numerals 3901 and 3902 of FIG. 39, when an object 3912 corresponding to one folder is selected in the hierarchy diagram, the electronic device 101 may display a screen of one folder including at least one icon 3913 included in one folder.

According to various embodiments, provided may be an electronic device including a display, a memory storing executable instructions, and at least one processor, wherein, when the instructions stored in the memory are executed, the at least one processor is configured to, identify occurrence of an event for generating a folder including at least one icon corresponding to at least one application; control the display to display a screen of the folder including the at least one icon; control the display to display at least two folder names corresponding to the at least one application; receive a user input for selecting a first folder name from among the displayed at least two folder names; and control the display to display the selected first folder name as a folder name of the folder on the folder screen.

According to various embodiments, an electronic device may be provided, in which when the instructions stored in the memory are executed, the at least one processor is configured to acquire information related to the at least one application corresponding to the at least one icon, and identify at least two folder names among a plurality of predetermined folder names based on the information related to the at least one application.

According to various embodiments, an electronic device may be provided, in which when the instructions stored in the memory are executed, the at least one processor is configured to identify at least one keyword based on the information related to the at least one application, acquire first information including the plurality of predetermined folder names and weight values of a plurality of keywords related to the plurality of folder names, and identify at least two folder names among the plurality of folder names based on the identified at least one keyword and the first information.

According to various embodiments, an electronic device may be provided, in which when the instructions stored in the memory are executed, the at least one processor is configured to identify weight values related to each of the plurality of folder names based on the weight values of the plurality of keywords related to the plurality of folder names and the identified at least one keyword, and identify the at least two folder names related to a weight value, which is greater than a preconfigured weight value, among the plurality of folder names based on the identified weight values.

According to various embodiments, an electronic device may be provided, in which when the instructions stored in the memory are executed, the at least one processor is configured to arrange the at least two folder names based on the weight values of the at least two folder names.

According to various embodiments, provided may be an electronic device further including a communication circuit, in which when the instructions stored in the memory are executed, the at least one processor is configured to control the communication circuit to receive the first information from an external device, and the weight values of the plurality of keywords related to the plurality of folder names included in the first information are learned in the external device.

According to various embodiments, provided may be an electronic device, in which when the instructions stored in the memory are executed, the at least one processor is configured to control the display to display a plurality of icons corresponding to a plurality of applications, and the event is based on a user input related to the plurality of icons.

According to various embodiments, provided may be an electronic device, in which when the instructions stored in the memory are executed, the at least one processor is configured to receive a first user input for dragging a first icon from among the plurality of icons to another second icon; while the first user input is maintained, highlight and display at least one third icon, which is related to at least one of the first icon or the second icon, among the remaining icons of the plurality of icons; and generate a folder including the first icon, the second icon, and the at least one third icon based on a second user input for selecting the at least one third icon.

According to various embodiments, provided may be an electronic device, in which when the instructions stored in the memory are executed, the at least one processor is configured to, when the first application is added, identify at least two first folder names, which are related to the at least one application and the added first application, among the plurality of folder names; and control the display to display the at least two first folder names on the folder screen.

According to various embodiments, provided may be an electronic device, in which the at least one application may include a first application, a second application, and a third application, and when the instructions stored in the memory are executed, the at least one processor is configured to, control the display to display a first icon corresponding to the first application, a second icon corresponding to the second application, and the third icon corresponding to the third application on the folder screen, and based on the occurrence of an event for generating a first folder including the first icon and the second icon, identify a second folder name related to the first application and the second application.

According to various embodiments, provided may be an electronic device, in which when the instructions stored in the memory are executed, the at least one processor is configured to: identify at least one first application related to the folder, control the display to display at least one first icon corresponding to the at least one first application on the folder screen, and when the at least one first icon is selected, allow the at least one first icon to be included in the folder.

According to various embodiments, provided may be an electronic device, in which when the instructions stored in the memory are executed, the at least one processor is configured to, control the display to display a plurality of icons corresponding to a plurality of applications, based on the occurrence of an event for arranging the plurality of icons, identify folder names related to the plurality of icons; and generate a plurality of folders having identified folder names, in which each of the plurality of folders includes some of a plurality of icons.

According to various embodiments, provided may be a method for operating an electronic device, the method including, identifying occurrence of an event for generating a folder including at least one icon corresponding to at least one application, controlling the display to display a folder screen including the at least one icon, displaying at least two folder names corresponding to the at least one application, receiving a user input for selecting a first folder name from among the displayed at least two folder names, and displaying the selected first folder name as a folder name of the folder on the folder screen.

According to various embodiments, provided may be a method for operating an electronic device, the method including, acquiring information related to the at least one application corresponding to the at least one icon, and identifying at least two folder names among a plurality of predetermined folder names based on the information related to the at least one application.

According to various embodiments, provided may be a method for operating an electronic device, the method including, identifying at least one keyword based on the information related to the at least one application, acquiring first information including the plurality of predetermined folder names and weight values of a plurality of keywords related to the plurality of folder names, and identifying at least two folder names among a plurality of folder names based on the identified at least one keyword and the first information.

According to various embodiments, provided may be a method for operating an electronic device, the method including, identifying weight values related to each of the plurality of folder names based on the weight values of the plurality of keywords related to the plurality of folder names and the identified at least one keyword, and identifying the at least two folder names related to a weight value, which is greater than a preconfigured weight value, among the plurality of folder names based on the identified weight values.

According to various embodiments, provided may be an electronic device including a memory storing executable instructions, and at least one processor, in which, when the instructions stored in the memory are executed, the at least one processor is configured to generate a folder including at least one icon corresponding to at least one application of a plurality of applications, identify at least one second application, which is related to a folder name of the folder, among the remaining applications of the plurality of applications, and display at least one icon corresponding to the identified at least one second application on a screen of the generated folder.

According to various embodiments, provided may be an electronic device in which when the instructions stored in the memory are executed, the at least one processor is configured to acquire information related to the remaining applications, identify first folder names related to each of the remaining applications from among a plurality of predetermined folder names based on the acquired information, and identify at least one second application related to the folder name of the folder based on the identified first folder names.

According to various embodiments, provided may be an electronic device, in which when the instructions stored in the memory are executed, the at least one processor is configured to, based on the information related to the remaining applications, identify at least one keyword related to each of the remaining applications, acquire first information including the plurality of predetermined folder names and weight values of a plurality of keywords related to the plurality of folder names, and identify the first folder names related to each of the remaining applications based on the identified at least one keyword and the first information.

According to various embodiments, provided may be an electronic device, in which when the instructions stored in the memory are executed, the at least one processor is configured to, based on the weight values of the plurality of keywords related to the plurality of folder names and the identified at least one keyword, identify first weight values related to the respective a plurality of folder names for each of the remaining applications, and based on the identified first weight values, identify a first folder name, which is related to the highest weight value among the plurality of folder names, as first folder names related to each of the remaining applications.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
memory storing executable instructions; and
at least one processor,
wherein the instructions, when executed by the at least one processor, cause the electronic device to:
identify an occurrence of a first event for generating a folder including at least one icon corresponding to at least one application,
control the display to display a folder icon of the folder including the at least one icon,
control the display to display at least two folder names corresponding to the at least one application,
receive a user input selecting a first folder name from among the at least two folder names,
control the display to display the first folder name as a folder name of the folder on the folder icon,
identify an occurrence of a second event for generating a subfolder of the folder,
generate the subfolder including a part of the at least one icon,
control the display to display a second folder name corresponding to the part of the at least one icon included in the subfolder,
based on receiving a user input changing the folder name to a third folder name, control the display to display the third folder name as the folder name of the folder on the folder icon,
identify whether the at least one application corresponds to the third folder name, and
based on identifying that a first application among the at least one application does not correspond to the third folder name, exclude an icon corresponding to the first application from the folder.

2. The electronic device of claim 1, wherein the instructions, when executed by the at least one processor, cause the electronic device to:
acquire information related to the at least one application corresponding to the at least one icon, and
identify the at least two folder names among a plurality of predetermined folder names, based on the information related to the at least one application.

3. The electronic device of claim 2, wherein the instructions, when executed by the at least one processor, cause the electronic device to:
based on the information related to the at least one application, identify at least one keyword,
acquire first information including the plurality of predetermined folder names and weight values of a plurality of keywords related to the plurality of predetermined folder names, and
based on the at least one keyword and the first information, identify the at least two folder names among the plurality of predetermined folder names.

4. The electronic device of claim 3, wherein the instructions, when executed by the at least one processor, cause the electronic device to:
identify first weight values related to each of the plurality of predetermined folder names, based on the weight values of the plurality of keywords related to the plurality of predetermined folder names and the identified at least one keyword, and
identify the at least two folder names related to a weight value, which is greater than a preconfigured weight value, among the plurality of predetermined folder names based on the identified first weight values.

5. The electronic device of claim 4, wherein the instructions, when executed by the at least one processor, cause the electronic device to:
arrange the at least two folder names based on first weight values related to each of the at least two folder names.

6. The electronic device of claim 3, further comprising:
a communication circuit,
wherein the instructions, when executed by the at least one processor, cause the electronic device to:
receive, through the communication circuit, the first information from an external device, and wherein the weight values of the plurality of keywords related to the plurality of predetermined folder names included in the first information are learned in the external device.

7. The electronic device of claim 1,
wherein the instructions, when executed by the at least one processor, cause the electronic device to:
control the display to display a plurality of icons corresponding to a plurality of applications, and
wherein the first event is based on a user input related to the plurality of icons.

8. The electronic device of claim 7, wherein the instructions, when executed by the at least one processor, cause the electronic device to:
receive a first user input dragging a first icon from among the plurality of icons to a second icon,
while the first user input is maintained, highlight and display at least one third icon, which is related to at least one of the first icon or the second icon, among remaining icons of the plurality of icons, and
generate the folder including the first icon, the second icon, and the at least one third icon, based on a second user input selecting the at least one third icon.

9. The electronic device of claim 1, wherein the instructions, when executed by the at least one processor, cause the electronic device to:
when a first application is added, identify at least two first folder names, which are related to the at least one application and the added first application, among a plurality of folder names, and
control the display to display the at least two first folder names on the folder icon.

10. The electronic device of claim 2,
wherein the at least one application includes a first application, a second application, and a third application, and
wherein the instructions, when executed by the at least one processor, cause the electronic device to:
control the display to display a first icon corresponding to the first application, a second icon corresponding to the second application, and at least one third icon corresponding to the third application on the folder icon, and
based on the occurrence of the first event for generating the folder including the first icon and the second icon, identify the first folder name related to the first application and the second application.

11. The electronic device of claim 1, wherein the instructions, when executed by the at least one processor, cause the electronic device to:
identify at least one first application related to the folder,
control the display to display at least one first icon corresponding to the at least one first application on the folder icon, and
when the at least one first icon is selected, allow the at least one first icon to be included in the folder.

12. The electronic device of claim 1, wherein the instructions, when executed by the at least one processor, cause the electronic device to:
control the display to display a plurality of icons corresponding to a plurality of applications,
based on an occurrence of a third event for arranging the plurality of icons, identify folder names related to the plurality of icons, and
generate a plurality of folders having folder names, wherein each of the plurality of folders includes some of the plurality of icons.

13. A method for operating an electronic device, the method comprising:
identifying an occurrence of a first event for generating a folder including at least one icon corresponding to at least one application;
controlling a display of the electronic device to display a folder icon of the folder including the at least one icon;
controlling the display to display at least two folder names corresponding to the at least one application;
receiving a user input selecting a first folder name from among the at least two folder names;
controlling the display to display the first folder name as a folder name of the folder on the folder icon;
identifying an occurrence of a second event for generating a subfolder of the folder;
generating the subfolder including a part of the at least one icon;
controlling the display to display a second folder name corresponding to the part of the at least one icon included in the subfolder;
based on receiving a user input changing the folder name to a third folder name, controlling the display to display the third folder name as the folder name of the folder on the folder icon;
identifying whether the at least one application corresponds to the third folder name; and
based on identifying that a first application among the at least one application does not correspond to the third folder name, excluding an icon corresponding to the first application from the folder.

14. The method of claim 13, further comprising:
acquiring information related to the at least one application corresponding to the at least one icon; and
identifying the at least two folder names among a plurality of predetermined folder names, based on the information related to the at least one application.

15. The method of claim 14, further comprising:
identifying at least one keyword based on the information related to the at least one application;
acquiring first information including the plurality of predetermined folder names and weight values of a plurality of keywords related to the plurality of predetermined folder names; and
identifying the at least two folder names among a plurality of folder names, based on the at least one keyword and the first information.

16. The method of claim 15, further comprising:
identifying first weight values related to each of the plurality of folder names based on the weight values of the plurality of keywords related to the plurality of predetermined folder names and the identified at least one keyword; and
identifying the at least two folder names related to a weight value, which is greater than a preconfigured weight value, among the plurality of predetermined folder names based on the identified first weight values.

17. An electronic device comprising:
a display;
memory storing one or more computer programs; and
one or more processors communicatively coupled to the display and the memory,
wherein the one or more computer programs include computer-executable instructions that, when executed by the one or more processors individually or collectively, cause the electronic device to:

generate a folder including at least one icon corresponding to at least one application of a plurality of applications, identify at least one second application, which is related to a folder name of the folder, among remaining applications of the plurality of applications, display at least one icon corresponding to the at least one second application on a folder icon of the folder, identify an occurrence of an event for generating a subfolder of the folder, generate the subfolder including a part of the at least one icon corresponding to the at least one application and the at least one icon corresponding to the at least one second application, control the display to display a second folder name corresponding to the part of the at least one icon corresponding to the at least one application and the at least one icon corresponding to the at least one second application included in the subfolder, based on receiving a user input changing the folder name to a third folder name, change the folder name to the third folder name and identify whether the at least one application and the at least one second application correspond to the third folder name by identifying a folder name related to the at least one application and the at least one second application and identifying a similarity between the identified folder name and the third folder name, and based on identifying that a first application among the at least one application and the at least one second application does not correspond to the third folder name based on the identified similarity being less than a configured value, exclude an icon corresponding to the first application from the folder.

18. The electronic device of claim 17, wherein the one or more computer programs further include computer-executable instructions that, when executed by the one or more processors individually or collectively, cause the electronic device to:

acquire information related to the remaining applications, identify first folder names related to each of the remaining applications from among a plurality of predetermined folder names based on the acquired information, and identify the at least one second application related to the folder name of the folder based on the first folder names.

19. The electronic device of claim 18, wherein the one or more computer programs further include computer-executable instructions that, when executed by the one or more processors, cause the electronic device to:

based on the information related to the remaining applications, identify at least one keyword related to each of the remaining applications, acquire first information including the plurality of predetermined folder names and weight values of a plurality of keywords related to the plurality of predetermined folder names, and identify the first folder names related to each of the remaining applications based on the at least one keyword and the first information.

20. The electronic device of claim 19, wherein the one or more computer programs further include computer-executable instructions that, when executed by the one or more processors, cause the electronic device to:

based on the weight values of the plurality of keywords related to the plurality of predetermined folder names and the identified at least one keyword, identify first weight values related to the respective plurality of predetermined folder names for each of the remaining applications, and based on the identified first weight values, identify a first folder name, which is related to a highest weight value among the plurality of predetermined folder names, as the first folder names related to each of the remaining applications.

* * * * *